(12) United States Patent
Meuler et al.

(10) Patent No.: US 10,987,686 B2
(45) Date of Patent: *Apr. 27, 2021

(54) SPRAY APPLICATION SYSTEM COMPONENTS COMPRISING A REPELLENT SURFACE AND METHODS

(71) Applicant: 3M INNOVATIVE PROPERTIES COMPANY, St. Paul, MN (US)

(72) Inventors: Adam J. Meuler, Woodbury, MN (US); Nicholas L. Untiedt, Minneapolis, MN (US); Stephen C. P. Joseph, Woodbury, MN (US); Thomas P. Klun, Lakeland, MN (US); Naiyong Jing, St. Paul, MN (US); Paul B. Armstrong, Minneapolis, MN (US); David A. Gzik, Stillwater, MN (US); Cheryl L. S. Elsbernd, Woodbury, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 16/782,105

(22) Filed: Feb. 5, 2020

(65) Prior Publication Data
US 2020/0171521 A1    Jun. 4, 2020

Related U.S. Application Data

(63) Continuation of application No. 16/451,702, filed on Jun. 25, 2019, which is a continuation of application
(Continued)

(51) Int. Cl.
*B05B 7/24* (2006.01)
*C09D 7/63* (2018.01)
(Continued)

(52) U.S. Cl.
CPC .......... *B05B 7/2478* (2013.01); *B05B 7/2481* (2013.01); *C09D 5/00* (2013.01);
(Continued)

(58) Field of Classification Search
CPC ....... B05B 7/2478; B05B 7/2481; C09D 7/63; C09D 7/61; C09D 5/00; C09D 127/18;
(Continued)

(56) References Cited

U.S. PATENT DOCUMENTS 2,504,482 A    4/1950  Goldman
2,898,317 A    5/1952  White, Jr.
(Continued)

FOREIGN PATENT DOCUMENTS

CA    2079542    4/1993
CN    1279697    1/2001
(Continued)

OTHER PUBLICATIONS

"Adaptive Surface Coatings, High Performance, Low Environmental Impact", [retrieved from the internet on Jun. 18, 2018], URL < https://adaptivesurface.tech/ >, previously Slips technologies, pp. 1-6.
(Continued)

*Primary Examiner* — Michael C Miggins
(74) *Attorney, Agent, or Firm* — Carolyn A Fischer

(57) ABSTRACT

Presently described are components of a spray application system. At least one component comprises a liquid repellent surface layer. The liquid repellent surface (e.g. layer) may comprise a porous layer and a lubricant impregnated into pores of the porous layer; a fluoropolymer; a fluorochemical material and an organic polymeric binder; or a fluorochemical material melt additive and a thermoplastic polymeric material component. The component is typically a liquid reservoir, a liquid reservoir liner, a lid for a liquid reservoir
(Continued)

or liner, or a combination thereof. In some embodiments, the component comprises a thermoplastic polymeric material. In some favored embodiments, the component is a removable liquid reservoir or liner. In some favored embodiments, the component is a collapsible liquid reservoir or liner. The spray application system typically further comprises a gravity-fed spray gun. Also described are spray application systems, methods of using a spray application system, as well as methods of making a component of a spray application system wherein the component has a liquid repellent surface.

19 Claims, 5 Drawing Sheets

Related U.S. Application Data

No. 15/306,224, filed as application No. PCT/US2015/057686 on Oct. 28, 2015, now Pat. No. 10,391,506.

(60) Provisional application No. 62/069,512, filed on Oct. 28, 2014.

(51) Int. Cl.
  *C09D 7/61* (2018.01)
  *C09D 5/00* (2006.01)
  *C09D 127/18* (2006.01)
  *C08K 3/36* (2006.01)
  *C08K 5/435* (2006.01)
  *C08K 5/5419* (2006.01)
  *C08K 9/02* (2006.01)

(52) U.S. Cl.
  CPC .......... *C09D 7/61* (2018.01); *C09D 7/63* (2018.01); *C09D 127/18* (2013.01); *C08K 3/36* (2013.01); *C08K 5/435* (2013.01); *C08K 5/5419* (2013.01); *C08K 9/02* (2013.01)

(58) Field of Classification Search
  CPC ........ C08K 3/36; C08K 5/435; C08K 5/5419; C08K 9/02
  See application file for complete search history.

(56) References Cited

U.S. PATENT DOCUMENTS

| | | |
|---|---|---|
| 2,622,598 A | 12/1952 | Rosenblum |
| 2,688,568 A | 9/1954 | Miskel |
| 2,803,656 A | 8/1957 | Ahlbrecht |
| 3,372,125 A | 3/1968 | Hill |
| 3,746,196 A | 7/1973 | Sako |
| 3,759,874 A | 9/1973 | Gresham |
| 3,787,351 A | 1/1974 | Olson |
| 4,209,610 A | 6/1980 | Mares |
| 4,301,208 A | 11/1981 | Jellinek |
| 4,508,916 A | 4/1985 | Newell |
| 4,595,628 A | 6/1986 | Kelly |
| 4,791,166 A | 12/1988 | Saukaitis |
| 5,169,900 A | 12/1992 | Gudelis |
| 5,187,015 A | 2/1993 | Yorkgitis |
| 5,213,743 A | 5/1993 | Ohara |
| 5,221,497 A | 6/1993 | Watanabe |
| 5,267,693 A | 12/1993 | Dickey |
| 5,350,795 A | 9/1994 | Smith |
| 5,459,188 A | 10/1995 | Sargent |
| 5,476,901 A | 12/1995 | Smith |
| 5,560,544 A | 10/1996 | Merritt |
| 5,560,992 A | 10/1996 | Sargent |
| 5,582,350 A | 12/1996 | Kosmyna |
| 5,618,903 A | 4/1997 | Hoxmeier |
| 5,637,657 A | 6/1997 | Anton |
| 5,641,835 A | 6/1997 | Smith |
| 5,670,573 A | 9/1997 | Kirchner |
| 5,674,592 A | 10/1997 | Clark |
| 5,728,469 A | 3/1998 | Mann |
| 5,747,392 A | 5/1998 | Xiao |
| 5,789,491 A | 8/1998 | Liss |
| 5,798,402 A | 8/1998 | Fitzgerald |
| 5,859,126 A | 1/1999 | Anton |
| 5,898,046 A | 4/1999 | Raiford |
| 5,914,384 A | 6/1999 | Anton |
| 5,977,390 A | 11/1999 | Raiford |
| 6,013,715 A | 1/2000 | Gornowicz |
| 6,063,474 A | 5/2000 | Raiford |
| 6,114,419 A | 9/2000 | Liss |
| 6,127,485 A | 10/2000 | Klun |
| 6,150,020 A | 11/2000 | Dharmadhikary |
| 6,171,983 B1 | 1/2001 | Coppens |
| 6,183,872 B1 | 2/2001 | Tanaka |
| 6,262,180 B1 | 7/2001 | Klun |
| 6,361,870 B1 | 3/2002 | Steffi |
| 6,362,135 B1 | 3/2002 | Greer |
| 6,387,999 B1 | 5/2002 | Dirschl |
| 6,462,115 B1 | 10/2002 | Takahashi |
| 6,465,107 B1 | 10/2002 | Kelly |
| 6,511,753 B1 | 1/2003 | Teranishi |
| 6,586,522 B1 | 7/2003 | Jariwala |
| 6,664,318 B1 | 12/2003 | Bymark |
| 6,753,380 B2 | 6/2004 | Qiu |
| 6,803,109 B2 | 10/2004 | Qiu |
| 6,860,926 B2 | 3/2005 | Ishikawa |
| 6,908,607 B2 | 6/2005 | Banerjee |
| 7,041,727 B2 | 5/2006 | Kubicek |
| 7,105,233 B2 | 9/2006 | Bechthold |
| 7,375,698 B2 | 5/2008 | Wolfenden |
| 7,396,866 B2 | 7/2008 | Jariwala |
| 7,399,807 B2 | 7/2008 | Day |
| 7,659,351 B2 | 2/2010 | Caldwell |
| 7,718,264 B2 | 5/2010 | Klun |
| 7,857,905 B2 | 12/2010 | Hayes |
| 7,897,666 B1 | 3/2011 | Berg |
| 8,110,037 B2 | 2/2012 | Russell |
| 8,497,021 B2 | 7/2013 | Simpson |
| 8,535,779 B1 | 9/2013 | Smith |
| 8,574,704 B2 | 11/2013 | Smith |
| 8,821,984 B2 | 9/2014 | Jariwala |
| 8,993,116 B2 | 3/2015 | Jariwala |
| 9,012,548 B2 | 4/2015 | Inagaki |
| 9,175,188 B2 | 11/2015 | Buckanin |
| 9,187,678 B2 | 11/2015 | Boardman |
| 9,197,678 B2 | 11/2015 | Heinla |
| 9,353,646 B2 | 5/2016 | Aizenberg |
| 9,371,173 B2 | 6/2016 | Smith |
| 9,441,079 B2 | 9/2016 | Yang |
| 2003/0235696 A1 | 12/2003 | Byrd |
| 2004/0037961 A1 | 2/2004 | Dieleman |
| 2004/0092675 A1 | 5/2004 | Moore |
| 2004/0213904 A1 | 10/2004 | Muller |
| 2005/0016489 A1 | 1/2005 | Endicott |
| 2005/0054804 A1 | 3/2005 | Dams |
| 2005/0121644 A1 | 6/2005 | Dams |
| 2005/0145134 A1 | 7/2005 | Petrin |
| 2005/0164010 A1 | 7/2005 | Trombetta |
| 2005/0234147 A1 | 10/2005 | Sakabe |
| 2006/0128850 A1 | 6/2006 | Jariwala |
| 2006/0142474 A1 | 6/2006 | Moore |
| 2006/0153993 A1 | 7/2006 | Schmidt |
| 2006/0209127 A1 | 9/2006 | Inoue |
| 2006/0248656 A1 | 11/2006 | Tung |
| 2006/0281861 A1 | 12/2006 | Putnam |
| 2008/0039558 A1 | 2/2008 | Lazzari |
| 2008/0047465 A1 | 2/2008 | Yen |
| 2008/0299347 A1 | 12/2008 | Ukei |
| 2008/0306238 A1 | 12/2008 | Jariwala |
| 2009/0069464 A1 | 3/2009 | Standke |
| 2009/0081384 A1 | 3/2009 | Plissonnier |
| 2009/0203276 A1 | 8/2009 | Kutsenko |
| 2009/0294724 A1 | 12/2009 | Attar |
| 2010/0035039 A1 | 2/2010 | Jing |

(56) References Cited

U.S. PATENT DOCUMENTS

| | | | |
|---|---|---|---|
| 2010/0047845 A1 | 2/2010 | Woodside |
| 2010/0092621 A1 | 4/2010 | Akutsu |
| 2010/0107556 A1 | 5/2010 | Monti |
| 2010/0314575 A1 | 12/2010 | Gao |
| 2011/0033694 A1 | 2/2011 | Jing |
| 2011/0135839 A1 | 6/2011 | Dziomkina |
| 2011/0207038 A1 | 8/2011 | Yu |
| 2011/0229667 A1 | 9/2011 | Jin |
| 2011/0305738 A1 | 12/2011 | Ladizinsky |
| 2012/0107556 A1 | 5/2012 | Zhang |
| 2013/0045332 A1 | 2/2013 | Fang |
| 2013/0140004 A1 | 6/2013 | Behrens |
| 2013/0178568 A1 | 7/2013 | Meuler |
| 2013/0186799 A1 | 7/2013 | Stam |
| 2013/0216820 A1 | 8/2013 | Riddle |
| 2013/0224478 A1 | 8/2013 | Jing |
| 2013/0251946 A1 | 9/2013 | Azimi |
| 2013/0284766 A1 | 10/2013 | Dubois |
| 2014/0120340 A1 | 5/2014 | Riddle |
| 2014/0147627 A1 | 5/2014 | Aizenberg |
| 2014/0147631 A1 | 5/2014 | Yang |
| 2014/0178611 A1 | 6/2014 | Smith |
| 2014/0287243 A1 | 9/2014 | Weber |
| 2014/0295149 A1 | 10/2014 | Ito |
| 2014/0311940 A1 | 10/2014 | Braveman |
| 2014/0322543 A1 | 10/2014 | Jonckheree |
| 2015/0166820 A1 | 6/2015 | Ikeyama |
| 2015/0238909 A1 | 8/2015 | Mori |
| 2015/0273522 A1 | 10/2015 | Boscher |
| 2015/0307731 A1 | 10/2015 | Bechtel |
| 2015/0352546 A1 | 12/2015 | Egeler |
| 2016/0200915 A1 | 7/2016 | Radchenko |

FOREIGN PATENT DOCUMENTS

| | | |
|---|---|---|
| CN | 101358106 | 2/2009 |
| CN | 101575478 | 11/2009 |
| CN | 102031057 | 11/2010 |
| CN | 102321415 | 1/2012 |
| DE | 10004132 | 8/2001 |
| EP | 0339583 | 11/1989 |
| EP | 0484093 | 5/1992 |
| EP | 0860490 | 8/1998 |
| EP | 0905179 | 3/1999 |
| EP | 0768921 | 10/1999 |
| EP | 1493761 | 1/2005 |
| EP | 2607397 | 6/2013 |
| GB | 1477055 | 6/1977 |
| JP | 56-154860 | 11/1981 |
| JP | 61-023656 | 7/1984 |
| JP | 1-313582 | 12/1989 |
| JP | 3-41160 | 2/1991 |
| JP | 4-05260 | 1/1992 |
| JP | 4-149294 | 5/1992 |
| JP | 5-331407 | 9/1992 |
| JP | 42-070649 | 9/1992 |
| JP | 5-239381 | 9/1993 |
| JP | 5338087 | 12/1993 |
| JP | 6-316548 | 11/1994 |
| JP | H11-033470 | 2/1999 |
| JP | 2000-87014 | 3/2000 |
| JP | 2001-508698 | 7/2001 |
| JP | 2002-053792 | 2/2002 |
| JP | 3306454 | 7/2002 |
| JP | 2007-297543 | 11/2007 |
| JP | 2008-184487 | 8/2008 |
| JP | 2010-503020 | 1/2010 |
| JP | 2010-222559 | 10/2010 |
| JP | 2011-067710 | 4/2011 |
| JP | 2014-500141 | 1/2014 |
| JP | 2014-509959 | 4/2014 |
| JP | 2015-144548 | 8/2015 |
| KR | 20120126548 | 11/2012 |
| WO | WO 1994-026830 | 11/1994 |
| WO | WO 1996-001152 | 1/1996 |
| WO | WO 1996-039349 | 12/1996 |
| WO | WO 1998-032539 | 7/1998 |
| WO | WO 98/43894 | 10/1998 |
| WO | WO 1998-043886 | 10/1998 |
| WO | WO 2004-090065 | 10/2001 |
| WO | WO 2002-072537 | 9/2002 |
| WO | WO 2002-072657 | 9/2002 |
| WO | WO 2005-066224 | 7/2005 |
| WO | WO 2005-113690 | 12/2005 |
| WO | WO 2006-065385 | 6/2006 |
| WO | WO 2008/027698 | 3/2008 |
| WO | WO 2008-104063 | 9/2008 |
| WO | WO 2008-154414 | 12/2008 |
| WO | WO 2009-140482 | 11/2009 |
| WO | WO 2010-002859 | 1/2010 |
| WO | WO 2010-062843 | 6/2010 |
| WO | WO 2012-051093 | 4/2012 |
| WO | WO 2012-064646 | 5/2012 |
| WO | WO 2012/071370 | 5/2012 |
| WO | WO 2012-100099 | 7/2012 |
| WO | WO 2012-121858 | 9/2012 |
| WO | WO 2012-173803 | 12/2012 |
| WO | WO 2013-115868 | 8/2013 |
| WO | WO 2013-127054 | 9/2013 |
| WO | WO 2013-172823 | 11/2013 |
| WO | WO 2013-177579 | 11/2013 |
| WO | WO 2014-010534 | 1/2014 |
| WO | WO 2014-012039 | 1/2014 |
| WO | WO 2014-012052 | 1/2014 |
| WO | WO 2014-012072 | 1/2014 |
| WO | WO 2014-012078 | 1/2014 |
| WO | WO 2014-012079 | 1/2014 |
| WO | WO 2014-012080 | 1/2014 |
| WO | WO 2014-035742 | 3/2014 |
| WO | WO 2014-078867 | 5/2014 |
| WO | WO 2014-097309 | 6/2014 |
| WO | WO 2014-107811 | 7/2014 |
| WO | WO 2014-148909 | 9/2014 |
| WO | WO 2014-209441 | 12/2014 |
| WO | WO 2015-074077 | 5/2015 |
| WO | WO 2015-084617 | 6/2015 |
| WO | WO 2015-161233 | 10/2015 |
| WO | WO 2016-069239 | 5/2016 |
| WO | WO 2016-069674 | 5/2016 |
| WO | WO 2016-176350 | 11/2016 |
| WO | WO 2017-074708 | 5/2017 |
| WO | WO 2017-074709 | 5/2017 |
| WO | WO 2017-074817 | 5/2017 |
| WO | WO 2017-189215 | 11/2017 |
| WO | WO 2017-189475 | 11/2017 |
| WO | WO 2017-189681 | 11/2017 |
| WO | WO 2017-189684 | 11/2017 |

OTHER PUBLICATIONS

Bohn, "Insect Aquaplaning: Nepenthes Pitcher Plants Capture Prey with the Peristome, a Fully Wettable Water-Lubricated Anisotropic Surface", Proceedings of the National Academy of Sciences, Sep. 28, 2004, vol. 101, No. 39, pp. 14138-14143.
Bragg, The Form Birefringence of Macromolecules, Acta Cryst. 1953, vol. 6, pp. 865-867.
Cab-O-Sperse Dipersions for Industrial Coatings, Application Guide, Cabot, 2013, 2 pages.
Chhatre, Fluoroalkylated Silicon-Containing Surfaces—Estimation of Solid-Surface Energy, Applied Materials & Interfaces, 2010, vol. 2, No. 12, pp. 3544-3554.
Deltron High Velocity Clearcoat, DC3000, 2006, 4 pages.
Diatomaceous earth, [Online] {retrieved from internet on Jun. 8, 2014}, URL <http:l /en.wikipedia.org/wiki/Diatomaceous earth>, 1 page.
Dow Corning Ultra Hight Molecular Weight Functional Siloxane Additives in Polymers: Effects on Processing and Properties pp. 1-16 2001.
Dow Corning MB50-002 Masterbatch Product Information, Jun. 2, 2014, pp. 1-4.
Douillard et al. "Contact Angles of Water-2-Butoxyethanol System Against Glass Exploration of the Phase Diagram," Advances in Colloid and Interface Science 39 (1992) 225-234.

(56) References Cited

OTHER PUBLICATIONS

DuPont FEP Film Fluorocabon Film, 9 pages.
DuPont FEP Flurorcarbon Film Properties Bulletin, 4 pages.
DuPont Teflon PTFE fluoropolymer resin, 38 pages.
DuPont Zonyl 8857A AntiBlock and Cleanability Additive, 2001, 2 pages.
DuPont Zonyl Fluoroadditives for coatings Technical Information, 2003, 4 pages.
Earlex HV5500 or HV6900 1 qt. PTFE Coated Metal Paint Container, 2015, 2 pages.
Elvacite 1010 Macromonomer, Lucite International Inc., Specialty, Polymers & Resins Ltd, 5 pages.
Estane 5703 TPU, Lubrizol Engineered Polymers, 2014, 1 page.
Gao, "Teflon is Hydrophilic. Comments on Definitions of Hydrophobic, Shear versus Tensile Hydrophobicity, and Wettability Characterization", Langmuir, 2008, vol. 24, No. 17, pp. 9183-9188.
Gao, "Wetting 101," Langmuir, Jul. 2009, vol. 25, No. 24, pp. 14105-14115.
Gelest Inc., "Silane Coupling Agents: Connecting Across Boundaries v. 2.0," 2006, pp. 1-54.
Gemici, Hydrothermal Treatment of Nanoparticle Thin Films for Enhanced Mechanical Durability, Langmuir, 2008, vol. 24, pp. 2168-2177.
Huang, "Omniphobic Slippery Coatings Based on Lubricant-Infused Porous Polyelectrolyte Multilayers", ACS Macro Lett. 2013, vol. 2, pp. 826-829.
Jellinek, "Ice releasing block-copolymer coating", Colloid & Polymer Science, 1978, vol. 256, No. 6, pp. 544-551.
Krumpfer, "Contact angle hysteresis: a different view and a trivial recipe for low hysteresis hydrophobic surfaces", Faraday Discussions, 2010, vol. 146, pp. 103-111.
Li, What do we need for a superhydrophobic surface? A review on the recent progress in the preparation of superhydrophobic surfaces, Chem. Soc. Rev., 2007, vol. 36, pp. 1350-1368.
LiquiGlide Coating for Paint Eliminates a Sticky Problem, 2 pages.
Liquiglide, Videos available on the website <www.liquiglide.com>, Accessed on Jul. 31, 2014, 5 pages.
Liquiglide, "Liquiglide Is Revolutionizing the Way Liquids Move", [retrieved from the internet on Jun. 18, 2018], URL <www.liquiglide.com>, pp. 1-4.
Madani, The aggregation status of nanosilicas and silica fume, used in cementitious mixtures, Third International Conference on Sustainable Construction Materials and Technologies, 10 pages.
Material Safety Data Sheet, Envirobase HP, Sep. 9, 2014, 11 pages.
Material Safety Data Sheet, High Velocity Clearcoat, DC3000, Mar. 15, 2014, 11 pages.
Material Safety Data Sheet, Mid Temp Hardener, DCH3085, Mar. 15, 2014, 10 pages.
Meuler, "Examination of wettability and surface energy in fluorodecyl POSS/polymer blends", Soft Matter, 2011, vol. 7, pp. 10122-10134.
Meuler, Relationships between Water Wettability and Ice Adhesion, 2010, vol. 2, No. 11, pp. 3100-3110.
Norton FEP Fluoropolymer Film, Saint-Gobain Performance Plastics Corporation, 2002, 2 pages.
O'Lenick Jr., "Alkyl Dimethicone", Chapter 10, Silicones for Personal Care, 2nd Edition, pp. 171-175.
Parent, "Anti-Icing and De-Icing Techniques for Wind Turbines: Critical Review", Cold Regions Science and Technology, vol. 65, 2011, pp. 88-96.
Quere, "Non-Sticking Drops", Reports on Progress in physics, Sep. 7, 2005, vol. 68, No. 11, pp. 2495-2532.
Ryan, "Ultra-High-Molecular-Weight Functional Siloxane Additives in Polymer. Effects on Processing and Properties", Journal of Vinyl & Additive Technology, 2000, vol. 06, No. 01, pp. 07-19.
Sacramento Metro AQMD Rule 459 PPG Envirobase High Performance, 2014, 2 pages.
Safety Data Sheet MarFlex 1122 Polyethylene Chevron Phillips Chemical Company LP, Jan. 1, 31, 2015, 10 pages.
Safety Data Sheet, Poly (methyl methacrylate), AlfaAesar A Johnson Matthey Company, May 29, 2015, 4 pages.
Safety Data Sheet, Poly (vinyl chloride), Sigma-Aldrich, Aug. 25, 2015, 8 pages.
Safety Data Sheet, Polystyrene, atactic, Apr. 29, 2015, 4 pages.
Safety Data Sheet, Teflon AF Amorphous Fluoropolymer, 4 pages.
Sayward, "Seeking Low Ice Adhesion", Special Report 79-11; U.S. Army Cold Regions Research and Engineering Laboratory, Hanover, NH, Apr. 1979, 87 pages.
Silazanes—Organosilicon, [Online] [retrieved from internet on Sep. 4, 2014] URL <http: //www.sigmaaldrich.com/chemistry /chemistry-products.html ? TablePage=16245452>, 1 page.
Smith, "Droplet mobility on lubricant-impregnated surfaces+", Soft Matter, 2013, vol. 9, No. 6, pp. 1772-1780.
Styron 685D High Heat Crystal Polystyrene, Product Information, AmSty, Mar. 2014, 2 pages.
Teflon Beaker Liner Pricing, Welch Fluorocarbon Inc., Feb. 24, 2012, 1 page.
Teflon AF Amorphous Fluoropolymer, Version 2.0, DuPont, Oct. 2007, 4 pages.
Teng, Overview of the Development of the Fluoropolymer Industry, Applied Science, 2012, vol. 2, pp. 496-512.
The use of AERODISP fumed silica dispersions to enhance waterborne coatings, Technical Information 1371, EVONIK, 16 pages.
Tuteja, "Robust Omniphobic surfaces", Nov. 25, 2008, vol. 105, No. 47, pp. 18200-18205.
Wong, "Bioinspired Self-Repairing Slippery Surfaces with Pressure-Stable Omniphobicity", Nature, Sep. 22, 2011, vol. 477, pp. 443-447.
Yilgor, Progress in Polymer Science Silicone containing copolymers: Synthesis, properties and applications 2014 1165-1195.
International Search Report and Written Opinion for PCT International Application No. PCT/US2015/054820, dated May 23, 2016, 12 pgs.
International Search Report for PCT International Application No. PCT/US2015/057686 dated Mar. 2, 2016, 6 pages.
International Search Report for PCT International Application No. PCT/US2016/056742, dated Jan. 16, 2017, 5 pages.
International Search Report and Written Opinion for PCT International Application No. PCT/US2016/056749, dated Jan. 12, 2017, 7 pgs.
International Search Report and Written Opinion for PCT International Application No. PCT/US2016/058166, dated Feb. 6, 2017, 17 pgs.
International Search report for PCT International Application No. PCT/US2017/029240 dated Jul. 13, 2017, 5 pages.

SPRAY APPLICATION SYSTEM COMPONENTS COMPRISING A REPELLENT SURFACE AND METHODS

CROSS REFERENCE TO RELATED APPLICATIONS

This application is a continuation of U.S. application Ser. No. 16/451,702, filed Jun. 25, 2019, now allowed, which is a continuation U.S. application Ser. No. 15/306,224, filed Oct. 24, 2016, issued as U.S. Pat. No. 10,391,506, issued Aug. 27, 2019, which is a national stage filing under 35 U.S.C. 371 of PCT/US2015/057686 filed Oct. 28, 2015, which claims benefit of U.S. Provisional Application No. 62/069,512, filed Oct. 28, 2014, the disclosures of which are incorporated by reference in their entirety herein.

BACKGROUND

As described for example in WO98/32539, spray application systems for spraying liquids (e.g. paints, garden chemicals etc.) are generally known. Such systems generally comprise a reservoir to contain a liquid and a spray gun through which the liquid is dispensed. The liquid may be fed from the reservoir under gravity and/or it may be entrained in a stream of pressurized liquid, for example air or water, which is supplied to the gun from an external source.

As also described in WO98/32539 disposable liners have been used with (e.g. re-usable) liquid reservoirs. The liner may aid in disposal of the contents; protect the reservoir or its contents; as well as facilitate or even eliminate the cleaning of the reservoir.

SUMMARY

With current spray (e.g. paint) application systems, a portion of the liquid (e.g. paint) is retained within the liquid reservoir or liner after dispensing the liquid. Depending on the size of the liquid reservoir or liner, the amount of retained paint may range from about ½ to 1 ounce. In the case of relatively expensive liquids, such as colored automobile base coat paints that can cost $3-$6 per sprayable ounce, the cost of such wasted retained (e.g. paint) liquid can be substantial. Thus, industry would find advantage in minimizing the amount of paint or other liquid that is retained on components of spray application systems.

Presently described are components of a spray application system. At least one component comprises a liquid repellent surface (e.g. layer). In some embodiments, the liquid repellent surface comprises a fluoropolymer or a (e.g. non-fluorinated) binder and a fluorochemical material. In another embodiment, the liquid repellent surface (e.g. layer) comprises a porous layer and a lubricant impregnated into pores of the porous layer. The component is typically a liquid reservoir, a liquid reservoir liner, a lid for a liquid reservoir or liner, or a combination thereof. In some embodiments, the component comprises a thermoplastic polymeric material. In some favored embodiments, the component is a removable liquid reservoir or liner. In some favored embodiments, the component is a collapsible liquid reservoir or liner. The spray application system typically further comprises a gravity-fed spray gun.

Also described are spray application systems, methods of using a spray application system, as well as methods of making a component of a spray application system wherein the component has a liquid repellent surface.

The cross-sectional drawings are not to scale.

DETAILED DESCRIPTION

Figure 1:
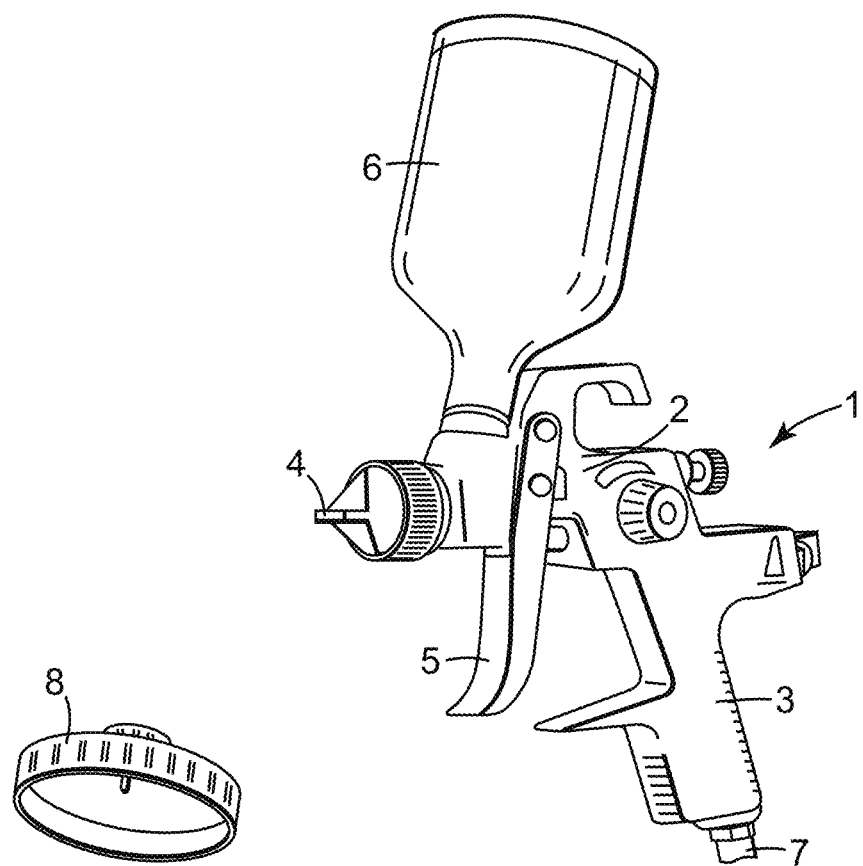
FIG. 1 is a perspective view of a spray application system.

FIG. 1 illustrates an embodied spray application system. The gun 1 comprises a body 2, a handle 3 which extends downwards from the rear end of the body, and a spray nozzle 4 at the front end of the body. The gun is manually-operated by a trigger 5 which is pivotally-mounted on the sides of the gun. The liquid (e.g. paint) reservoir 6 is located on the top of the body 2 and communicates with an internal passageway (not visible) which extends through the gun from a connector 7 at the lower end of the handle 3 to the nozzle 4. During use, liquid (e.g. paint) is provided in reservoir 6. Removable lid 8 is engaged with the open end of (e.g. paint) liquid reservoir 6. Further, connector 7 is connected to a source of compressed air (not shown) so that, when the user pulls on the trigger 5, compressed air is delivered through the gun to nozzle 4 and entrains and atomizes paint being delivered under gravity from liquid reservoir 6. The liquid (e.g. paint) is then discharged through the nozzle 4 with the compressed air, as a spray.

Various spray gun designs can be utilized in the embodied spray application system, such as described for example in U.S. Pat. Nos. 5,582,350; 5,267,693; and EP 0768 921.

Figure 2:
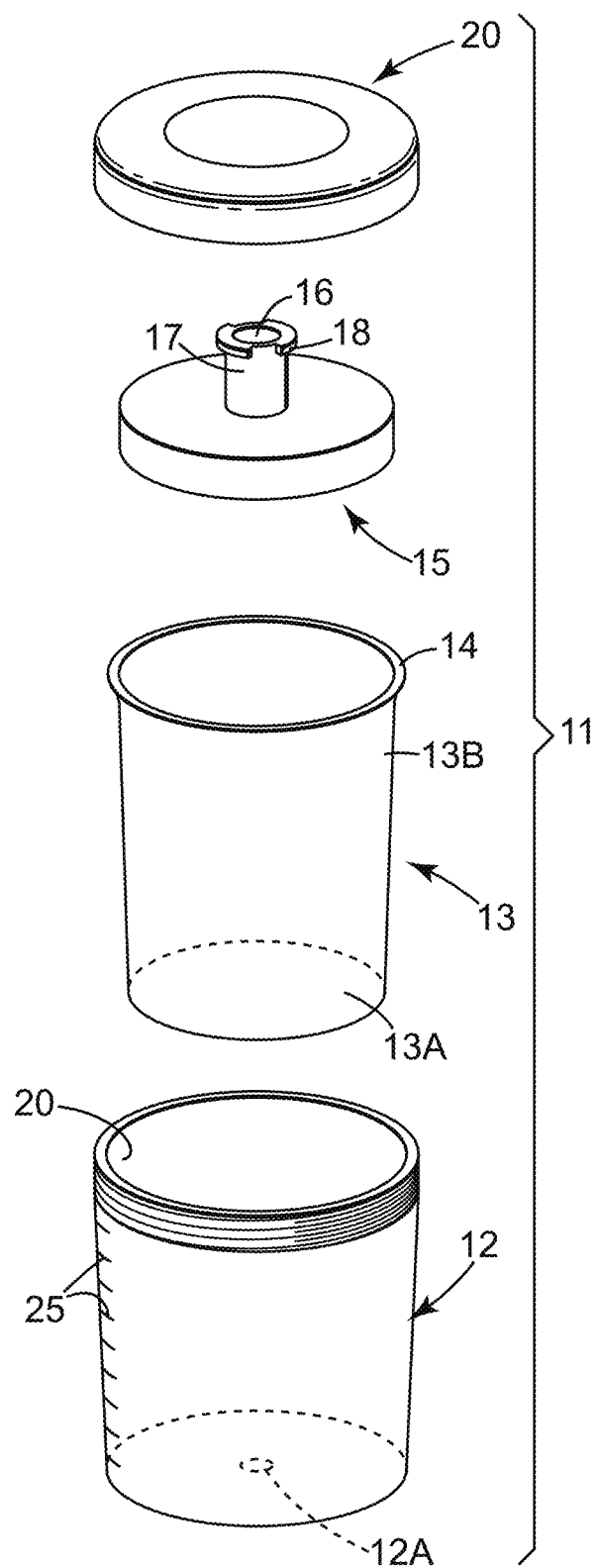
FIG. 2 shows an exploded view of components of a liquid (e.g. paint) reservoir further comprising a liner for the gun of FIG. 1.
Figure 3:
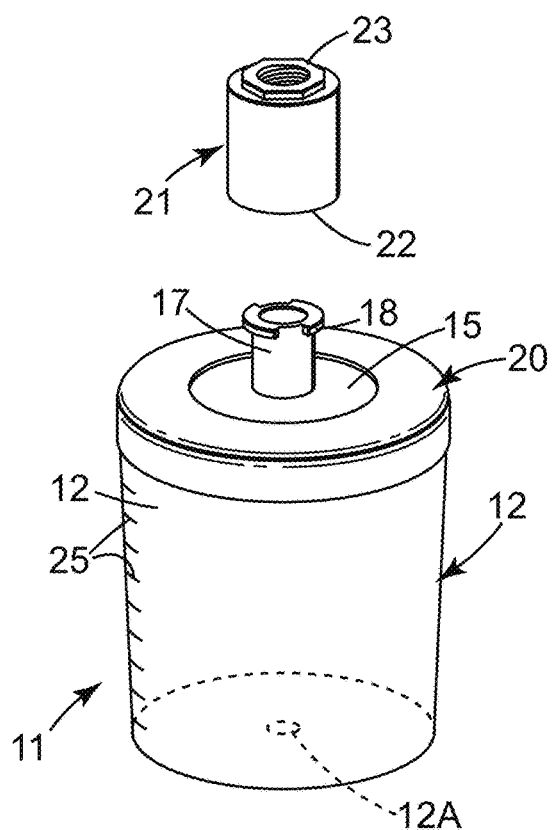
FIG. 3 shows the liquid reservoir of FIG. 2 in an assembled condition, with an adapter 21 for connecting the liquid reservoir to a spray gun.

FIG. 2 illustrates the components of another embodied liquid (e.g. paint) reservoir 11 that can be used with the gun 1 of FIG. 1 (or any similar gun) instead of liquid (e.g. paint) reservoir 6. The liquid (e.g. paint) reservoir 11 comprises an open container 12, of suitable size for attachment to a (e.g. hand-held) spray gun, having an air hole 12A in its base and provided with a liner 13. The liner 13 corresponds in shape to and fits within the interior of container 12. The (e.g. removable) liner may have a narrow rim 14 at the open end that contacts the top edge of the container 12. The container 12 also has a (e.g. disposable) lid 15. Lid 15 typically engages rim 14 of the open end of the liner 13 and is held firmly in place when lid 15 is attached to container 12. The lid can be attached by an annular collar 20 which screws onto the container, such as depicted in FIG. 3.

Liquid reservoir 6 or container 12 of the liquid (e.g. paint) reservoir 11 is typically formed from a self-supporting (e.g. rigid) thermoplastic polymeric material, for example polyethylene or polypropylene, of any suitable size. For use with paint spray guns, containers having a capacity ranging from 100 ml to 1 liter such as a capacity of 250, 500 or 800 ml are common. The lid 15 is also typically formed from a thermoplastic polymeric material, for example, polyethylene or polypropylene. The lid may be transparent, translucent or opaque and may optionally be colored. The collar 20 may be a molded thermoplastic or it may be a machined metal (for example, aluminum). In some embodiments, fluid reservoir 6 and container 12 are formed by injection molding of a thermoplastic polymer.

Liquid reservoir 6, as well as liner 13, are typically also self-supporting but can also be collapsible, i.e. collapses when (e.g. paint) liquid is withdrawn from the liner or liquid (e.g. paint) reservoir during operation of the spray gun. In one embodiment, the liner 13 or liquid (e.g. paint) reservoir 6 have a (e.g. thicker) rigid base 13A and (e.g. thinner) flexible side walls 13B. In this embodiment, the base may have a thickness of about 250 to 400 microns. In contrast, the side walls can range from about 100 to 250 microns and in some embodiments are no greater than 225, 200 or 175 microns. When the liner collapses, it typically collapses in the longitudinal direction by virtue of the side walls collapsing rather than the base. Liner 13 and some embodiments of liquid (e.g. paint) reservoir 6 are preferably formed by thermo/vacuum forming a sheet of thermoplastic material such as low density polyethylene (LDPE). When the liner 13 or liquid (e.g. paint) reservoir 6 is collapsible it can be characterized as a single-use or in other words "disposable" component.

Figure 4:
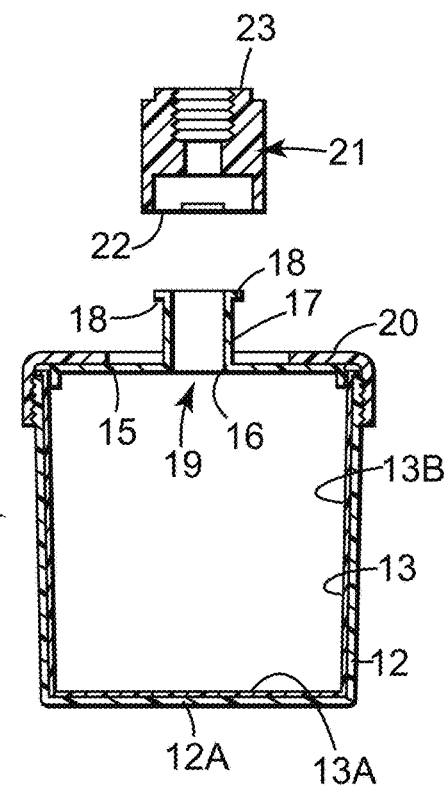
FIG. 4 shows a longitudinal cross-section through the liquid reservoir and the adapter of FIG. 3.

The lid 15 typically include a (e.g. central) aperture 16 from which extends a connector tube 17 provided, at its end, with outward extensions 18 forming one part of a connection, such as a bayonet connection; i.e. a fitting engaged by being pushed into a socket and then twisted to lock in place. The liquid (e.g. paint) reservoir 11 can be attached to the spray gun 1 through the use of an adapter 21 as depicted in FIG. 3 and FIG. 4. The adapter 21 is a tubular component which, at one end 22, is formed internally with the other part of the (e.g. bayonet) connection for attachment to the connector tube 17. The other end 23 of the adapter can be shaped to match the standard attachment of the spray gun (typically a screw thread). The adapter 21 may be a machined metal component and may, for example, be formed from anodized aluminum.

Figure 5:
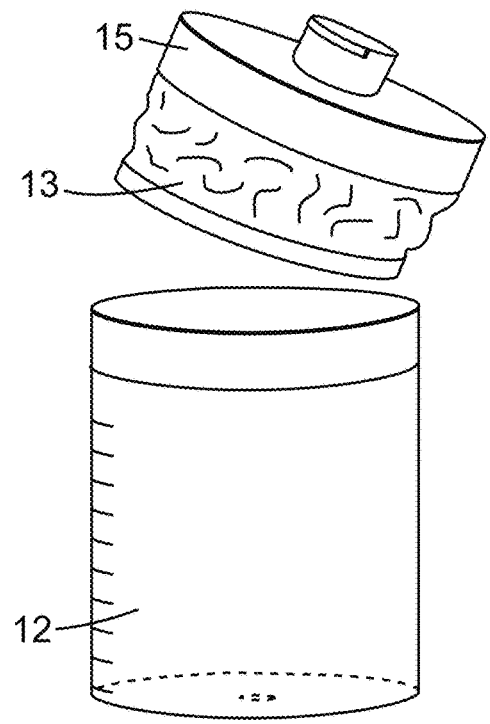
FIG. 5 shows the collapsed liner after the liquid (e.g. paint) has been dispensed from a reservoir or liner.
Figure 6A:
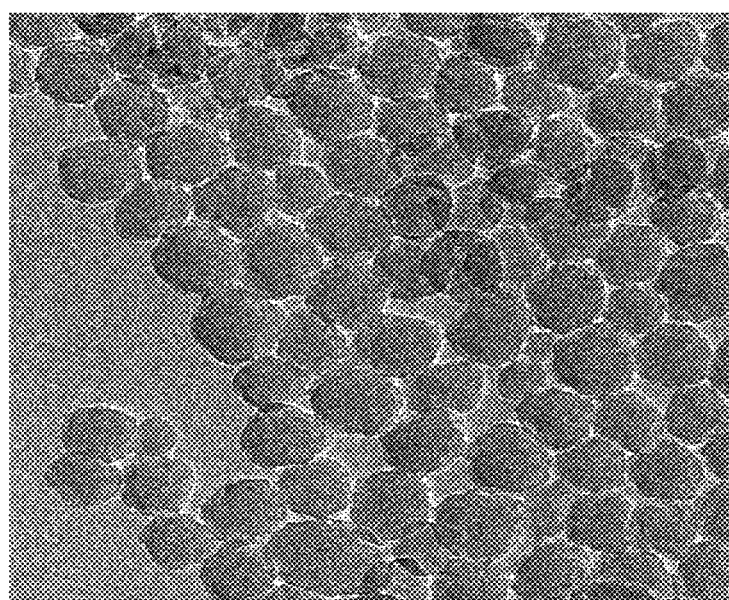
FIG. 6A is a transmission electron micrograph of a surface of a comparative example porous layer formed without sintering of the silica nanoparticles.
Figure 6B:
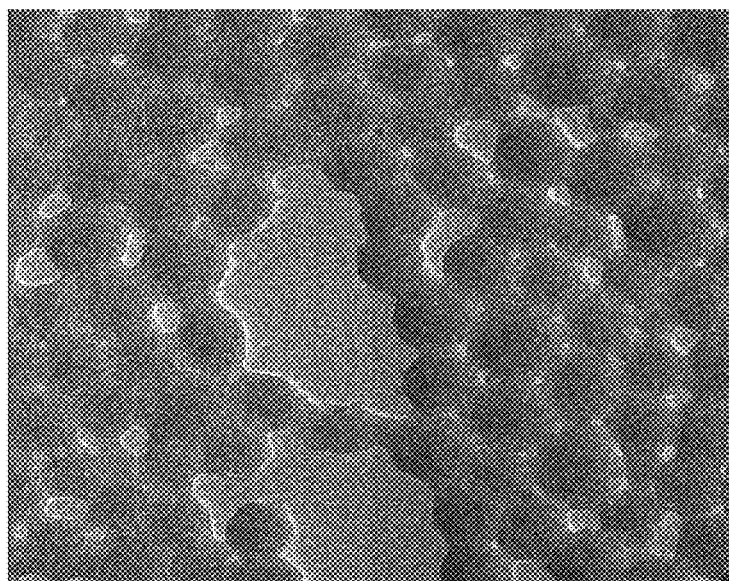
FIG. 6B is a transmission electron micrograph of an exemplary surface of a porous layer comprising sintered silica nanoparticles.

During use of the spray application system, adapter 21 is securely attached (at end 23) to the spray gun. Liner 13 is inserted into container 12. Liquid (e.g. paint) is then put into liner 13, lid 15 is pushed into place, and collar 20 engaged (e.g. screwed down) tightly with container 12 to hold the lid in position. The rim 14 of the liner 13 is typically held in place between lid 15 and container 12 as shown in FIG. 4. As paint is removed from within the liner 13, the sides of the liner collapse as depicted in FIG. 5 as a result of the decreased pressure within the liner. The base of the liner, being more rigid, retains its shape so that the liner tends to collapse in the longitudinal rather than the transverse direction thereby reducing the possibility of pockets of paint being trapped in the liner.

The liner 13 typically has a smooth (e.g. continuous) internal surface, lacking structures that would increase retention of the liquid (e.g. paint). Thus, the liner typically has no discontinuities (projections or indentations) from a planar surface such as pleats, corrugations, seams, joints, gussets, or groove at the internal junction of the side walls 13B with the base 13A. Further, the liner volumetrically coincides with the inside of the container 12.

Liquid (e.g. paint) can be mixed within liner 13 or within liquid (e.g. paint) reservoir 6. To facilitate the use as a mixing receptacle, the side walls of the container 12 or liquid (e.g. paint) reservoir 6 may be provided with markings 25 (FIGS. 2 and 3) enabling the volume of the contents within the container to be determined.

Although fluid reservoir 6, container 12, and liner 13 may be opaque, such components are preferably transparent or translucent such that the liquid can be visually observed through the walls. This can also facilitate using the fluid reservoir 6, or container 12 and liner 13 as a mixing receptacle.

Liquid (e.g. paint) contained in the liquid reservoir 6 or liner 13 it is often mixed by hand. Hand mixing can be beneficial to avoid air entrapment. The inside surfaces of the liquid reservoir 6 or liner 13 are also typically not exposed to high amounts of mixing forces when mixed by hand. However, the side walls of the mixing container may be 'scraped' in order to ensure all of the toners are thoroughly mixed.

In some embodiments, the liners are thermoformed, injection molded, blow molded (or formed using some other plastic processing technique) from materials such as, but not necessarily limited to, low density polyethylene, polypropylene, polyethylene, and/or blends thereof. Suitable liner components are commercially available from 3M Company, St. Paul, Minn. under trade designation "3M PPS PAINT PREPARATION SYSTEM".

To ensure that there are no unwanted particles, the liquid (e.g. paint) typically passes through a (e.g. removable) filter as the (e.g. paint) liquid passes from the liquid reservoir 6 or liner 13 to the spray nozzle during use of the spray application system. Such filter can be positioned at various locations. In one embodiment, aperture 16 is covered by a filter mesh 19 which may be a push fit into the aperture or may be an integral part of the lid 15, as depicted in FIG. 4. In another embodiment, a filter may be provided within liquid reservoir 6, as described and depicted in FIG. 12 of WO 98/32539.

FIGS. 1-7 and 8 and 11 depict examples of illustrative liquid (e.g. paint) reservoirs, liquid reservoir liners, lids for liquid (e.g. paint) reservoirs and liners. Such components may optionally include various other adaptations as known in the art for spray application systems, as described for examples in WO 98/32539.

In the present invention, a component (e.g. a liquid reservoir, a liquid reservoir liner, a lid for a liquid reservoir or liner, or a combination thereof) of a spray application system comprises a liquid repellent surface (e.g. layer). The liquid repellent surface layer may be present on a portion of a surface of at least one of such components or the liquid repellent surface layer may be present on the entire surface that comes in contact with liquid (e.g. paint) during use. Although the exterior surfaces of the liquid reservoir, liner, lid, etc. may comprise the liquid repellent surface layer described herein, in typical embodiments, the interior surface(s) of at least one of such components comprises a liquid repellent surface layer.

Figure 7:
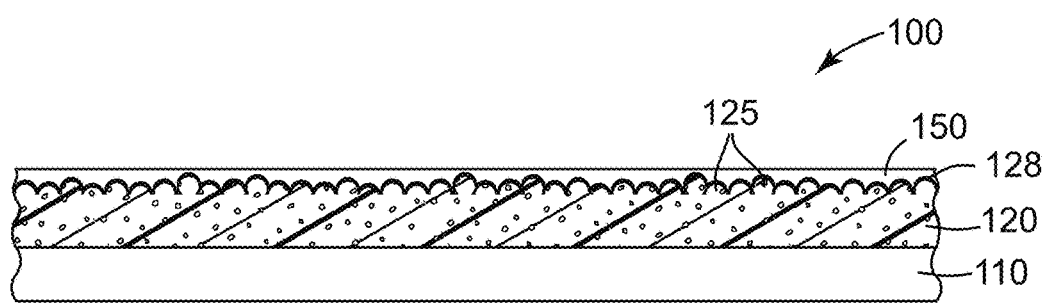
FIG. 7 is a cross-sectional view of an article comprising a repellent coating.

With reference to FIG. 7, article 100 is a component of a spray application system comprising substrate 110 (e.g. a liner, liquid reservoir, or lid), and a liquid (e.g. paint) repellent surface comprising a porous layer 128 disposed on a (e.g. paint or other liquid contacting) surface of the substrate, and a lubricant 150 disposed in pores 125 of the surface treated porous layer. The surface treated porous layer (120 with 128) is positioned between the substrate 110 and the impregnated lubricant 150. However, in some embodiment, portions of the porous layer are evident at the outermost surface surrounded by valleys of lubricant.

In one favored embodiment, the porous layer comprises a plurality of sintered inorganic oxide (e.g. silica) particles 125 arranged to form a porous three-dimensional network. The porous layer comprises a hydrophobic layer 128 disposed on the porous three-dimensional network. The hydrophobic layer is generally disposed on the opposing surface of the porous layer relative to the surface of the porous layer disposed on (e.g. in contact with) the substrate or component of the spray application system. Thus, the porous layer can be considered to have two major surfaces, one major surface disposed on a substrate or component, and the opposing major surface comprising the hydrophobic coating impregnated with lubricant.

In some embodiments, the porous layer includes a porous network of sintered inorganic oxide particles. In typical embodiments, the inorganic oxide particles comprise or consist of silica. However, various other inorganic oxide particles can be used in place of silica or in combination with silica, such as alumina, titania, etc.

The term "nanoparticle" refers to particles that are sub-micron in size. In some embodiments, the nanoparticles have an average particle size, which typically refers to the average longest dimension of the particles, that is no greater than 500 nanometers, no greater than 200 nanometers, no greater than 100 nanometers, no greater than 75 nanometers, no greater than 50 nanometers, no greater than 40 nanometers, no greater than 25 nanometers, no greater than 20 nanometers, no greater than 10 nanometers, or no greater than 5 nanometers.

The average particle size is often determined using transmission electron microscopy but various light scattering methods can be used as well. The average particle size refers to the average particle size of the nanoparticles used to form the porous layer coating. That is, the average particle size refers to the average particle size of the inorganic oxide nanoparticles prior to sintering, such as depicted in FIG. 1A.

In some embodiments, the porous layer comprises thermally sintered inorganic oxide nanoparticles, such as fumed silica. Fumed silica is advantageously lower in cost in comparison to smaller non-aggregated nanoparticles. Fumed silica is commercially available from various suppliers including Evonik, under the trade designation "Aerosil"; Cabot under the trade designation "Cab-O-Sil", and Wacker Chemie-Dow Corning. Fumed silica consists of microscopic droplets of amorphous silica fused into branched, chainlike, three-dimensional secondary aggregate particle. Thus, the fumed silica aggregates comprise sub-particles that are often referred to as primary particles, typically ranging in size from about 5 to 50 nm. Further, the aggregates can agglomerate. Thus, the particle size of the aggregates and agglomerates is considerably larger. For example, the average particle size (of aggregates and agglomerates) is typically greater than 10 microns (without sonication). Further, the average aggregate particle size after 90 seconds of sonication typically ranges from 0.3 to 0.4 microns. The energy of mixing the fumed silica into a liquid medium is generally less than 90 seconds of sonication. Hence, the particle size of fumed silica in the liquid medium and dried coating thereof is surmised to range between the aggregate particle size (e.g. 0.3 to 0.4 microns) and the particle size without sonication (10 microns).

In certain embodiments, bimodal distributions of particle sizes may be used. For example, nanoparticles or particles having an average particle size of at least 150 or 200 nanometers can be used in combination with nanoparticles having an average (non-aggregate) particle size of no greater than 100, 80, 50, 40, 30, 20, or 10 nanometers. The smaller sized sintered nanoparticles can be considered "mortar" for the larger particle size "bricks". The weight ratio of the larger to smaller nanoparticles can be in the range of 2:98 to 98:2, in the range of 5:95 to 95:5, in the range of 10:90 to 90:10, or in the range of 20:80 to 80:20. In this embodiment, the larger sized particles may be fumed silica. The particle size of the larger inorganic oxide particles is typically no greater than 30, 25, 20 or 15 microns. In some embodiments, the porous layer is free of particles having a particle size greater than 10 microns.

The inclusion of larger particles can increase porosity and lower cost. However, the use of larger particles detracts from providing thin, uniform porous layers. Additionally, larger particles may result in the porous layer and repellent coating having a hazy appearance.

In some embodiments, the (e.g. silica) nanoparticles preferably have an average particle size (i.e., longest dimension) that is no greater than 100, 80, 50, 40, 30, 20 or 10 nanometers. In this embodiment, the porous layer may be free of particles having an average particle size greater than 100, 200, 300, 400, or 500 nanometers, such as fumed silica.

The (e.g. silica) inorganic oxide particles used to prepare the porous layer coating compositions can have any desired shape or mixture of shapes. The (e.g. silica) particles can be spherical or non-spherical (i.e., acicular) with any desired aspect ratio. Aspect ratio refers to the ratio of the average longest dimension of the particles to the average shortest dimension of acicular particles. The aspect ratio of acicular (e.g. silica) particles is often at least 2:1, at least 3:1, at least 5:1, or at least 10:1. Some acicular particles are in the shape of rods, ellipsoids, needles, and the like. The shape of the particles can be regular or irregular. The porosity of the coatings can be varied by changing the amount of regular and irregular shaped particles in the composition and/or by changing the amount of spherical and acicular particles in the composition.

For embodiments wherein the (e.g. silica) nanoparticles are spherical, the average diameter is often less than 50 nanometers, less than 40 nanometers, less than 25 nanometers, or less than 20 nanometers. Some nanoparticles can have an even smaller average diameter such as less than 10 nanometers or less than 5 nanometers.

For embodiments wherein the (e.g. silica) nanoparticles are acicular, they often have an average width (smallest dimension) equal to at least 1 nanometer, at least 2 nanometers, or at least 5 nanometers. The average width of acicular (e.g. silica) nanoparticles is often no greater than 25 nanometers, no greater than 20 nanometers, or no greater than 10 nanometers. The acicular nanoparticles can have an average length $D_1$ measured by dynamic light scattering methods that is, for example, at least 40 nanometers, at least 50 nanometers, at least 75 nanometers, or at least 100 nanometers. The average length $D_1$ (e.g., longer dimension) can be up to 200 nanometers, up to 400 nanometers, or up to 500 nanometers. The acicular nanoparticles may have degree of elongation $D_1/D_2$ in a range of 5 to 30, wherein $D_2$ means a diameter in nanometers calculated by the equation $D_2=2720/S$ and S means specific surface area in meters squared per gram ($m^2$/gram) of the nanoparticle, as described in U.S. Pat. No. 5,221,497 (Watanabe et al.).

In some embodiments, the particles (e.g. nanoparticles) typically have an average specific surface area equal to at least 150 m$^2$/gram, at least 200 m$^2$/gram, at least 250 m$^2$/gram, at least 300 m$^2$/gram, or at least 400 m$^2$/gram. In other embodiments, the particles (e.g. nanoparticles) typically have an average specific surface area equal to at least 500 m$^2$/gram, at least 600 m$^2$/gram, or at least 700 m$^2$/gram.

The (e.g. silica) inorganic oxide nanoparticles are typically commercially available in the form of a sol. Some examples of aqueous-based silica sols comprising spherical silica nanoparticles are commercially available under the trade designation LUDOX (e.g., LUDOX SM) from E.I. DuPont de Nemours and Co., Inc. (Wilmington, Del.). Other aqueous-based silica sols are commercially available under the trade designation NYACOL from Nyacol Co. (Ashland, Mass.). Still other aqueous-based silica sols are commercially available under the trade designation NALCO (e.g., NALCO 1115, NALCO 2326, and NALCO 1130) from Ondea Nalco Chemical Co. (Oak Brook, Ill.). Yet other aqueous-based silica sols are commercially available under the trade designation REMASOL (e.g., REMASOL SP30) from Remet Corporation (Utica, N.Y.) and under the trade designation SILCO (e.g., SILCO LI-518) from Silco International Inc (Portland, Oreg.).

Suitable non-spherical (i.e., acicular) inorganic oxide nanoparticles may also be obtained in the form of aqueous-based sol. Some acircular silica nanoparticles sols are available under the trade designation SNOWTEX from Nissan Chemical Industries (Tokyo, Japan). For example, SNOWTEX-UP contains silica nanoparticles having a diameter in the range of about 9 to 15 nanometers with lengths in a range of 40 to 300 nanometers. SNOWTEX-PS-S and SNOWTEX-PS-M have a chain of beads morphology. The SNOWTEX-PS-M particles are about 18 to 25 nanometers in diameter and have lengths of 80 to 150 nanometers. The SNOWTEX-PS-S has a particle diameter of 10-15 nm and a length of 80-120 nm.

The particles in the porous layer are sintered. At least some adjacent inorganic oxide particles tend to have bonds such as inorganic oxide (e.g. silica) "necks" joining them together. Stated differently, at least some adjacent particles tend to be joined (i.e. fused) together forming a three-dimensional porous network. FIG. 1B is a transmission electron micrograph of one example of a porous layer comprising sintered nanoparticles. Since sintering is utilized to bond the particles to each other, the porous layer of the sintered particles typically does not include an organic (e.g. polymeric) binder for the purpose of fixing the particles to the component. Thus, the inorganic oxide content of the sintered porous layer is typically at least 90, 95, 96, 97, 98, 99 or 100 wt-%.

The term "network" refers to a continuous three-dimensional structure formed by linking together inorganic oxide (e.g. silica) particles. The term "continuous" means that the individual particles are linked over a sufficient dimension (e.g. area) such that the porous layer, together with the hydrophobic layer and impregnated lubricant can provide the desired repellency of water or other fluid. In typical embodiments, the porous layer has no gaps or discontinuities in the areas where the sintered porous layer is present on the component. However, some discontinuities or gaps may be present provided that the presence thereof does not detract from the desired repellency properties.

The term "porous" refers to the presence of voids between the individual (e.g. silica) particles within the (e.g. continuous) porous layer coating. The network of (dried) sintered particles has a porosity of 20 to 50 volume percent, 25 to 45 volume percent, or 30 to 40 volume percent. Porosity may be calculated from the refractive index of the porous layer coating according to published procedures such as in W. L. Bragg and A. B. Pippard, *Acta Crystallographica*, 6, 865 (1953). Porosity tends to correlate to the roughness of the surface. In some embodiments, the porosity may be greater than 50 volume percent. Porosity of the surface can often be increased by using (e.g. silica) particles with a larger average particle size or by using a mixture of particles with different shapes.

In some embodiments, the sintered nanoparticles are acid-sintered (e.g. silica) nanoparticles. In this embodiment, the porous layer is prepared from a coating composition that contains an acid having a pKa (H$_2$O) that is less than or equal to 3.5. The use of weaker acids such as those having a pKa greater than 4 (e.g., acetic acid) can result in less uniform coatings. In particular, coating compositions with weaker acids such as acetic acid typically bead up on the surface of a component. The pKa of the acid added to the coating composition is often less than 3, less than 2.5, less than 2, less than 1.5, or less than 1. Useful acids that can be used to adjust the pH of the porous coating composition include both organic and inorganic acids. Example acids include, but are not limited to, oxalic acid, citric acid, $H_2SO_3$, $H_3PO_4$, $CF_3CO_2H$, HCl, HBr, HI, $HBrO_3$, $HNO_3$, $HClO_4$, $H_2SO_4$, $CH_3SO_3H$, $CF_3SO_3H$, $CF_3CO_2H$, and $CH_3SO_2OH$. In many embodiments, the acid is HCl, $HNO_3$, $H_2SO_4$, or $H_3PO_4$. In some embodiments, it is desirable to provide a mixture of an organic and inorganic acid. If commercially available acidic silica sols are used, the addition of a stronger acid can improve the uniformity of the porous layer.

For embodiments wherein the sintered nanoparticles are acid-sintered (e.g. silica) nanoparticles, the coating composition generally contains sufficient acid to provide a pH no greater than 5. The pH is often no greater than 4.5, no greater than 4, no greater than 3.5, or no greater than 3. For example, the pH is often in the range of 2 to 5. In some embodiments, the coating composition can be adjusted to a pH in the range of 5 to 6 after first reducing the pH to less than 5. This pH adjustment can allow the coating of more pH sensitive components.

The porous layer coating composition containing the acidified (e.g. silica) nanoparticles usually is applied to a component surface and then dried. In many embodiments, the porous layer coating composition contains (a) (e.g. silica) nanoparticles having an average particle diameter (i.e., average particle diameter prior to acid-sintering) no greater than 40 nanometers and (b) an acid with a pKa (H$_2$O) that is less than or equal to 3.5. The pH of the porous layer coating composition often is less than or equal to 5 such as in the pH range of 2 to 5.

The acidified (e.g. silica) nanoparticles exhibit a stable appearance when the pH is in the range 2 to 4. Light-scattering measurements have demonstrated that the acidified silica nanoparticles at pH in the range of 2 to 3 and at a concentration of 10 weight percent silica nanoparticles can retain the same size for more than a week or even more than a month. Such acidified porous layer coating compositions are expected to remain stable even longer if the concentration of silica nanoparticles is lower than 10 weight percent.

In other embodiments, the sintered nanoparticles are base sintered (e.g. silica) nanoparticles. In this embodiment, the porous layer can be prepared from a nanoparticle sol having a pH of greater than 8, 8.5, 9, 9.5, or 10 and the sintered nanoparticles may be characterized as base-sintered (e.g. silica) nanoparticles.

Suitable organic bases include but are not limited to, amidines, guanidines (including substituted guanidines such as biguanides), phosphazenes, proazaphosphatranes (also known as Verkade's bases), alkyl ammonium hydroxide, and combinations thereof. Self-protonatable forms of the bases (for example, aminoacids such as arginine) generally are less suitable, as such forms tend to be at least partially self-neutralized. Preferred bases include amidines, guanidines, and combinations thereof.

The organic bases can be used in the curable composition singly (individually) or in the form of mixtures of one or more different bases (including bases from different structural classes). If desired, the base(s) can be present in latent form, for example, in the form of an activatable composition that, upon exposure to heat, generates the base(s) in situ.

Useful amidines include those that can be represented by the following general formula:

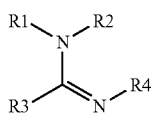

(I)

wherein R1, R2, R3, and R4 are each independently selected from hydrogen, monovalent organic groups, monovalent heteroorganic groups (for example, comprising nitrogen, oxygen, phosphorus, or sulfur in the form of groups or moieties that are bonded through a carbon atom and that do not contain acid functionality such as carboxylic or sulfonic), and combinations thereof; and wherein any two or more of R1, R2, R3, and R4 optionally can be bonded together to form a ring structure (preferably, a five-, six-, or seven-membered ring; more preferably, a six- or seven-membered ring. The organic and heteroorganic groups preferably have from 1 to 20 carbon atoms (more preferably, from 1 to 10 carbon atoms; most preferably, from 1 to 6 carbon atoms).

Amidines comprising at least one ring structure (that is, cyclic amidines) are generally preferred. Cyclic amidines comprising two ring structures (that is, bicyclic amidines) are more preferred.

Representative examples of useful amidine compounds include 1,2-dimethyl-1,4,5,6-tetrahydropyrimidine, 1-ethyl-2-methyl-1,4,5,6-tetrahydropyrimidine, 1,2-diethyl-1,4,5,6-tetrahydropyrimidine, 1-n-propyl-2-methyl-1,4,5,6-tetrahydropyrimidine, 1-isopropyl-2-methyl-1,4,5,6-tetrahydropyrimidine, 1-ethyl-2-n-propyl-1,4,5,6-tetrahydropyrimidine, 1-ethyl-2-isopropyl-1,4,5,6-tetrahydropyrimidine, DBU (that is, 1,8-diazabicyclo[5.4.0]-7-undecene), DBN (that is, 1,5-diazabicyclo[4.3.0]-5-nonene), and the like, and combinations thereof. Preferred amidines include 1,2-dimethyl-1,4,5,6-tetrahydropyrimidine, DBU (that is, 1,8-diazabicyclo[5.4.0]-7-undecene), DBN (that is, 1,5-diazabicyclo[4.3.0]-5-nonene), and combinations thereof, with DBU, DBN, and combinations thereof being more preferred and with DBU being most preferred.

Other useful organic bases are described in WO2013/127054; incorporated herein by reference.

The porous layer is generally prepared by coating an inorganic oxide (e.g. silica) nanoparticle sol on a surface of a component. A sol is a colloidal suspension of the nanoparticles in a continuous liquid medium. Thus, the sol is utilized as a coating composition. The sol typically comprises water or a mixture of water plus a water-miscible organic solvent. Suitable water-miscible organic solvents include, but are not limited to, various alcohols (e.g., ethanol or isopropanol) and glycols (e.g., propylene glycol), ethers (e.g., propylene glycol methyl ether), ketones (e.g., acetone), and esters (e.g., propylene glycol monomethyl ether acetate). The (e.g. silica) nanoparticles included in the porous layer coating compositions typically are not surface modified.

In some embodiments, optional silane coupling agents, that contain a plurality of reactive silyl groups, can be added to the porous layer coating compositions. Some example coupling agents include, but are not limited to, tetraalkoxysilanes (e.g., tetraethylorthosilicate (TEOS)) and oligomeric forms of tetraalkoxysilane such as alkyl polysilicates (e.g., poly(diethoxysiloxane). These coupling agents may, at least in some embodiments, improve binding between silica particles. If added, the coupling agent is typically added to the porous layer coating composition in an amount of 1 to 10 or 1 to 5 weight percent based on the weight of silica particles. However, in typical embodiments, the porous layer (i.e. prior to deposition of the hydrophobic layer) is free of silane coupling agent such as tetraalkoxysilanes (e.g., tetraethylorthosilicate (TEOS)) and oligomeric forms of tetraalkoxysilane such as alkyl polysilicates (e.g., poly(diethoxysiloxane).

The sol coating compositions can be applied directly to any component. The component can be an organic material (e.g., polymeric) or inorganic material (e.g., glass, ceramic, or metal). The surface energy of the component surface may be increased by oxidizing the component surface prior to coating using methods such as corona discharge or flame treatment methods. These methods may also improve adhesion of the porous layer to the component. Other methods capable of increasing the surface energy of the component include the use of primer layers such as thin coatings of polyvinylidene chloride (PVDC). Alternatively, the surface tension of the porous layer coating composition may be decreased by addition of lower alcohols (e.g., alcohols having 1 to 8 carbon atoms, 1 to 6 carbon atoms, or 1 to 4 carbon atoms).

In some embodiments a surfactant may be included in the (e.g. sol) coating composition. Surfactants are molecules having both hydrophilic (polar) and hydrophobic (non-polar) regions and that are capable of reducing the surface tension of the porous layer coating composition. Useful surfactants include anionic surfactants, cationic surfactants, and nonionic surfactants. Various surfactants can be utilized, such as described in US2013/0216820, US2014/0120340 and WO2013/127054; incorporated herein by reference.

When added, the surfactant is typically present in an amount up to 5 weight percent based on a total weight of the porous layer coating composition. For example, the amount can be up to 4 weight percent, up to 2 weight percent, or up to 1 weight percent. The surfactant is typically present in an amount equal to at least 0.001 weight percent, at least 0.005 weight percent, at least 0.01 weight percent, at least 0.05 weight percent, at least 0.1 weight percent, or at least 0.5 weight percent. However, in some embodiments, the porous layer is substantially free of surfactant. Surfactants can interfere with adhesion of the porous layer to the component and/or the hydrophobic layer.

The (e.g. sol) coating compositions are typically applied to the surface of the component using conventional techniques such as, for example, bar coating, roll coating, curtain coating, rotogravure coating, knife coating, spray coating, spin coating, or dip coating techniques. Coating techniques such as bar coating, roll coating, and knife coating are often used to adjust the thickness of the coating composition. The coating compositions can be coated on one or more sides of the component.

The average dry coating thickness of the porous layer is dependent upon the particular porous layer coating composition used. In general, the average thickness of the dry and sintered porous layer is typically at least 25, 30, 35, 40, 45 or 50 nm and often no greater than about 5, 4, 3, 2, or 1 micron. In some embodiments, the thickness is no greater than 500, 400, or 300 nm. In other embodiments, the thickness is no greater than 250, 200, or 100 nm. The thickness can be measured using an ellipsometer such as a Gaertner Scientific Corp. Model No. L115C. The mechanical properties of the porous layer often improve as the thickness is increased.

Although the actual coating thickness can vary considerably from one particular point to another, it is often desirable to apply the porous layer coating composition uniformly over the surface of the component. In some embodiments, it may be desirable to control the average coating thickness within 200 Å, within 150 Å, or within 100 Å. The particle size of the nanoparticles and larger particles affects the ability to achieve a thin, uniform coating. Thus, in some embodiments, the thickness of the coating is greater than the maximum particle size of the nanoparticles and larger particles.

Once applied to the component, the coating composition is typically dried at temperatures in a range from 20° C. to 250° C. In some embodiments, the coating composition is dried at a temperature no greater than 225° C., 200° C., 175° C., 150° C., 125° C. or 100° C. An oven with circulating air or inert gas such as nitrogen is often used for drying purposes. The temperature may be increased further to speed the drying process, but care should be exercised to avoid damage to the component. For inorganic components, the drying temperature can be above 200° C. The dried porous layer refers to the porous layer remaining after the drying process.

After the (e.g. sol) coating composition is applied to the component, a gelled material forms as the sol dries and the (e.g. silica) acidified nanoparticles sinter to form the continuous network. Thus, in this embodiment, the drying temperature is also the temperature at which the sintering occurs. Micrographs reveal the formation of "necks" between adjacent nanoparticles that are created even in the absence of other silicon-containing materials such as the silane coupling agents. The formation of these necks is attributed to the catalytic action of strong acid or strong base in making and breaking siloxane bonds.

Alternatively, for substrates or components having sufficient heat resistance, the inorganic oxide (silica) particles can be thermally sintered, typically at temperatures substantially greater than 200° C. For example it is common to thermally sinter (e.g. silica) particles at temperatures of greater than 300° C., 400° C., or 500° C. ranging up to 1000° C.

The dried porous layer can contain some water such as the amount of water typically associated with equilibrium of the porous layer with the atmospheric moisture present in the environment of the porous layer. This equilibrium amount of water is typically no greater than 5 weight percent, no greater than 3 weight percent, no greater than 2 weight percent, no greater than 1 weight percent, or no greater than 0.5 weight percent based on a total weight of the dried porous layer.

Although a three-dimensional network of sintered inorganic oxide (e.g. silica) particles is a preferred porous layer in view of durability, various other porous layers are also suitable for lubricant impregnation, as described in the art. For example, as described in US2014/0147627; porous layers can alternatively be formed by spraying an emulsion of particles/nanoparticles that assemble into a porous layer upon drying of the solvent. Further, porous layers can also be produced via electrodeposition, mechanical roughening (e.g. abrasive blasting), dry etching, and polymer fiber spinning. In one embodiment, the porous layer is formed by exposing a surface of the component to a solvent (e.g., acetone). For example, the solvent may impart texture by inducing crystallization (e.g., polycarbonate liquid reservoirs may recrystallize when exposed to acetone). In yet another embodiment, the porous layer can be formed from particle/nanoparticles, a solvent, and a polymeric organic binder.

A hydrophobic layer is disposed on a surface of the porous three-dimensional network of the sintered inorganic oxide (e.g. silica) particles. A hydrophobic layer can also be disposed on a surface of the porous layer formed by other methods as just described. This is accomplished by coating a surface of the (e.g. sintered) porous layer with a hydrophobic material The selection of hydrophobic material is typically based on the selection of lubricant. In typical embodiments, the hydrophobic layer comprises a material of the same chemical class as the lubricant. For example, when the hydrophobic layer comprises a fluorinated material (e.g. comprising a fluorinated group), the lubricant is typically a fluorinated liquid. Likewise, when the hydrophobic layer comprises a hydrocarbon material (e.g. comprising a hydrocarbon group), the lubricant is typically a hydrocarbon liquid. Further, when the hydrophobic layer comprises a silane or siloxane material (lacking long chain alkyl groups), the lubricant is typically a silicone fluid.

In some embodiments, the hydrophobic layer may comprise an organic polymeric material such as polydimethylsiloxane or a fluoropolymer composed of tetrafluoroethylene, optionally in combination with hexafluoropropylene and/or vinylidene fluoride.

However, in typical embodiments, the hydrophobic layer is bonded to the porous layer. In this embodiment, the hydrophobic layer comprises a compound having the general formula A-B or A-B-A, wherein A is an inorganic group capable of bonding with the sintered (e.g. silica) particles and B is a hydrophobic group. In some embodiments, A is a reactive silyl group. The (e.g. silane) hydrophobic surface treatment compounds are typically covalently bonded to the porous layer through a —Si—O—Si— bond. Suitable hydrophobic groups include aliphatic or aromatic hydrocarbon groups, fluorinated groups such as polyfluoroether, polyfluoropolyether and perfluoroalkane.

In some embodiments, the silane compound used to form the hydrophobic layer is of Formula (I).

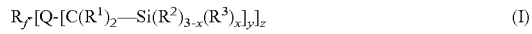

$$R_f\text{-}[Q\text{-}[C(R^1)_2\text{—}Si(R^2)_{3-x}(R^3)_x]_y]_z \qquad (I)$$

In Formula (I), group $R_f$ is a z-valent radical of a perfluoroether, perfluoropolyether, or perfluoroalkane (i.e., $R_f$ is (a) a monovalent or divalent radical of a perfluoroether, (b) a monovalent or divalent radical of a perfluoropolyether, or (c) a monovalent or divalent radical of a perfluoroalkane). Group Q is a single bond, a divalent linking group, or trivalent linking group. Each group IV is independently hydrogen or alkyl. Each group $R^2$ is independently hydroxyl or a hydrolyzable group. Each group $R^3$ is independently a non-hydrolyzable group. The variable x is an integer equal to 0, 1, or 2. The variable y is an integer equal to 1 or 2. The variable z is an integer equal to 1 or 2.

Group $R_f$ is a z-valent radical of a polyether, a z-valent radical of a perfluoropolyether, or a z-valent radical of a perfluoroalkane. As used herein, the term "z-valent radical" refers to a radical having a valence equal to the variable z. Because z is an integer equal to 1 or 2, a z-valent radical is a monovalent or divalent radical. Thus, $R_f$ is (a) a monovalent or divalent radical of a perfluoroether, (b) a monovalent or divalent radical of a perfluoropolyether, or (c) a monovalent or divalent radical of a perfluoroalkane.

If the variable z in Formula (I) is equal to 1, the fluorinated silane is of Formula (Ia) where group $R_f$ is a monovalent group.

  (Ia)

Such a compound can be referred to as a monopodal fluorinated silane because there is a single end group of formula $-Q-[C(R^1)_2-Si(R^2)_{3-x}(R^3)_x]_y$. There can be a single silyl group if the variable y is equal to 1 or two silyl groups if the variable y is equal to 2.

If the variable z in Formula (I) is equal to 2, the fluorinated silane is of Formula (Ib) where group $R_f$ is a divalent group.

$R_f$-$[Q-[C(R^1)_2-Si(R^2)_{3-x}(R^3)_x]_y]_2$ (Ib)

Such a compound can be referred to as a bipodal fluorinated silane because there are two end groups of formula $-Q-[C(R^1)-Si(R^2)_{3-x}(R^3)_x]_y$. Each end group can have a single silyl group if the variable y is equal to 1 or two silyl groups if the variable y is equal to 2. Formula (Ib) can be written as the following equivalent formula that emphasizes the divalent nature of the $R_f$ group.

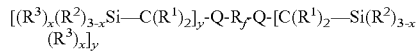

Any suitable perfluorinated group can be used for $R_f$. The perfluorinated group is typically a monovalent or divalent radical of a perfluoroether, perfluoropolyether, or perfluoroalkane. This group can have a single carbon atom but often has at least 2 carbon atoms, at least 4 carbon atoms, at least 6 carbon atoms, at least 8 carbon atoms, or at least 12 carbon atoms. The $R_f$ group often has up to 300 or more carbon atoms, up to 200 carbon atoms, up to 100 carbon atoms, up to 80 carbon atoms, up to 60 carbon atoms, up to 50 carbon atoms, up to 40 carbon atoms, up to 20 carbon atoms, or up to 10 carbon atoms. The $R_f$ group is usually saturated and can be linear, branched, cyclic (e.g., alicyclic), or a combination thereof.

$R_f$ groups that are monovalent or divalent radicals of a perfluoroether or perfluoropolyether often contains at least one perfluorinated unit selected from $-C_bF_{2b}O-$, $-CF(Z)O-$, $-CF(Z)C_bF_{2b}O-$, $-C_bF_{2b}CF(Z)O-$, $-CF_2CF(Z)O-$, or combinations thereof. The variable b is an integer equal to at least 1. For example, the variable b can be an integer in the range of 1 to 10, in the range of 1 to 8, in the range of 1 to 4, or in the range of 1 to 3. The group Z is a perfluoroalkyl, perfluoroalkoxy, perfluoroether, or perfluoropolyether group. Any of these Z groups can be linear, branched, cyclic, or a combination thereof. Example perfluoroalkyl, perfluoralkoxy, perfluoroether, and perfluoropolyether Z groups often have up to 20 carbon atoms, up to 16 carbon atoms, up to 12 carbon atoms, up to 8 carbon atoms, or up to 4 carbon atoms. Perfluoropolyether groups for Z can have, for example, up to 10 oxygen atoms, up to 8 oxygen atoms, up to 6 oxygen atoms, up to 4 oxygen atoms, or up to 3 oxygen atoms. In some embodiments, Z is a $-CF_3$ group.

Monovalent perfluoroether groups are of general formula $R_f^1-O-R_f^2-$ where $R_f^1$ is a perfluoroalkyl and $R_f^2$ is a perfluoroalkylene. $R_f^1$ and $R_f^2$ each independently have at least 1 carbon atom and often have at least 2 carbon atoms, at least 3 carbon atoms, or at least 4 carbon atoms. Groups $R_f^1$ and $R_f^2$ each independently can have up to 50 carbon atoms, up to 40 carbon atoms, up to 30 carbon atoms, up to 25 carbon atoms, up to 20 carbon atoms, up to 16 carbon atoms, up to 12 carbon atoms, up to 10 carbon atoms, up to 8 carbon atoms, up to 4 carbon atoms, or up to 3 carbon atoms. In many embodiments, the perfluoroalkylene groups and/or the perfluoroalkyl groups have 1 to 10 carbon atoms, 1 to 8 carbon atoms, 1 to 6 carbon atoms, 1 to 4 carbon atoms, or 1 to 3 carbon atoms.

Monovalent perfluoroether groups often have a terminal group (i.e., $R_f^1-O-$ group) of formula $C_bF_{2b+1}O-$, $CF_2(Z^1)O-$, $CF_2(Z^1)C_bF_{2b}O-$, $C_bF_{2b+1}CF(Z^1)O-$, or $CF_3CF(Z^1)O-$ where b is the same as defined above. The group $Z^1$ is a perfluoroalkyl having up to 20 carbon atoms, up to 16 carbon atoms, up to 12 carbon atoms, up to 8 carbon atoms, up to 6 carbon atoms, or up to 4 carbon atoms. In some embodiments, $Z^1$ is a $-CF_3$ group. The terminal group is directly bonded to a perfluoroalkylene group. The perfluoroalkylene group can be linear or branched and often has up to 20 carbon atoms, up to 16 carbon atoms, up to 12 carbon atoms, up to 8 carbon atoms, or up to 4 carbon atoms. Specific examples of perfluoroether groups include, but are not limited to, $CF_3CF_2OCF_2CF_2CF_2-$, $CF_3OCF_2CF_2CF_2-$, $C_3F_7OCF_2CF_2CF_2-$, $CF_3CF_2OCF(CF_3)CF_2-$, $CF_3OCF(CF_3)CF_2-$, and $C_3F_7OCF(CF_3)CF_2-$.

Divalent perfluoroether groups are of general formula $-R_f^2-O-R_f^3-$ where $R_f^2$ and $R_f^3$ are each independently a perfluoroalkylene. Each perfluoroalkylene independently has at least 1 carbon atom, at least 2 carbon atoms, at least 3 carbon atoms, or at least 4 carbon atoms. Groups $R_f^2$ and $R_f^3$ each independently can have up to 50 carbon atoms, up to 40 carbon atoms, up to 30 carbon atoms, up to 25 carbon atoms, up to 20 carbon atoms, up to 16 carbon atoms, up to 12 carbon atoms, up to 10 carbon atoms, up to 8 carbon atoms, up to 4 carbon atoms, or up to 3 carbon atoms. In many embodiments, each perfluoroalkylene group has 1 to 10 carbon atoms, 1 to 8 carbon atoms, 1 to 6 carbon atoms, 1 to 4 carbon atoms, 1 to 3 carbon atoms, or 1 to 2 carbon atoms.

Monovalent perfluoropolyether groups are of general formula $R_f^1-O-(R_f^2-O)_a-R_f^3-$ where $R_f^1$ is a perfluoroalkyl, $R_f^2$ and $R_f^3$ are each independently a perfluoroalkylene, and the variable a is an integer equal to at least 1. Groups $R_f^1$, $R_f^2$, and $R_f^3$ are the same as defined above for perfluoroether groups. The variable a is any integer in the range of 1 to 50, in the range of 1 to 40, in the range of 1 to 30, in the range of 1 to 25, in the range of 1 to 20, or in the range of 1 to 10. Monovalent perfluoropolyether groups often have a terminal group (i.e., $R_f^1-O-$ group) of formula $C_bF_{2b+1}O-$, $CF_2(Z)O-$, $CF_2(Z)C_bF_{2b}O-$, $CbF_{2b+1}CF(Z)O-$, or $CF_3CF(Z)O-$ where b and Z are the same as defined above. The terminal group is directly bonded to at least one perfluoroalkyleneoxy or poly(perfluoroalkyleneoxy) group (i.e., $-(R_f^2-O)_a-$ group). Each perfluoroalkyleneoxy group often has 1 to 10 carbon atoms, 1 to 8 carbon atoms, 1 to 6 carbon atoms, 1 to 4 carbon atoms, or 1 to 3 carbon atoms. The perfluoroalkyleneoxy or poly(perfluoroalkyleneoxy) group is directly bonded to a perfluoroalkylene group (i.e., $-R_f^3-$).

Representative examples of useful monovalent perfluoropolyether groups or terminal groups of monovalent perfluoropolyether groups include, but are not limited to, $C_3F_7O(CF(CF_3)CF_2O)_nCF(CF_3)$—, $C_3F_7O(CF(CF_3)CF_2O)_nCF_2CF_2$—, $C_3F_7O(CF_2CF_2CF_2O)_nCF_2CF_2$—, $C_3F_7O(CF_2CF_2CF_2O)_nCF(CF_3)$—, $CF_3O(C_2F_4O)_nCF_2$—, $CF_3O(CF_2O)_m(C_2F_4O)_qCF_2$—, $F(CF_2)_3O(C_3F_6O)_n(CF_2)_3$—, and $CF_3O(CF_2CF(CF_3)O)_n(CF_2O)X$—. The group X is usually —$CF_2$—, —$C_2F_4$—, —$C_3F_6$—, or —$C_4F_8$—. The variable n is an integer that is often in the range of 1 to 50, in the range of 1 to 40, in the range of 1 to 30, in the range of 3 to 30, in the range of 1 to 20, in the range of 3 to 20, in the range of 1 to 10, or in the range of 3 to 10. Provided that the sum (m+q) is equal to at least one, the variables m and q can each independently be in the range of 0 to 50, in the range of 0 to 40, in the range of in the range of 0 to 30, in the range of 1 to 30, in the range of 3 to 20, or in the range of 3 to 10. The sum (m+q) is often in the range of 1 to 50, in the range of 1 to 40, in the range of 1 to 30, in the range of 3 to 20, in the range of 1 to 20, in the range of 3 to 20, in the range of 1 to 10, or in the range of 3 to 10.

Representative examples of divalent perfluoropolyether groups or segments include, but are not limited to, —$CF_2O(CF_2O)_m(C_2F_4O)_qCF_2$—, —$CF_2O(C_2F_4O)_nCF_2$—, —$(CF_2)_3O(C_4F_8O)_n(CF_2)_3$—, —$CF(CF_3)O(CF_2CF_2CF_2O)_nCF_2CF_2$—, —$CF(CF_3)O(CF_2CF_2CF_2O)_nCF(CF_3)$—, —$(CF_2)_3O(C_3F_6O)_n(CF_2)_3$— and —$CF(CF_3)(OCF_2CF(CF_3))_mOC_tF_{2t}O(CF(CF_3)CF_2O)_qCF(CF_3)$—. The variables n, m, and q are the same as defined above. The variable t is an integer in the range of 2 to 8, in the range of 2 to 6, in the range of 2 to 4, or in the range of 3 to 4.

In many embodiments, the perfluoropolyether (whether monovalent or divalent) includes at least one divalent hexafluoropropyleneoxy group (—$CF(CF_3)$—$CF_2O$— or —$CF_2CF_2CF_2O$—). Segments with —$CF(CF_3)$—$CF_2O$— can be obtained through the oligomerization of hexafluoropropylene oxide and can be preferred because of their relatively benign environmental properties. Segments with —$CF_2CF_2CF_2O$— can be obtained by anionic oligomerization of tetrafluorooxetane followed by direct fluorination. Example hexafluoropropyleneoxy groups include, but are not limited to, $C_3F_7O(CF(CF_3)CF_2O)_nCF(CF_3)$—, $C_3F_7O(CF(CF_3)CF_2O)_nCF_2CF_2$—, $C_3F_7O(CF_2CF_2CF_2O)_nCF_2CF_2$—, $C_3F_7O(CF_2CF_2CF_2O)_nCF(CF_3)$—, —$CF(CF_3)O(CF(CF_3)CF_2O)_nCF(CF_3)$—, —$CF(CF_3)O(CF(CF_3)CF_2O)_nCF_2CF_2$—, —$CF(CF_3)O(CF_2CF_2CF_2O)_nCF_2CF_2$—, —$CF(CF_3)O(CF_2CF_2CF_2O)_nCF(CF_3)$—, and —$CF(CF_3)(OCF_2CF(CF_3))_mO C_tF_{2t}O(CF(CF_3)CF_2O)_qCF(CF_3)$—. The variables n, m, q, and t are the same as defined above.

Frequently, the compounds of Formula (I) are present as a mixture of materials having $R_f$ groups of the same basic structure but with a different number of carbon atoms. For example, the compounds of Formula (I) can be a mixture of materials having different variables m, n, and/or q in the above example monovalent and divalent perfluoropolyether groups. As such, the number of repeating groups is often reported as an average number that may not be an integer.

The group Q in Formula (I) is a single covalent bond, a divalent linking group, or a trivalent linking group. If Q is a single bond, the variable y is equal to 1. For compounds of Formula (Ia) with a monovalent $R_f$ group, if Q is a single covalent bond and y is equal to 1, the compounds are of Formula (Ia-1).

$R_f$—C(R$^1$)$_2$—Si(R$^2$)$_{3-x}$(R$^3$)$_x$ (Ia-1)

Similarly, for compounds of Formula (Ib) with a divalent $R_f$ group, if Q is a single covalent bond and y is equal to 1, the compounds are of Formula (Ib-1).

$R_f$—C(R$^1$)$_2$—Si(R$^2$)$_{3-x}$(R$^3$)$_x$ (Ib-1)

If the group Q is a divalent linking group, the variable y is equal to 1. For compounds of Formula (Ia) with a monovalent $R_f$ group, if Q is a divalent group and y is equal to 1, the compounds are of Formula (Ia-2).

$R_f$-Q-C(R$^1$)$_2$—Si(R$^2$)$_{3-x}$(R$^3$)$_x$ (Ia-2)

Similarly, for compounds of Formula (Ib) with a divalent $R_f$ group, if Q is a divalent group and y is equal to 1, the compounds are of Formula (Ib-2).

$R_f$-[Q-C(R$^1$)$_2$—Si(R$^2$)$_{3-x}$(R$^3$)$_x$]$_2$ (Ib-2)

If the group Q is a trivalent linking group, the variable y is usually equal to 2. For compounds of Formula (Ia) with a monovalent $R_f$ group, if Q is a trivalent group and y is equal to 2, the compounds are of Formula (Ia-3). There are two groups of formula —C(R$^1$)$_2$—Si(R$^2$)$_{3-x}$(R$^3$)$_x$, $R_f$-Q-[C(R$^1$)$_2$-Si(R$^2$)$_{3-x}$(R$^3$)$_x$]$_2$ (Ia-3)

Similarly, for compounds of Formula (Ib) with a divalent $R_f$ group, if Q is a trivalent group and y is equal to 2, the compounds are of Formula (Ib-3).

$R_f$-[Q-[C(R$^1$)$_2$—Si(R$^2$)$_{3-x}$(R$^3$)$_x$]$_2$]$_2$ (Ib-3)

Group Q typically includes at least one alkylene group (e.g., an alkylene having 1 to 30 carbon atoms, 1 to 20 carbon atoms, 1 to 12 carbon atoms, 1 to 10 carbon atoms, 1 to 6 carbon atoms, or 1 to 4 carbon atoms) plus optional groups selected from oxy, thio, —NR$^4$—, methine, tertiary nitrogen, quaternary nitrogen, carbonyl, sulfonyl, sulfiryl, carbonyloxy, carbonylthio, carbonylimino, sulfonylimino, oxycarbonyloxy, iminocarbonylimino, oxycarbonylimino, or a combination thereof. Group R$^4$ is hydrogen, alkyl (e.g., an alkyl having 1 to 10 carbon atoms, 1 to 6 carbon atoms, or 1 to 4 carbon atoms), aryl (e.g., an aryl having 6 to 12 carbon atoms such as phenyl or biphenyl), or aralkyl (e.g., an aralkyl having an alkyl group with 1 to 10 carbon atoms, 1 to 6 carbon atoms, or 1 to 4 carbon atoms and an aryl group with 6 to 12 carbon atoms such as phenyl). If the compound of Formula (I) has multiple Q groups, the Q groups can be the same or different. In many embodiments with multiple Q groups, these groups are the same.

In some embodiments, group Q includes an alkylene having at least 1 or at least 2 carbon atoms directly bonded to the —C(R$^1$)— group in Formula (I). The presence of such an alkylene group tends to provide stability against hydrolysis and other chemical transformations such as nucleophilic attack.

Some divalent Q groups are an alkylene group of formula —(CH$_2$)$_k$— where each variable k is independently an integer greater than 1, greater than 2, or greater than 5. For example, k can be an integer in the range of 1 to 30, in the range of 1 to 25, in the range of 1 to 20, in the range of 1 to 15, in the range of 2 to 15, in the range of 2 to 12, in the range of 1 to 10, in the range of 1 to 6, or in the range of 1 to 4. Specific examples include, but are not limited to, —CH$_2$— and —CH$_2$CH$_2$—. Such groups are typical for Q when $R_f$ is a monovalent or divalent radical of a perfluoroalkane.

Some divalent Q groups include a single alkylene group directly bonded to one or more of the optional groups. Such groups can be of formula —(CO)N(R$^4$)—(CH$_2$)$_k$— where the alkylene is bonded to a carbonylimino group, —O(CO)N(R$^4$)—(CH$_2$)$_k$— where the alkylene is bonded to a oxycarbonylimino group, —(CO)S—(CH$_2$)$_k$— where the alkylene is linked to a carbonylthio, or —S(O)$_2$N(R$^4$)—(CH$_2$)$_k$— where the alkylene is linked to a sulfonylimino group. The variable k and the group $R^4$ are the same as described above. Some more specific groups include, for example, —(CO)NH(CH$_2$)$_2$—, or —O(CO)NH(CH$_2$)$_2$—. In these Q groups, the alkylene group is also bonded to the —C(R$^1$)$_2$— group.

Other suitable Q groups are described in US2013/021680; incorporated herein by reference.

Some specific fluorinated silanes where $R_f$ is a monovalent or divalent radical of a perfluoroether or perfluoropolyether are of formula $R_f$—(CO)N(R$^4$)—(CH$_2$)$_k$—CH$_2$—Si(R$^2$)$_3$, of formula $R_f$—[(CO)N(R$^4$)—(CH$_2$)$_k$—CH$_2$—Si(R$^2$)$_3$]$_2$, or a mixture thereof. The variable k is the same as defined above. In some embodiments, k is in the range of 1 to 10, in the range of 1 to 6, or in the range of 1 to 4. Some more particular fluorinated silanes of formula $R_f$—(CO)N(R$^4$)—CH$_2$)$_k$—CH$_2$—Si(R$^2$)$_3$ include, but are not limited to, F(CF(CF$_3$)CF$_2$O)$_a$CF(CF$_3$)—CONHCH$_2$CH$_2$CH$_2$Si(OCH$_3$)$_3$ where a is a variable in a range of 4 to 20 and CF$_3$OC$_2$F$_4$OC$_2$F$_4$OCF$_2$CONHC$_3$H$_6$Si(OEt)$_3$. A more particular example of formula $R_f$—[(CO)N(R$^4$)—(CH$_2$)$_k$—CH$_2$—Si(R$^2$)$_3$]$_2$ is a compound of formula

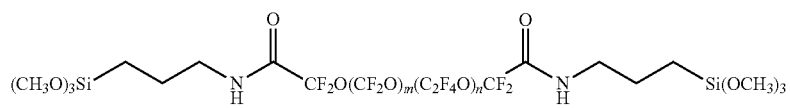

where n and m are each a variable in a range of about 9 to 10.

Some specific fluorinated silanes where $R_f$ is a monovalent or divalent radical of a perfluoroalkane are of formula $R_f$—(CH$_2$)$_k$—CH$_2$—Si(R$^2$)$_3$, or formula $R_f$—[(CH$_2$)$_k$—CH$_2$—Si(R$^2$)$_3$]$_2$, or a mixture thereof. The variable k is the same as defined above. More specific fluorinated silanes are of formula $R_f$—(CH$_2$)$_2$—Si(R$^2$)$_3$, or formula $R_f$—[(CH$_2$)$_2$—Si(R$^2$)$_3$]$_2$, or a mixture thereof.

The above-described fluorinated silane compounds can be synthesized using standard techniques, as described in previously cited US2013/021680.

In some embodiments, the silane compound used to form the hydrophobic layer is of Formula (II).

In Formula (II), group $R^1$ is an aliphatic or aromatic hydrocarbon group. L is a covalent bond or divalent organic linking group such as a urethane group. Each $R^2$ is independently hydroxyl or a hydrolyzable group. Each $R^3$ is independently a non-hydrolyzable group. Each variable x is an integer equal to 0, 1, or 2. The variable y is an integer equal to 1 or 2.

If the variable y in Formula (II) is equal to 1, group $R^1$ is monovalent and Formula (II) is equal to Formula (IIa).

If the variable y in Formula (II) is equal to 2, group $R^1$ is divalent and Formula (II) is equal to Formula (IIb).

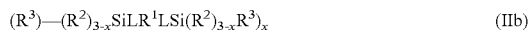

Suitable divalent groups include alkylene, arylene, or a combination thereof.

Each of the described silane compounds has at least one group of formula —Si(R$^2$)$_{3-x}$(R$^3$)$_x$. Each group $R^2$ is independently hydroxyl or a hydrolyzable group. Each group $R^3$ is independently a non-hydrolyzable group. The variable x is an integer equal to 0, 1, or 2. The silane compound has a single silyl group if $R^1$ is monovalent and two silyl groups if $R^1$ is divalent.

In some embodiments, $R^1$ is a (e.g. linear or branched) alkyl or alkylene group having at least 1 carbon atom, at least 2 carbon atoms, at least 3 carbon atoms, at least 4 carbon atoms, or at least 5 carbon atoms and can have, for example, up to 40 carbon atoms, up to 35 carbon atoms, up to 30 carbon atoms, up to 25 carbon atoms, up to 20 carbon atoms, up to 15 carbon atoms, or up to 10 carbon atoms. Suitable aryl and arylene $R^1$ groups often have 6 to 18 carbon atoms, 6 to 12 carbon atoms, or 6 to 10 carbon atoms. Some example aryl groups are phenyl, diphenyl, and naphthyl. Some examples of arylene groups are phenylene, diphenylene, and naphthylene.

Examples silane compounds wherein R' is a hydrocarbon group include, but are not limited to, C$_{10}$H$_{21}$—Si(OC$_2$H$_5$)$_3$, C$_{18}$H$_{37}$—Si(OC$_2$H$_5$)$_3$, C$_{18}$H$_{37}$—Si(C$_1$)$_3$, C$_8$H$_{17}$—Si(C$_1$)$_3$, and CH$_3$—Si(C$_1$)$_3$, (CH$_3$O)$_3$Si—C$_8$H$_{16}$—Si(OCH$_3$)$_3$, (C$_2$H$_5$O)$_3$Si—C$_2$H$_4$—Si(OC$_2$H$_5$)$_3$, (CH$_3$O)$_3$Si—CH$_2$CH(C$_8$H$_{17}$)—Si(OCH$_3$)$_3$,C$_6$H$_5$—Si(OCH$_3$)$_3$, C$_6$H$_5$—Si(Cl)$_3$, C$_{10}$H$_7$—Si(OC$_2$H$_5$)$_3$, and (CH$_3$O)$_3$Si—C$_2$H$_4$—C$_6$H$_4$—C$_2$H$_4$—Si(OCH$_3$)$_3$.

In some embodiments, $R^1$ is a (e.g. linear or branched) alkyl or alkylene group having at least 5, 6, 7, or 8 carbon atoms. Compounds of this type are generally preferred for use with hydrocarbon lubricants. In addition to some of the silane compounds described above, suitable silane compounds include triacontyldimethylchlorosilane and 13-(chlorodimethylsilylmethyl)-heptacosane.

In another embodiment, the hydrophobic compound is the reaction product of a diol comprising an alkylene group, as previously described, and an isocyanto functional alkyl trialkoxy silane. One suitable diol is PRIPOL 2033, depicts as follows:

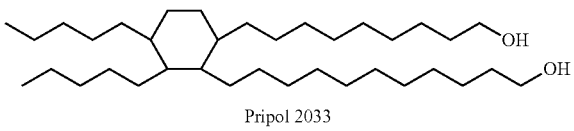 [SMILES: CCCCCC1CCC(CCCCCCCCCO)C(CCCCCCCCCCCO)C1CCCCC]

Pripol 2033

The OH groups of the dimer diol are converted to the group -L[Si(R$^2$)$_{3-x}$(R$^3$)$_x$]$_y$, wherein L is a urethane linkage.

In each group of formula —Si(R$^2$)$_{3-x}$(R$^3$)$_x$, there can be one, two, or three $R^2$ groups. The $R^2$ group is the reaction site for reaction with the sintered (e.g. silica) particles included in the porous layer. That is, the hydrolyzable group or hydroxyl group reacts with the surface of the sintered (e.g. silica) particles to covalently attach the silane compound to the porous layer resulting in the formation of a —Si—O—Si— bond. Suitable hydrolyzable $R^2$ groups include, for example, alkoxy, aryloxy, aralkyloxy, acyloxy, or halo groups. Suitable alkoxy groups often have 1 to 10 carbon atoms, 1 to 6 carbon atoms, 1 to 4 carbon atoms, or 1 to 3 carbon atoms. Suitable aryloxy groups often have 6 to 12 carbon atoms or 6 to 10 carbon atoms such as, for example, phenoxy. Suitable aralkyloxy group often have an alkoxy group with 1 to 10 carbon atoms, 1 to 6 carbon atoms, or 1 to 4 carbon atoms and an aryl group with 6 to 12 carbon atoms or 6 to 10 carbon atoms. An example aralkyloxy group has an alkoxy group with 1 to 4 carbon atoms with a phenyl group covalently attached to the alkoxy group. Suitable halo groups can be chloro, bromo, or iodo but are often chloro. Suitable acyloxy groups are of formula —O(CO)$R^b$ where $R^b$ is alkyl, aryl, or aralkyl. Suitable alkyl $R^b$ groups often have 1 to 10 carbon atoms, 1 to 6 carbon atoms, or 1 to 4 carbon atoms. Suitable aryl $R^b$ groups often have 6 to 12 carbon atoms or 6 to 10 carbon atoms such as, for example, phenyl. Suitable aralkyl $R^b$ groups often have an alkyl group with 1 to 10 carbon atoms, 1 to 6 carbon atoms, or 1 to 4 carbon atoms that is substituted with an aryl having 6 to 12 carbon atoms or 6 to 10 carbon atoms such as, for example, phenyl. When there are multiple $R^2$ groups, they can be the same or different. In many embodiments, each $R^2$ is an alkoxy group or chloro.

If there are fewer than three $R^2$ group in each group of formula, there is at least one $R^3$ group. The $R^3$ group is a non-hydrolyzable group. Many non-hydrolyzable groups are alkyl, aryl, and aralkyl groups. Suitable alkyl groups include those having 1 to 10 carbon atoms, 1 to 6 carbon atoms, or 1 to 4 carbon atoms. Suitable aryl groups often have 6 to 12 carbon atoms or 6 to 10 carbon atoms such as, for example, phenyl or biphenyl. Suitable aralkyl groups often have an alkyl group with 1 to 10 carbon atoms, 1 to 6 carbon atoms, or 1 to 4 carbon atoms substituted with an aryl having 6 to 12 carbon atoms or 6 to 10 carbon atoms such as, for example, phenyl. When there are multiple $R^3$ groups, these groups can be the same or different. In many embodiments, each $R^3$ is an alkyl group.

In some embodiments, a silazane compound is utilized to form the hydrophobic layer. A silazane is a hydride of silicon and nitrogen having a straight or branched chain of silicon and nitrogen atoms joined by covalent bonds. Silazanes are analogous to siloxanes, with —NH-replacing —O—. Suitable silazane compounds include for example hexamethyldisilazane (HMDS); 1,1,3,3-tetramethyldisilazane; 2,2,4,4,6,6-hexamethylcyclotrisilazane; 1,3-diethyl-1,1,3,3-tetramethyldisilazane; and 1,1,3,3-tetramethyl-1,3-diphenyldisilazane.

In the presence of water (e.g. vapor), silazanes form a compound having the formula of Formula (III)

$$R^1[Si(R^2)_{3-x}(R^3)_x]_y \qquad (III)$$

wherein $R^1$ and $R^3$ are independently non-hydrolyzable groups, $R^2$ is hydroxyl, x is 2 and y is 1. In typical embodiments, $R^1$ and $R^3$ are independently hydrogen, $C_1$-$C_4$ alkyl (e.g. methyl, ethyl) or phenyl.

In other embodiments, the hydrophobic material is a silanol-terminated polydimethylsiloxane or hydroxy terminated polydimethylsiloxane.

In some embodiments, the hydrophobic material comprises silane or siloxane compounds comprising $C_1$-$C_4$ alkyl groups that are typically free of longer chain alkyl or alkylene groups in combination with a silicone lubricant.

The hydrophobic materials often can be used in neat form in the surface treatment of the sintered inorganic oxide porous layer. Alternatively, the materials can be mixed with one or more organic solvents and/or one or more other optional components.

Suitable organic solvents include, but are not limited to, aliphatic alcohols such as, for example, methanol, ethanol, and isopropanol; ketones such as, for example, acetone and methyl ethyl ketone; esters such as, for example, ethyl acetate and methyl formate; ethers such as, for example, diethyl ether, diisopropyl ether, methyl t-butyl ether, and dipropylene glycol monomethyl ether (DPM); alkanes such as, for example, heptane, decane, and other paraffinic (i.e., oleofinic) solvents; perfluorinated hydrocarbons such as, for example, perfluorohexane and perfluorooctane; fluorinated hydrocarbons such as, for example, pentafluorobutane; hydrofluoroethers such as, for example, methyl perfluorobutyl ether and ethyl perfluorobutyl ether; and the like; and combinations thereof. Preferred solvents often include aliphatic alcohols, perfluorinated hydrocarbons, fluorinated hydrocarbons, hydrofluoroethers, or combinations thereof. In some embodiments, the surface treatment composition contains aliphatic alcohols, hydrofluoroethers, or combinations thereof. In other embodiments, the hydrocarbon layer coating composition contains hydrofluoroethers or combinations thereof.

Some suitable fluorinated solvents that are commercially available include, for example, those commercially available from 3M Company (Saint Paul, Minn.) under the trade designation 3M NOVEC ENGINEERED FLUID (e.g., 3M NOVEC ENGINEERED FLUID 7100, 7200DL, and 7500).

The hydrophobic coating compositions often contain an amount of the organic solvent that can dissolve or suspend at least about 0.1 percent by weight of the hydrophobic material based on a total weight of the hydrophobic coating composition. In some embodiments, the hydrophobic material (e.g. silane) compound is present in the coating composition at an amount of at least 0.5 percent by weight and no greater than 20, 15, or 10 percent by weight.

The coating composition comprising the hydrophobic (e.g. silane) compound can include other optional compounds. For example, a crosslinker can be added. The crosslinker is typically added when there are multiple silyl groups on the silane compound; as further described in previously cited Riddle et al. US2014/0120340 and US2013/0216820.

After coating a surface of the sintered porous layer with a hydrophobic compound and evaporating any solvent that is present, a lubricant is coated onto the surface treated porous layer of sintered inorganic oxide particles thereby impregnating the lubricant into pores of the surface treated porous layer. By impregnate, it is meant that the pores are saturated with the lubricant. Further, the lubricant is held in place within the pores by surface tension forces, capillary forces, van der Waal forces (e.g., suction), or combinations thereof.

The repellent surface layer of the spray application system component is typically not exposed to forces in excess of the forces that hold the lubricant in place within the pores. Thus, in some embodiments, the repellent surface layer is suitable for liquid (e.g. paint) reservoirs, liners, and lid wherein the liquid (e.g. paint) is mixed within such components in a manner (such as by hand mixing) such that the mixing forces are less than the forces that hold the lubricant within the pores of the porous layer.

The impregnating lubricant may be sprayed or brushed onto the (e.g. surface treated) porous layer. In one embodiment, the lubricant is applied by filling or partially filling a container that includes the component having the (e.g. surface treated) porous layer. The excess impregnating liquid is then removed from the container. Additional methods for impregnating lubricant include spin coating processes and condensing the lubricant onto the (e.g. surface treated) porous layer. The lubricant can also be applied by depositing a solution with the lubricant and one or more volatile liquids (e.g., via any of the previously described methods) and evaporating away the one or more volatile liquids. With any of these methods, the excess lubricant may be mechanically removed (e.g., pushed off the surface with a solid object or fluid), absorbed off of the surface using another porous material, removed via gravity or centrifugal forces or removed by utilizing a wash liquid (e.g., water or paint) to remove excess lubricant.

The lubricant is generally a liquid at the use temperature of the coated component. Although environmental use temperatures can range from −40° C. to 45° C., use temperatures most commonly range from 40° F. to 120° F. In typical embodiments, the lubricant is a liquid at room temperature (e.g. 25° C.). In typically embodiments, a single lubricant is utilized. However, a mixture of lubricants can also be used, especially mixtures within the same chemical class.

By "liquid" it is meant that the lubricant has a dynamic (shear) viscosity of at least about 0.1, 0.5, or 1 mPas and no greater than $10^7$ mPas at the use temperature. In typical embodiments, the dynamic viscosity is no greater than $10^6$, $10^5$, $10^4$, or $10^3$ mPas. The dynamic viscosity values described herein refer to those measured at a shear rate of 1 sec$^{-1}$.

The lubricant generally has no solubility or only trace solubility with water, e.g., a solubility of 0.01 g/l or 0.001 g/l or less.

In some embodiments, the surface tension at the boundary of the lubricant is preferably <50 mN/m, in particular is in the range from 5 to 45 mN/m, and specifically is in the range from 10 to 40 mN/m at 20° C., in particular when the liquid that is being repelled from the surface is an aqueous liquid.

In some embodiments, the lubricant is a hydrocarbon fluid. Suitable lubricants include low-molecular-weight hydrocarbons such as saturated hydrocarbons having at least 8 carbon atoms, preferably at least 10 carbon atoms, in particular from 10 to about 20 carbon atoms, e.g. octanes, nonanes, decanes, decalins, undecanes, dodecanes, tetradecanes, and hexadecane.

In some embodiments, the lubricant is a branched $C_3$-$C_{50}$ hydrocarbon, such as polyisobutenes or mineral oil. Depending on the molecular weight and branching, such materials may be liquids, high-viscosity liquids, or solids.

The hydrocarbon lubricant can optionally comprise substituents such as in the case of alkanols and diols having at least 8 carbon atoms, preferably at least 10 carbon atoms, e.g. 3-octanol, 1-decanol, 2-decanol, undecanols, dodecanols, tridecanols, 2-hexadecanol, 2-hexyldecanol, and 2-octyl-1-dodecanol.

In some embodiments, the lubricant is a fluorinated fluid such as perfluorohydrocarbons (also referred to as perfluoroalkanes), polyfluoroethers, and polyfluropolyethers. Perfluorohydrocarbons typically have at least 8 carbon atoms, preferably at least 10 carbon atoms, in particular from 10 to 40 carbon atoms, e.g. perfluorodecalins, perfluoroeicosanes, and perfluorotetracosanes. Suitable perfluoropolyethers are available from DuPont as the trade designation KRYTOX. Other suitable perfluoropolyethers are available from Sigma-Aldrich, ranging in molecular weight from about 1500 to about 3500 amu, such as available under the trade designation FOMBLIN Y.

Other suitable lubricants include silicone fluids. The silicones are generally linear, branched, or cyclic polydimethylsiloxanes, or polymethylhydrosiloxanes. These may have various organic end-groups or side-chains. Silicone lubricants are commercially available from Rhodia, Gelest, and Fischer Scientific.

The method of making an article as described herein generally comprises providing a component, forming a surface treated porous layer on a surface of the component, wherein the porous layer comprises sintered inorganic oxide (e.g. silica) particles and impregnating a lubricant into pores of the surface treated porous layer. The method of forming the surface treated porous layer typically comprises coating a plurality of inorganic oxide particles dispersed in a liquid medium onto a surface of the component. Such coating is also referred to herein as a sol. The sintering of the inorganic oxide nanoparticles can occur during drying of the sol when the sol contains a strong acid or base or the inorganic oxide particles can be thermally sintered, as previously described. After sintering, the porous layer contains a plurality of sintered particles arranged to form a (e.g. continuous) three-dimensional network.

The hydrophobic compound can also be dispersed in a liquid medium (e.g. aqueous and/or organic solvent) and applied to the porous layer as a coating composition. The hydrophobic coating composition can be applied to the porous layer using any suitable application method. The application method often involves forming a coating layer by dip coating, spin coating, spray coating, wiping, roll coating, brushing, spreading, flow coating, or the like, or combinations thereof. Alternatively the hydrophobic compound can be applied to the porous layer via vapor deposition.

The hydrophobic coating composition is typically applied to the porous layer at room temperature (typically in a range of 15° C. to 30° C. or in a range of 20° C. to 25° C.). Alternatively, the porous layer can be preheated at an elevated temperature such as, for example, in a range of 40° C. to 200° C., in a range of 50° C. to 175° C., or in a range of 60° C. to 150° C. before application of the hydrophobic coating composition. The resulting coating can be dried and then cured at ambient temperature (for example, in the range of 15° C. to 30° C. or in the range of 20° C. to 25° C.) or at an elevated temperature (for example, in the range of 40° C. to 200° C., in the range of 50° C. to 175° C., or in the range of 50° C. to 100° C.) for a time sufficient for the curing to take place.

Typically, the hydrophobic layer coating is applied to the porous layer on the component such that after curing, a hydrophobic layer is formed over the porous layer. That is, the porous layer is positioned between the component and the hydrophobic layer. The hydrophobic layer can be a monolayer or greater than a monolayer in thickness. When greater than a monolayer in thickness, the hydrophobic layer is typically a small fraction of the total thickness and may generally range from a few nanometers to 50, 75 or 100 nm.

In some embodiments, the method further comprises bonding the hydrophobic compound to the porous layer by reacting a surface of the sintered (e.g. silica) particles in the porous layer with a silane compound. The silane compound contains both a reactive silyl group and a hydrophobic group.

After application to the porous layer, the hydrophobic coating composition can be dried and cured by exposure to heat and/or moisture. Curing attaches the silane compound to the porous layer. Curing results in the formation of the —Si—O—Si— bond between the silane compound and the sintered (e.g. silica) particles in the porous layer. The resulting hydrophobic layer is attached to the component through the porous layer.

If a crosslinker is included in the coating composition, these materials can react with any remaining reactive silyl groups on the silane compound. Moisture cure can be affected at temperatures ranging from room temperature (for example, 20° C. to 25° C.) up to about 80° C. or more. Moisture curing times can range from a few minutes (for example, at the higher temperatures such as 80° C. or higher) to hours (for example, at the lower temperatures such as at or near room temperature).

For the attachment of the silane compound to the porous layer, sufficient water typically can be present to cause hydrolysis of the hydrolyzable groups described above, so that condensation to form —Si—O—Si— groups can occur (and thereby curing can be achieved). The water can be, for example, present in the hydrocarbon layer coating composition, adsorbed on the component surface, or in the ambient atmosphere. Typically, sufficient water can be present if the coating method is carried out at room temperature in an atmosphere containing water (for example, an atmosphere having a relative humidity of about 30 percent to about 50 percent). The silane compound can undergo chemical reaction with the surface of the acid-sintered (e.g. silica) particles in the porous layer to form a hydrophobic layer.

When the liquid (e.g. paint) repellent surface comprises a lubricant impregnated into pores of a porous layer as just described, the outer exposed surface is predominantly liquid lubricant. Some structures of the porous layer may protrude through the liquid lubricant and be present at the outer exposed surface. However, the outer exposed surface is predominantly liquid lubricant. In this embodiment, typically at least 50, 55, 60, 65, 70, 75, 80, 85, 90, 95% or greater of the surface area is a liquid lubricant, as can be determined by microscopy. Thus, the aqueous liquid (e.g. paint) that is being repelled comes in contact with and is repelled by the liquid lubricant.

In other embodiments, the liquid (e.g. paint) repellent surface of the spray application system component is not a lubricant impregnated surface. Rather the outer exposed surface is predominantly a solid liquid (e.g. paint) repellent material. In this embodiment, less than 50, 45, 40, 35, 30, 25, 20, 15, 10, 5, 4, 3, 2, 1, 0.5, 0.1, 0.005, 0.001% of the surface area is a liquid lubricant. Rather, at least 50, 55, 60, 65, 70, 75, 80, 85, 90, 95, 96, 97, 98, 99, 99.5% or greater of the outer exposed surface is a solid liquid-repellent material. Thus, the aqueous liquid (e.g. paint) that is being repelled comes in contact with and is repelled by the solid liquid-repellent material.

The solid liquid (e.g. paint) repellent material is generally a solid at the use temperature of the spray application system component, which commonly ranges from 40° F. to 120° F. In typical embodiments, the solid liquid (e.g. paint) repellent material is a solid at room temperature (e.g. 25° C.). In typical embodiments, a single solid liquid (e.g. paint) repellent material is utilized. However, when the liquid repellent surface is provided by a coating composition, the coating composition may contain a mixture of solid liquid (e.g. paint) repellent materials.

Figure 8:
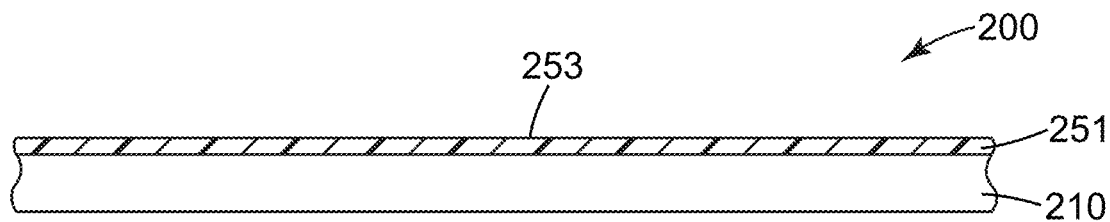
FIG. 8 is cross-sectional view of another embodiment of an article comprising a liquid repellent surface.

With reference to FIG. 8, article 200 is a component of a spray application system comprising substrate or component 210 (e.g. a liner, liquid reservoir, or lid) comprising a liquid (e.g. paint) repellent surface 253 that comprises a (e.g. non-fluorinated) organic polymeric binder and a fluorochemical material. The concentration of fluorochemical material at the outer exposed surface (e.g. layer) 253 is typically higher than the concentration of fluorochemical material within the (e.g. non-fluorinated) organic polymeric binder layer 251 proximate substrate 210. In one embodiment, the liquid (e.g. paint) repellent surface (e.g. layer) can be provided by coating substrate 210 with a coating composition comprising an organic solvent, a (e.g. non-fluorinated) organic polymeric binder, and a fluorochemical material, such as a fluorochemical compound; as will subsequently be described.

Figure 9:
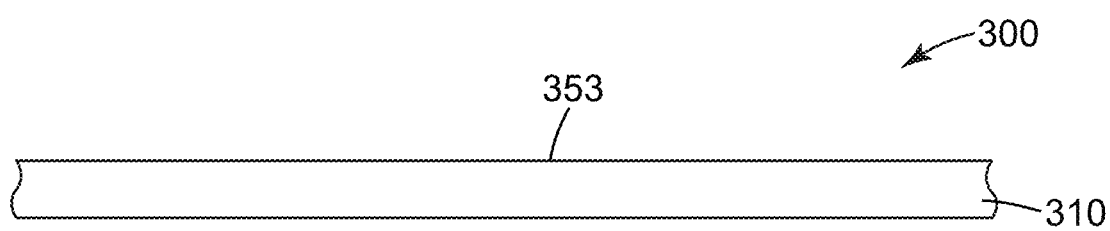
FIG. 9 is cross-sectional view of another embodiment of an article comprising a liquid repellent surface.

With reference to FIG. 9, article 300 is a component of a spray application system comprising substrate or component 310 (e.g. a liner, liquid reservoir, or lid) comprising a liquid (e.g. paint) repellent surface (e.g. layer) 353 that comprises a fluorochemical material. The concentration of fluorochemical material at the outer exposed surface (e.g. layer) 353 is typically higher than the concentration of fluorochemical material proximate the center of the substrate 310. In one embodiment, the liquid (e.g. paint) repellent surface 353 can be provided by including a fluorochemical material, such as a fluorochemical compound, as a melt additive in a polymeric material that is thermal processed to form substrate 310 into a component such as a liner, liquid reservoir, or lid.

Figure 10:
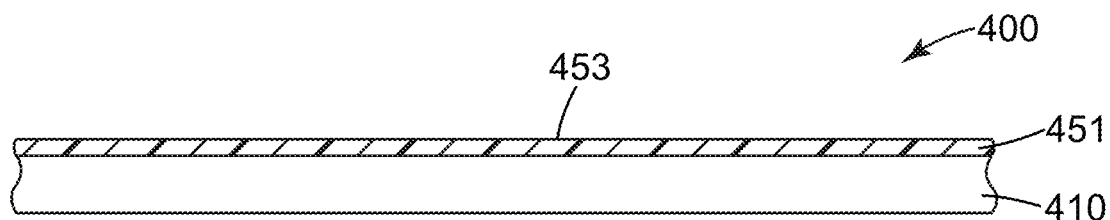
FIG. 10 is cross-sectional view of another embodiment of an article comprising a liquid repellent surface.

With reference to FIG. 10, article 400 is a component of a spray application system comprising substrate or component 410 (e.g. a liner, liquid reservoir, or lid) comprising a liquid (e.g. paint) repellent surface 453 that comprises a fluoropolymer layer 451. In one embodiment, the liquid (e.g. paint) repellent surface 453 can be provided by coating substrate 410 with a coating composition comprising an organic solvent and a fluoropolymer; as will subsequently be described. The fluorine content is typically the same throughout the thickness of the fluoropolymer layer. In another embodiment, the liquid (e.g. paint) repellent surface 453 can be provided by coextruding substrate 410 together with a fluoropolymer layer 451 into a sheet and thermal processing the sheet into a liner, liquid reservoir, or lid.

Figure 11:
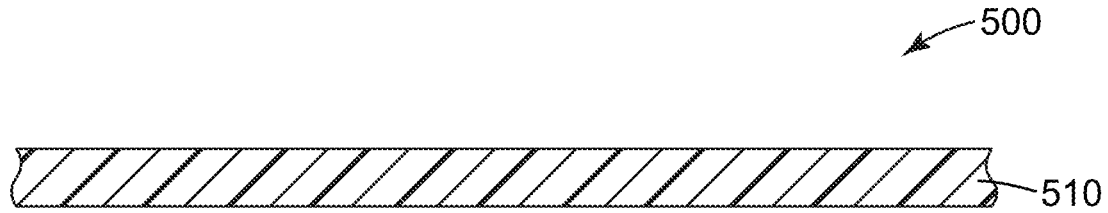
FIG. 11 is cross-sectional view of another embodiment of an article comprising a liquid repellent surface.

With reference to FIG. 11, article 500 is a substrate or component 510 of a spray application system such as a liner, liquid reservoir, or lid, comprising a fluoropolymer. The fluorine content is typically the same throughout the thickness of the component. The interior and exterior surface of the component typically comprise fluoropolymer. In one embodiment, the liquid (e.g. paint) repellent surface can be provided by thermal processing a fluoropolymer into a component such as a liner, liquid reservoir, or lid.

In some embodiments, the (e.g. fluorinated) solid material of the liquid-repellent surface is a fluoropolymer.

One commonly known class of fluoropolymer is Teflon™ PTFE resin or in other words polytetrafluoroethylene polymers prepared by the polymerization of the monomer tetrafluoroethylene ("TFE" having the structure $CF_2=CF_2$). Teflon™ PTFE resins are described as crystalline materials. Crystalline PTFE resins typically have a density of about 2.2 g/cm$^3$.

It has been found that Teflon™ PTFE does not provide a liquid repellent surface such that the receding contact angle with water is at least 90 degrees and/or difference between the advancing contact angle and the receding contact angle of the surface with water is less than 10. Further, Teflon™ PTFE also does not provide an (e.g. aqueous) paint repellent surface (as determined by the test methods set forth in the examples.)

However, the applicant has found that other fluoropolymers, such as copolymers of TFE can provide a liquid repellent surface such that the difference between the advancing contact angle and the receding contact angle of the surface with water is less than 10 and can provide an (e.g. aqueous) paint repellent surface. Copolymer of TFE comprises polymerized units of TFE and at least one other comonomer. Thus, copolymers include terpolymers.

One suitable fluoropolymer that has been found to provide the desired liquid (e.g. paint) repellency as described herein may be characterized as an amorphous fluoroplastic. Such fluoropolymer is a copolymer comprising polymerized units of TFE and polymerized units of a heterocyclic fluorocarbon monomer. The heterocyclic fluorocarbon monomer typically comprises oxygen atoms, such as in the case of dioxole monomers. In one embodiment, the amorphous fluoropolymer is a copolymer of tetrafluoroethylene and a perfluoroalkyl dioxole such as perfluoro-2,2-dimethyl-1,3-dioxole (PDD) commercially available from Dupont as the trade designation Teflon™ AF depicted as follows:

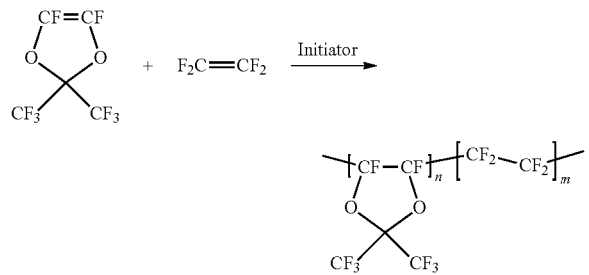

wherein n is the number of polymerized units of perfluoroalkyl dioxole, and m is the number of polymerized units of TFE. This amorphous fluoropolymer has a density less than crystalline PTFE. The density is typically less than 2.1, 2.0, 1.9, or 1.8 g/cm³. In some embodiments, the density is at least 1.65, 1.66, or 1.67 g/cm³ ranging up to 1.75, 1.76, 1.77, or 1.78 g/cm³.

Another suitable fluoropolymer that has been found to provide the desired liquid (e.g. paint) repellency as described herein is a copolymer of tetrafluoroethylene and hexafluoropropylene ("HFP" having the structure $CF_2=CF-CF_3$). Such fluoropolymer is also described as fluorinated ethylene propylene (FEP). FEP has the following general formula,

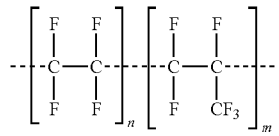

wherein n is the number of polymerized units of TFE, and m is the number of polymerized units of HFP. The amount of fluorinated propylene is typically at least 1, 2, 3, 4, or 5 wt.-% and can range up to 10, 11, 12, 13, 14, 15, 16, 17, 18, 19, or 20 wt.-%.

FEP is typically melt-processable using conventional injection molding and screw extrusion techniques. This fluoropolymer has a melt point of at least 250, 255, or 260° C. ranging up to 280° C. and a density ranging from at least 2.10 or 2.5 up to 2.20 g/cm³. In typical embodiments, the density is less than crystalline PTFE, i.e. no greater than 2.17 or 2.18 g/cm³. Fluorinated ethylene propylene is sold under the tradenames "TEFLON FEP" from Dupont and "NEOFLON FEP" from Daikin.

Other fluoropolymer copolymers of TFE further comprise hydrogen and specifically —$CH_2$— groups. For example, some fluoropolymers are prepared by the copolymerization of tetrafluoroethylene TFE, HFP, and vinylidene fluoride ("VDF" having the structure $CH_2=CF_2$). Such copolymers can be represented by the following formula:

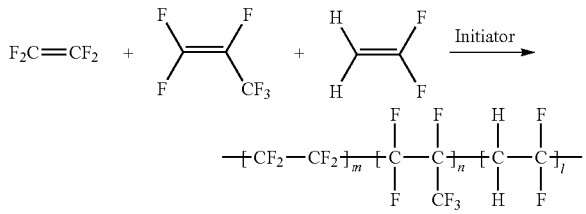

wherein m is the number of polymerized units of TFE, n is the number of polymerized units of HFP, and l is the number of polymerized units of VDF.

However, it has been found that when the number of polymerized units of VDF is 19 mol %, such TFE copolymer does not provide the desired liquid (e.g. paint) repellency properties as described herein. Hence, such tetrafluoroethylene copolymer generally comprises less than 18, 17, 16, 15, 14, 13, 12, 11 10, 9, 8, 7, 6, 5, 4, 3, 2 or 1 mole % of polymerized units of VDF.

In other embodiments, the (e.g. paint) liquid repellent surface comprises a fluorochemical material and a (e.g. non-fluorinated) organic polymeric binder. In typical embodiments, a major amount of non-fluorinated polymeric binder is combined with a sufficient amount of fluorochemical material that provides the desired repellency properties, as previously described.

In typical embodiments, the amount of fluorochemical material is at least about 0.05, 0.1, 0.25, 0.5, 1.5, 2.0 or 2.5 wt.-% and in some embodiments, at least about 3.0, 3.5, 4.0, 4.5 or 5 wt.-%. The amount of fluorochemical material is typically no greater than 50, 45, 40, 35, 30, 25, 20 or 15 wt.-% of the sum of the fluorochemical material and non-fluorinated polymeric binder. Thus, the fluorine content of such fluorochemical material-containing polymeric materials is significantly less than the previously described fluoropolymers. It is a surprising result that low fluorine content polymeric materials can provide comparable or improved liquid (e.g. paint) repellency to that of fluoropolymers having a substantially higher fluorine content.

In some embodiments, the fluorochemical material comprises a compound or a mixture of compounds represented by the following Formula IV:

($R_f$-L-P)$_n$A $R_f$ is a fluorinated group;
L is independently an organic divalent linking group;
P is independently a catenary, divalent heteroatom-containing a carbonyl moiety;
A is hydrocarbon moiety;
and n typically ranges from 1 to 3.

In some embodiments, n is preferably 2. When the fluorochemical material comprises a mixture of compounds, the concentration by weight of the fluorochemical compound wherein n is 2 is typically greater than each of the fractions wherein n is not 2 (e.g. n=1 or n=3). Further, the concentration wherein n is 2 is typically at least 50%, 55%, 60%, 65%, 70%, 75%, 80%, 85%, 90%, or 95% by weight or greater of the mixture of compounds. In other embodiments, the fluorinated material can be a single compound wherein n=2.

The fluorinated group, $R_f$, is typically a fluoroalkyl group that contains at least 3 or 4 carbon atoms and typically no greater than 12, 8, or 6 carbon atoms. The fluoroalkyl group can be straight chain, branched chain, cyclic or combinations thereof. In typical embodiments, the fluoroalkyl group is preferably free of olefinic unsaturation. In some embodiments, each terminal fluorinated group contains at least 50, 55, 60, 65, or 70% to 78% fluorine by weight. Such terminal groups are typically perfluorinated. In some embodiments, $R_f$ is $CF_3(CF_2)_3$— or in other words $C_4F_9$— for at least 50%, 55%, 60%, 65%, 70%, 75%, 80%, 85%, 90%, or 95% by weight or greater of the mixture of compounds. In other embodiments, the fluorinated material can be a single compound wherein $R_f$ is $CF_3(CF_2)_3$—.

The organic divalent linking group, L, can be a covalent bond, a heteroatom (e.g., O or S), or an organic moiety. The organic divalent linking group typically contains no greater than 20 carbon atoms, and optionally contains oxygen-, nitrogen-, or sulfur-containing groups or a combination thereof. L is typically free of active hydrogen atoms. Examples of L moieties include straight chain, branched Suitable unsaturated fatty acids include for example-palmitoleic acid, linoleic acid, linolenic acid, oleic acid, rinoleic acid, gadoleic acid, eracic acid or mixtures thereof. Polymerized fatty acids can contain a higher number of carbon atoms such that the fluorochemical material averages 30, 35, 40, 45 or 50 carbon atoms.

Suitable saturated fatty acids include caprylic acid, $CH_3(CH_2)_6COOH$; capric acid, $CH_3(CH_2)_8COOH$; lauric acid, $CH_3(CH_2)_{10}COOH$; myristic acid, $CH_3(CH_2)_{12}COOH$; palmitic $CH_3(CH_2)_{14}COOH$; stearic acid $CH_3(CH_2)_{16}COOH$; arachidic acid, $CH_3(CH_2)_{18}COOH$; behenic acid $CH_3(CH_2)_{20}COOH$; lignoceric acid, $CH_3(CH_2)_{22}COOH$; and cerotic acid $CH_3(CH_2)_{24}COOH$.

Representative examples of useful fluorine-containing monoalcohols include the following wherein $R_f$ is a fluorinated group as previously described.

| | |
|---|---|
| $R_fSO_2N(CH_3)CH_2CH_2OH$, | $CF_3(CF_2)_3SO_2N(CH_3)CH_2CH_2OH$, |
| $CF_3(CF_2)_3SO_2N(CH_3)CH(CH_3)CH_2OH$, | $CF_3(CF_2)_3SO_2N(CH_3)CH_2CH(CH_3)OH$, |
| $C_3F_7CH_2OH$, | $R_fSO_2N(H)(CH_2)_2OH$, |
| $R_fSO_2N(CH_3)(CH_2)_4OH$, | $C_4F_9SO_2N(CH_3)(CH_2)_4OH$ |
| $C_6F_{13}SO_2N(CH_3)(CH_2)_4OH$, | $R_fSO_2N(CH_3)(CH_2)_{11}OH$, |
| $R_fSO_2N(C_2H_5)CH_2CH_2OH$, | $CF_3(CF_2)_3SO_2N(C_2H_5)CH_2CH_2OH$, |
| $C_6F_{13}SO_2N(C_2H_5)CH_2CH_2OH$ | $R_fSO_2N(C_2H_5)(CH_2)_6OH$, |
| $C_3F_7CONHCH_2CH_2OH$, | $R_fSO_2N(C_3H_7)CH_2OCH_2CH_2CH_2OH$, |
| $R_fSO_2N(CH_2CH_2CH_3)CH_2CH_2OH$, | $R_fSO_2N(C_4H_9)(CH_2)_4OH$, |
| $R_fSO_2N(C_4H_9)CH_2CH_2OH$, | | chain, or cyclic alkylene, arylene, aralkylene, oxy, thio, sulfonyl, and combinations thereof such as sulfonamidoalkylene. Below is a representative list of suitable organic divalent linking groups.

—$SO_2N(R')(CH_2)_k$—
$CON(R')(CH_2)_k$—
$(CH_2)_k$—
$(CH_2)_kO(CH_2)_k$—
$(CH_2)_kS(CH_2)_k$—
$(CH_2)_kSO_2(CH_2)_k$—

For the purpose of this list, each k is independently an integer from 1 to 12. R' is hydrogen, phenyl, or an alkyl of 1 to about 4 carbon atoms (and is preferably methyl). In some embodiments, k is no greater than 6, 5, 4, 3, or 2.

The aforementioned moiety, A, can be a straight chain, branched chain, or cyclic hydrocarbon, or a combination thereof. Typical A moieties include alkylene, alkene, arylene, and aralkylene having 4-50 carbon atoms. In some embodiments, A is preferably a saturated hydrocarbon moiety or in other words an alkylene group averaging at least 4, 6, 8, 10, or 12 carbon atoms. In some embodiments, the alkylene group averages no greater than 45, 40, 35, 30, 35, 30, 25 or 20 carbon atoms. In typical embodiments, A is a hydrocarbon portion of a dicarboxylic acid or fatty acid.

The divalent carbonyl moiety, P, is typically a residue of a dicarboxylic or fatty acid and thus carbonyloxy (—C(O)O—) or in other words an ester group.

The fluorochemical material can be prepared by various methods known in the art such as described in U.S. Pat. No. 6,171,983. The fluorochemical is most typically prepared by esterifying a fluorinated alcohol with a dicarboxylic acid or a fatty acid. Particularly when a fatty acid is utilized as a starting material the resulting fluorochemical material typically contains a mixture of compounds.

Suitable dicarboxylic acids include adipic acid, suberic acid, azelaic acid, dodecanedioic acid, octadecanedioic acid, eicosanedioic acid, and the like that provide the A group as previously described.

Other fluorine-containing monoalcohols are described in U.S. Pat. No. 6,586,522; incorporated herein by reference.

In some embodiments, the monofunctional fluoroaliphatic alcohols useful in preparing the fluorochemical materials include the N-alkanol perfluoroalkylsulfonamides described in U.S. Pat. No. 2,803,656 (Ahlbrecht et al.), which have the general formula $R_f$—$SO_2N(R)R_1CH_2OH$ wherein $R_f$ is a perfluoroalkyl group having 3 to 6 and preferably 4 carbon atoms, $R_1$ is an alkylene radical having 1 to 12 carbon atoms, and R is a hydrogen atom or an alkyl group containing 1 to 4 carbon atoms and is preferably methyl. In some embodiments, $R_1$ is an alkylene radical having no greater than 8, 7, 6, 5, 4, 3 or 2 carbon atoms. These monofunctional alcohols can be prepared by reactions of an acetate ester of halohydrin with a sodium or potassium salt of the corresponding perfluoroalkylsulfonamide.

In some embodiments, the fluorochemical compound has one of the following formulas $C_4F_9SO_2N(CH_3)(CH_2)_kOC(O)$-A-$C(O)O(CH_2)_kN(CH_3)SO_2C_4F_9$ or $C_4F_9SO_2N(CH_3)(CH_2)_kOC(O)$-A wherein k and A are the same as previously described.

Fluorochemical compounds according to the formulas described herein are not fluoroalkyl silisesquioxane materials having the chemical formula $[RSiO_{3/2}]_n$, wherein R comprises a fluoroalkyl or other fluorinated organic group. Fluorochemical compounds according to the formulas described herein are also not (e.g. vinyl terminated) polydimethylsiloxanes. In typical embodiments, the fluorochemical material is free of silicone atom as well as siloxane linkages.

In some embodiments, the fluorochemical material (e.g. additive) has a fluorine content of at least 25 wt.-%. In some embodiments, the fluorine content of the fluorochemical material is at least 26, 27, 28, 29, 30, 31, 32, 33, or 34 wt.-% and typically no greater than 58, 57, 56, 55, 54, 53, 52, 51, or 50 wt.-%.

Various organic polymeric binders can be utilized. Although fluorinated organic polymeric binders can also be utilized, fluorinated organic polymeric binders are typically considerably more expensive than non-fluorinated binders. Further, non-fluorinated organic polymeric binders can exhibit better adhesive to polymeric components (e.g. reservoir, liner, or lid) of the spray application system.

Suitable non-fluorinated binders include for example polystyrene, atactic polystyrene, acrylic (i.e. poly(meth) acrylate), polyester, polyurethane (including polyester type thermoplastic polyurethanes "TPU"), polyolefin (e.g. polyethylene), and polyvinyl chloride. Many of the polymeric materials that the component (e.g. reservoir, liner, or lid) of the spray application system can be thermally processed from, as will subsequently be described, can be used as the non-fluorinated organic polymeric binder of an (e.g. organic solvent) coating composition. However, in typical embodiments, the non-fluorinated organic polymeric binder is a different material than the polymeric material of the component.

In some embodiments, the (e.g. non-fluorinated) organic polymeric binder is a film-grade resin, having a relatively high molecular weight. Film-grade resins can be more durable and less soluble in an organic solvent that may be present in the liquid (e.g. paint) being repelled. In other embodiments, the (e.g. non-fluorinated) organic polymeric binder can be a lower molecular weight film-forming resin. Film-forming resins can be more compliant and less likely to affect the collapsibility of a liquid (e.g. paint) reservoir or liner. Viscosity and melt flow index are indicative of the molecular weight. Mixtures of (e.g. non-fluorinated) organic polymeric binder can also be used.

In some embodiments, the film-grade (e.g. non-fluorinated) organic polymeric binder typically has a melt flow index of at least 1, 1.5, 2, 2.5, 3, 4, or 5 g/10 min at 200° C./5 kg ranging up to 20, 25, or 30 g/10 min at 200° C./5 kg. The melt flow index can be determined according to ASTM D-1238. The tensile strength of the (e.g. non-fluorinated) organic polymeric binder is typically at least 40, 45, 50, 55, or 60 MPa. Further, the (e.g. non-fluorinated) organic polymeric binder can have a low elongation at break of less than 10% or 5%. The tensile and elongation properties can be measured according to ASTM D-638.

In other embodiments, the (e.g. non-fluorinated) organic polymeric binders have a lower molecular weight and lower tensile strength than film-grade polymers. In one embodiment, the melt viscosity of the (e.g. non-fluorinated) organic polymeric binders (as measured by ASTM D-1084-88) at 400° F. (204° C.) ranges from about 50,000 to 100,000 cps. In another embodiment, the molecular weight (Mw) of the (e.g. non-fluorinated) organic polymeric binder is typically at least about 1000, 2000, 3000, 4000, or 5000 g/mole ranging up to 10,000; 25,000; 50,000; 75,000; 100,000; 200,000; 300,000; 400,000, or 500,000 g/mole. In some embodiments, the (e.g. non-fluorinated) organic polymeric binder has a tensile strength of at least 5, 10, or 15 MPa ranging up to 25, 30 or 35 MPa. In some embodiments, the (e.g. non-fluorinated) organic polymeric binder has an elongation at break ranging up 25, 50, 100, 200, 300, 400 or 500%

In typical embodiments, the non-fluorinated organic polymeric binder does not form a chemical bond with the fluorochemical material as this may hinder the migration of the fluorochemical material (e.g. compound) to the outermost surface layer.

In some embodiments, the (e.g. non-fluorinated) organic polymeric binder is not curable, such as in the case of alkyd resins. An alkyd resin is a polyester modified by the addition of fatty acids and other components. They are derived from polyols and a dicarboxylic acid or carboxylic acid anhydride. Alkyds are the most common resin or "binder" of most commercial "oil-based" paints and coatings.

In some embodiments, the selection of the non-fluorinated polymeric binder can affect the concentration of fluorochemical material that provides the desired liquid (e.g. paint) repellency properties. For example when the binder is atactic polystyrene, having a molecular weight of 800-5000 kg/mole, the concentration of fluorochemical material was found to exceed 2.5 wt.-% in order to obtain the desired liquid (e.g. paint) repellency properties. Thus, for some non-fluorinated polymeric binders, the concentration of fluorochemical material may be at least 3, 3.5, 4, or 5 wt.-% of the total amount of fluorochemical material and (e.g. non-fluorinated) polymeric binder.

The fluoropolymers or compositions comprising a fluorochemical material and a non-fluorinated organic polymeric binder can be dissolved, suspended, or dispersed in a variety of organic solvents to form coating compositions suitable for use in coating the compositions onto a substrate or component of a spray application system. The organic coating compositions typically contain at least about 90%, 91%, 92%, 93%, 94%, 95%, 96%, 97%, 98%, 99% organic solvent or greater, based on the weight of the coating composition. The coating compositions typically contain at least about 0.01%, 0.1%, 0.5%, 1%, 2%, 3%, 4%, 5%, 6%, 7%, 8%, 9%, 10%, 15% or greater solids of fluoropolymer or (e.g. non-fluorinated) organic polymeric binder and fluorochemical material, based on the total weight of the coating composition. However, the coating composition can be provided as a concentrate with an even higher amount of solids, e.g. 20, 30, 40, or 50 wt.-% solids. Suitable solvents include for example alcohols, esters, glycol ethers, amides, ketones, hydrocarbons, chlorohydrocarbons, hydrofluorocarbons, hydrofluoroethers, chlorocarbons, and mixtures thereof. In some embodiments, the coating composition is an aqueous suspension, emulsion, or solution comprising at least 50 wt.-% or greater water and an organic cosolvent.

The coating compositions may contain one or more additives provided the inclusion of such does not detract from the liquid (e.g. paint) repellent properties.

The coating compositions can be applied to a substrate or component by standard methods such as, for example, spraying, padding, dipping, roll coating, brushing, or exhaustion (optionally followed by the drying of the treated substrate to remove any remaining water or organic solvent). The substrate can be in the form of sheet articles that can be subsequently thermally formed into a liquid (e.g. paint) reservoir, liner or lid. When coating flat substrates of appropriate size, knife-coating or bar-coating may be used to ensure uniform coatings of the substrate.

The moisture content of the organic coating composition is preferably less than 1000, 500, 250, 100, 50 ppm. In some embodiments, the coating composition is applied to the substrate at a low relative humidity, e.g. of less than 40%, 30% or 20% at 25° C.

The coating compositions can be applied at an amount sufficient to achieve the desired repellency properties. Coatings as thin as 250, 300, 350, 400, 450, or 500 nm ranging up to 1, 1.5, 2, 2.5, 3, 3.5, 4, 4.5 or 5 microns can provide the desired repellency. However, thicker coatings (e.g., up to about 10, 15, 20 microns or more) can also be used. Thicker coatings can be obtained by applying to the substrate a single thicker layer of a coating composition that contains a relatively high concentration of solids. Thicker coatings can also be obtained by applying successive layers to the substrate.

In another embodiment, the fluorochemical material can be combined with a thermally processable (e.g. thermoplastic) polymer and then melt processed into a surface layer, substrate, or component such as a liquid (e.g. paint) repellent reservoir, liner or lid. In this embodiment, the fluorochemical material typically migrates to the surface forming a surface layer with a high concentration of fluorochemical material relative to the total amount of fluorochemical material and thermally processable polymer.

In typical embodiments, the amount of fluorochemical material is at least about 0.05, 0.1, 0.25, 0.5, 1.5, 2.0 or 2.5 wt.-% and in some embodiments, at least about 3.0, 3.5, 4.0, 4.5 or 5 wt.-%. The amount of fluorochemical material is typically no greater than 25, 20, 15, or 10 wt.-% of the sum of the fluorochemical material (melt additive) and thermally processable polymer.

To form a polymer blend by melt processing, the fluorochemical material can be, for example, mixed with pelletized, granular, powdered or other forms of the thermally processable polymer and then melt processed by known methods such as, for example, molding or melt extrusion. The fluorochemical material can be mixed directly with the polymer or it can be mixed with the polymer in the form of a "master batch" (concentrate) of the fluorochemical material in the polymer. If desired, an organic solution of the fluorochemical material can be mixed with powdered or pelletized polymer, followed by drying (to remove solvent) and then melt processing. Alternatively, the fluorochemical composition can be added to the polymer melt to form a mixture or injected into a molten polymer stream to form a blend immediately prior to extrusion or molding into articles.

In some embodiments, the melt processable (e.g. thermoplastic) polymer is a polyolefin, polyester, polyamide, polyurethane, or polyacrylate. The thermoplastic polymer preferably is a polyolefin, mixture or blend of one or more polyolefins, a polyolefin copolymer, mixture of polyolefin copolymers, or a mixture of at least one polyolefin and at least one polyolefin copolymer. The thermoplastic polymer is more preferably a polyolefin polymer or copolymer wherein the polymer unit or copolymer unit is ethylene, propylene or butylene or mixtures thereof. Thus the polyolefin is preferably polypropylene, polyethylene, polybutylene or a blend or copolymer thereof. In one embodiment, the thermoplastic polymer is polyethylene having a melting point ranging from 90-140° C. such as available from Chevron Phillips under the trade designation "MarFlex 1122 Polyethylene".

Extrusion can be used to form polymeric films. In film applications, a film forming polymer is simultaneously melted and mixed as it is conveyed through the extruder by a rotating screw or screws and then is forced out through a slot or flat die, for example, where the film is quenched by a variety of techniques known to those skilled in the art. The films optionally are oriented prior to quenching by drawing or stretching the film at elevated temperatures.

Molded articles are produced by pressing or by injecting molten polymer from a melt extruder as described above into a mold where the polymer solidifies. Typical melt forming techniques include injection molding, blow molding, compression molding and extrusion, and are well known to those skilled in the art. The molded article is then ejected from the mold and optionally heat-treated to effect migration of the polymer additives to the surface of the article.

After melt processing, an annealing step can be carried out to enhance the development of repellent characteristics. The annealing step typically is conducted below or above the melt temperature of the polymer for a sufficient period of time. The annealing step can be optional. The TFE copolymers can also be thermally processed into a component of a spray application system such as a liquid (e.g. paint) repellent reservoir, liner or lid at temperatures above the melt point of the fluoropolymer.

The repellent surface layer such as the porous layer impregnated with lubricant as well as the other (e.g. solid) liquid (e.g. paint) repellent materials described herein can be provided on a wide variety of organic or inorganic components.

In some embodiments, different components are coated with different solid materials. In other embodiments, the surface of one portion of a component can comprise one type of a solid liquid (e.g. paint) repellent material and another surface portion can comprise a different type of solid material. Likewise, the surface of one portion of a component can comprise one type of a solid liquid (e.g. paint) repellent material and another surface portion can comprise a lubricant impregnated into pores of a porous layer.

In typical embodiments, the entire surface of the component (e.g. reservoir, liner or lid) of the spray application system that normally comes in contact with a liquid (e.g. paint) comprises a liquid (e.g. paint) repellent surface as described herein. In other embodiments, only a portion of the surface of the component (e.g. reservoir, liner or lid) of the spray application system that normally comes in contact with a liquid (e.g. paint) comprises a liquid (e.g. paint) repellent surface as described herein. This latter embodiment, is still beneficial relative to components lacking a liquid (e.g. paint) repellent surface.

Suitable polymeric materials for components include, but are not limited to, polyesters (e.g., polyethylene terephthalate or polybutylene terephthalate), polycarbonates, acrylonitrile butadiene styrene (ABS) copolymers, poly(meth)acrylates (e.g., polymethylmethacrylate, or copolymers of various (meth)acrylates), polystyrenes, polysulfones, polyether sulfones, epoxy polymers (e.g., homopolymers or epoxy addition polymers with polydiamines or polydithiols), polyolefins (e.g., polyethylene and copolymers thereof or polypropylene and copolymers thereof), polyvinyl chlorides, polyurethanes, fluorinated polymers, cellulosic materials, derivatives thereof, and the like.

In some embodiments, where increased transmissivity is desired, the polymeric component can be transparent. The term "transparent" means transmitting at least 85 percent, at least 90 percent, or at least 95 percent of incident light in the visible spectrum (wavelengths in the range of 400 to 700 nanometers). Transparent components may be colored or colorless.

Suitable inorganic substrates include metals and siliceous materials such as glass. Suitable metals include, for example, pure metals, metal alloys, metal oxides, and other metal compounds. Examples of metals include, but are not limited to, chromium, iron, aluminum, silver, gold, copper, nickel, zinc, cobalt, tin, steel (e.g., stainless steel or carbon steel), brass, oxides thereof, alloys thereof, and mixtures thereof.

The combination of the porous layer and impregnated lubricant, as well as the other (e.g. solid) materials described herein can render the coated surface hydrophobic. The terms "hydrophobic" and "hydrophobicity" refer to a surface on which drops of water or aqueous liquid exhibit an advancing and/or receding water contact angle of at least 50 degrees, at least 60 degrees, at least 70 degrees, at least 90 degrees, at least 95 degrees, or at least 100 degrees.

In some embodiments, the advancing and/or receding contact angle of the repellent surface of the substrate or component with water may increase, relative to the substrate or component lacking a liquid (e.g. paint) repellent surface, by at least 10, 15, 20, 25, 30, 35, 40 degrees. In some embodiments, the receding contact angle with water may increase by at least 45, 50, 55, 60, or 65 degrees.

In some embodiments, surface treatment and impregnated lubricant, as well as the other (e.g. solid) materials described herein, provide a surface that exhibits an advancing and/or receding contact angle with water of at least 105, 110, or 115 degrees. The advancing and/or receding contact angle with water is typically no greater than 135, 134, 133, 132, 131, or 130 degrees and in some embodiments, no greater than 129, 128, 127, 126, 125, 124, 123, 122, 121, or 120 degrees. The difference between the advancing and/or receding contact angle with water of the liquid repellent surface layer can be at least 5, 10, 15, 20, 25, 30, 35, 40, 45, or 50 degrees. Favorably the difference between the advancing and/or receding contact angle with water of the surface treated hydrophobic lubricant impregnated porous surface, as well as the other (e.g. solid) materials described herein is no greater than 15, 14, 13, 12, 11, 10, 9, 8, 7, 6, 5, 4, 3, 2, or 1 degree. As the difference between the advancing and/or receding contact angle with water increases, the tilt angle needed to slide or roll off a (e.g. water or paint) droplet from a planar surface increases. One of ordinary skill appreciates that deionized water is utilized when determining contact angles with water.

The contact angle of the liquid (e.g. paint) repellent surface of the substrate or component can also be evaluated with other liquids instead of water. For example, since paints often comprise 2-n-butoxyethanol, the contact angle of the liquid (e.g. paint) repellent surface with a solution of 10% by weight 2-n-butoxyethanol and 90% by weight deionized water can also be of importance. In some embodiments, the advancing contact angle with such 2-n-butoxyethanol solution is at least 60, 61, 62, 63, 64, 65, 66, 67, 68, 69, 70 degrees and in some embodiments at least 75 or 80 degrees. In some embodiments, the receding contact angle with such 2-n-butoxyethanol solution is at least 40, 45, 50, 55, 60, 65, or 70 degrees. In some embodiments, the advancing and/or receding contact angle of the liquid (e.g. paint) repellent surface of the substrate or component with a solution of 10% by weight 2-n-butoxyethanol and 90% by weight deionized water is no greater than 100, 95, 90, 85, 80, or 75 degrees.

In another embodiments, the contact angle of the liquid (e.g. paint) repellent surface of the substrate or component with hexadecane is at least 50, 55, 60, 65, 70, or 75 degrees. The advancing contact angle with hexadecane is typically at least 50, 55, 60, 65, 70, 75, 80, or 84 degrees. In typical embodiments, the receding or advancing contact angle with hexadecane is no greater than 85 or 80 degrees.

The combination of the porous layer and impregnated lubricant as well as the other (e.g. solid) materials described herein can be used to impart or enhance (e.g. aqueous) liquid repellency of a variety of substrates.

The term "aqueous" means a liquid medium that contains at least 50, 55, 60, 65, or 70 wt-% of water. The liquid medium may contain a higher amount of water such as at least 75, 80, 85, 90, 95, 96, 97, 98, 99, or 100 wt-% water. The liquid medium may comprise a mixture of water and one or more water-soluble organic cosolvent(s), in amounts such that the aqueous liquid medium forms a single phase. Examples of water-soluble organic cosolvents include for example methanol, ethanol, isopropanol, 2-methoxyethanol, (2-methoxymethylethoxy)propanol, 3-methoxypropanol, 1-methoxy-2-propanol, 2-butoxyethanol, ethylene glycol, ethylene glycol mono-2-ethylhexylether, tetrahydrofuran, 2,2,4-trimethyl-1,3-pentanediol monoisobutyrate, tetraethylene glycol di(2-ethylhexoate), 2-ethylhexylbenzoate, and ketone or ester solvents. The amount of organic cosolvent does not exceed 50 wt-% of the total liquids of the coating composition. In some embodiments, the amount of organic cosolvent does not exceed 45, 40, 35, 30, 25, 20, 15, 10 or 5 wt-% organic cosolvent. Thus, the term aqueous includes (e.g. distilled) water as well as water-based solutions and dispersions such as paint.

In some embodiments, the aqueous (e.g. paint) "ready to spray" dispersions, e.g. paint, described herein may comprise at least 5, 10, or 15 wt-% solids with the remainder being aqueous liquid medium. In some embodiments, the aqueous (e.g. paint) "ready to spray" dispersions, e.g. paint, described herein may comprise at least 20, 25, 30, or 35 wt-% solids with the remainder being aqueous liquid medium. Further, in some embodiments, the aqueous (e.g. paint) dispersions may be a concentrate comprising at least 40, 45, 50, 55, 60, 65, 70, 75, 80, or 85 wt-% solids with the remainder being aqueous liquid medium. Such concentrates are generally diluted to prepare an aqueous (e.g. paint) "ready to spray" dispersion.

In some embodiments, the porous layer and impregnated lubricant, as well as the other (e.g. solid) materials described herein can impart a degree of aqueous liquid repellency such that no greater than 40%, 35%, 30%, 25%, 20%, 15%, 10%, 5%, or 1% of the repellent surface area comprises an aqueous test liquid, such as paint, after use of the spray application system or after holding the repellent surface vertically for a specified duration of time (e.g. 30 seconds-5 minutes) and visually determining (in the absence of a microscope) the aqueous liquid (e.g. paint).

In some embodiments, the porous layer impregnated lubricant, as well as the other (e.g. solid) materials described herein can impart a degree of liquid repellency such that the mass of retained aqueous liquid (e.g. paint) is no greater than 0.01 g/cm$^2$, 0.005 g/cm$^2$, 0.001 g/cm$^2$, or 0.0005 g/cm$^2$.

The paint repellency can be evaluated according to any one or combination of test methods described herein utilizing a test paint. Various aqueous-based automotive paints were found to be repelled by the surfaces described herein such as PPG ENVIROBASE HIGH PERFORMANCE T409, SIKKENS AUTOWAVE, SPIES HECKER PERMAHYD HI-TEC BASE COAT 480, and GLASURIT ADJUSTING BASE 93-E3. Unless specified otherwise, the test paint for determining paint repellency according to the test methods described herein was PPG Envirobase automobile paint mixed to specification containing 90 weight % ENVIRONBASE HIGH PERFORMANCE T409 DEEP BLACK and 10 weight % ENVIRONBASE HIGH PERFORMANCE T494 PAINT THINNER, available from PPG Industries, Pittsburgh Pa. or available from 3M, St. Paul, Minn.

The spray application system described herein can be utilized to apply an aqueous liquid mixture, such as paint.

As used herein, the term "paint" refers to a composition having an aqueous liquid medium, as previously described, and a polymeric (e.g. latex) binder dispersed in the aqueous liquid medium. Common polymeric binders utilized in paint include acrylic polymers, alkyd polymers, urethane polymers, epoxy polymers, and combinations thereof. In some embodiments, the (e.g. base coat) paint may comprise a combination of acrylic and alkyd polymers. In other embodiments, the (e.g. clear coat) paint may comprise hexamethylene isocyanate oligomers and/or cyclohexyl isocyanate oligomers at concentrations ranging from about 20 to 40 wt-% for "ready to spray" compositions.

In the absence of opacifying pigment(s), such as titanium dioxide, silica, carbon black, etc. or other colorant (i.e. pigment or dye other than black or white) the paint may be characterized as a "clear coat". Paints that further comprise opacifying pigment(s), yet not colored pigments may be characterized as primers. Further, paints that further comprise both opacifying pigment(s) and colorant(s) may be characterized as base coats.

Whereas clear coats are generally free of opacifying pigments and colorants, primers and base coats typically comprise at least 10, 15, 20, 25 or 30 wt-% or greater of opacifying pigment(s) such as titanium dioxide. Base coats further comprise colorants at various concentrations. In some embodiments, the paint comprises 5 to 25 wt-% of colorants.

The liquid medium may comprise relatively small concentrations of volatile organic solvents. For example, the volatile organic content of water-based flat architectural paint, water-based automobile primer, and water-based clear coat is typically no greater than 250 grams/liter and in some embodiments no greater than 200 grams/liter, 150 grams/liter, 100 grams/liter, or 50 grams/liter. The VOC content may be higher, ranging from at least 275, 300, or 325 grams/liter up to 500 grams/liter, particularly for automobile base coat. In some embodiments, the VOC content is no greater than 450 or 425 grams/liter. Paint referred to as no-VOC typically may contain 5 grams/liter or less of volatile organic solvents. As used herein, VOC is any organic compound having a boiling point less than or equal to 250° C. measured at a standard atmospheric pressure of 101.3 kPa.

As the concentration of colored pigment(s) increases, the concentration of (e.g. volatile) organic solvents present for the purpose of dissolving and dispersing such colored pigment(s) can also increase. Further, (e.g. volatile) organic solvents can also be utilized to lower the viscosity of the paint. Viscosity will vary with the thinner level chosen. However, in some embodiments, the viscosity of the "ready to spray" paint at 20° C. ranges from 50 to 100 cps.

The paint may comprise water-soluble organic solvents such as alcohols (e.g. alkylene glycol alkyl ether). For example, the paint may comprise 2-butoxyethanol (ethylene glycol monobutyl ether), having a boiling point of 171° C. (340° F.); butoxypropan-2-ol (propylene glycol n-butyl ether), having a boiling point of 171° C. (340° F.); 2-(2-butoxyethoxy)ethanol (diethylene glycol monobutyl ether), having a boiling point of 230° C. (446° F.); and combinations thereof. The paint may comprise one or more of such alcohols at a total concentration of at least 5 wt-% ranging up to 10, 15, 20, or 25 wt-%.

The paint may further comprise other solvents that may be characterized as "exempt" solvents, i.e. not causing the formation of ground level ozone (smog), according to environmental chemists. Representative examples include acetone, ethyl acetate, tertiary butyl acetate (TBAc), and isopropanol.

When the spray application system described herein is utilized to apply an aqueous liquid mixture, such as paint, the method may comprise applying more than one coat of the same or different paint compositions. For example, in one embodiment, the method may comprise applying one or more coats of a primer or sealer. In another embodiment, the method may comprise applying one or more coats of a (e.g. colored) base coat. In another embodiment, the method may comprise applying one or more coats of a clear coat. The method may comprise applying a combination of primer, sealer, base coat, and/or clear coat. The method is particularly advantageous for use with (e.g. automobile) base coats that are substantially more expensive than primers, sealers and clear coats.

In some embodiments, 3-4 coats may be applied (e.g. to an automobile panel) wherein each coat, or in other words "film build per wet coat" ranges in thickness from 0.80 to 1.0 mils. Upon drying this can produce a dried film build ranging from about 0.10 to 0.20 mils.

In some embodiments, each coat of the method utilizes an aqueous paint. In other embodiments, at least one coat may be an organic solvent based paint, i.e. a paint comprising greater than 50 wt-% organic solvent that may not form a single phase with water. Organic solvent-based paints typically do not contain any water. For example, solvent-based clear coats may contain organic polar and non-polar solvents such as xylene, acetone, naphtha, alkyl benzene, toluene, heptan-2-one, and the like at a total organic solvent concentration ranging from at least 50 wt-%, or 60 wt-% up to about 75 wt-% or greater.

In one embodied method, a solvent based clear coat is applied to a dried water based base coat.

When the paint comprises organic solvent, the lubricant (or the combination of lubricant and hydrophobic layer) may be selected such that the lubricant (or the combination of lubricant and hydrophobic layer) has no solubility or only trace solubility with the organic solvent(s) of the paint, e.g., a solubility of 0.01 grams/liter or 0.001 grams/liter or less. Further, when the paint comprises an organic solvent, the non-fluorinated polymeric binder, fluorochemical material, or fluoropolymer may be selected to exhibit no solubility or only trace solubility with the organic solvent(s) of the paint, e.g., a solubility of 0.01 grams/liter or 0.001 grams/liter or less. Alternatively or in combination with having trace solubility, the lubricant (or the combination of lubricant and hydrophobic layer) as well as the non-fluorinated polymeric binder, fluorochemical material, and/or fluoropolymer may be selected such that it is compatible with the paint and paint application methods. The lubricant (or the combination of lubricant and hydrophobic layer), non-fluorinated polymeric binder, fluorochemical material, and/or fluoropolymer may be present in the paint at higher concentrations, i.e. greater than 0.01 grams/liter, or greater than 0.1 grams/liter, or greater than 0.25 grams/liter, or greater than 0.5 grams/liter; yet still be compatible with the paint and paint application methods. In some embodiments, the lubricant (or the combination of lubricant and hydrophobic layer), non-fluorinated polymeric binder, fluorochemical material, and/or fluoropolymer may function as a paint additive and be present in the paint at concentrations ranging from about 0.5 grams/liter to 1, 1.5, 2, 2.5, or 3 wt-% of the paint.

There are various approaches that can be taken to determine the compatibility of the lubricant (or the combination of lubricant and hydrophobic layer), non-fluorinated polymeric binder, fluorochemical material, and/or fluoropolymer with the paint.

In one approach the lubricant (or the combination of lubricant and hydrophobic layer) may be sufficiently (e.g. chemically) compatible with the paint such that the lubricant (or the combination of lubricant and hydrophobic layer) does not migrate to a surface of the paint. This can be evaluated by comparing the concentration of lubricant (or the combination of lubricant and hydrophobic layer) of the dried paint at one major surface relative to an underlying or opposing major surface layer of the dried paint. When opposing major surface layers of the dried paint comprise substantially the same concentration (difference of less than 10, 5 or 1% relative to the major surface having the higher concentration) of lubricant (or the combination of lubricant and hydrophobic layer), the lubricant (or the combination of lubricant and hydrophobic layer) can be characterized as chemically compatible. Likewise, when opposing major surface layers of the dried paint comprise substantially the same concentration (difference of less than 10, 5 or 1% relative to the major surface having the higher concentration) of non-fluorinated polymeric binder, fluorochemical material, and/or fluoropolymer, such materials can be characterized as chemically compatible with the paint.

In another approach, the lubricant (or the combination of lubricant and hydrophobic layer) may be sufficiently compatible with the paint such that the lubricant (or the combination of lubricant and hydrophobic layer) does not affect the inter-layer adhesion of a painted substrate. This can be evaluated according to Standard Test Method for Measuring Adhesion by Tape Test (ASTM D3359-09). When the cross-hatch adhesion is substantially the same relative to a control of the same paint in the absence of the lubricant (or the combination of lubricant and hydrophobic layer), the presence of the lubricant (or the combination of lubricant and hydrophobic layer) can be characterized as not affecting the inter-layer adhesion. Typically, 90, 95, or 100% of the paint is retained after cross-hatch adhesion testing according to ASTM D3359-09. Likewise, the non-fluorinated polymeric binder, fluorochemical material, and/or fluoropolymer may be sufficiently compatible with the paint such that the presence thereof does not affect the inter-layer adhesion of a painted substrate.

In yet another approach, the lubricant (or the combination of lubricant and hydrophobic layer), non-fluorinated polymeric binder, fluorochemical material, and/or fluoropolymer may be sufficiently compatible with the paint such that the lubricant (or the combination of lubricant and hydrophobic layer), non-fluorinated polymeric binder, fluorochemical material, and/or fluoropolymer does not affect the method of applying the paint. For example, additional coats of the same paint can be uniformly applied at a sufficient film build as previously described. In yet another example, additional coats of a different paint (e.g. a clear coat applied to a dried base coat) can be uniformly applied at a sufficient film build as previously described. Lack of uniformity across the painted panel or substrate can typically be visually detected by observing the occurrence of "fisheyes" or other incompatibility-related coating defects while applying the paint and/or by uneven gloss and/or color that can be measured after the applied paint has dried.

Unless specified otherwise, the following definitions are applicable to the presently described invention.

The recitation of any numerical range by endpoints is meant to include the endpoints of the range, all numbers within the range, and any narrower range within the stated range.

The term "a", "an", and "the" are used interchangeably with "at least one" to mean one or more of the elements being described.

The term "and/or" means either or both. For example, the expression "A and/or B" means A, B, or a combination of A and B.

The term "alkyl" refers to a monovalent group that is a radical of an alkane and includes groups that are linear, branched, cyclic, bicyclic, or a combination thereof. The alkyl group typically has 1 to 30 carbon atoms. In some embodiments, the alkyl group contains 1 to 20 carbon atoms, 1 to 10 carbon atoms, 1 to 6 carbon atoms, 1 to 4 carbon atoms, or 1 to 3 carbon atoms.

The term "alkylene" refers to a divalent group that is a radical of an alkane and includes groups that are linear, branched, cyclic, bicyclic, or a combination thereof. The alkylene group typically has 1 to 30 carbon atoms. In some embodiments, the alkylene group has 1 to 20 carbon atoms, 1 to 10 carbon atoms, 1 to 6 carbon atoms, or 1 to 4 carbon atoms.

The term "alkoxy" refers to refers to a monovalent group having an oxy group bonded directly to an alkyl group.

The term "aryl" refers to a monovalent group that is aromatic and carbocyclic. The aryl has at least one aromatic ring and can have one or more additional carbocyclic rings that are fused to the aromatic ring. Any additional rings can be unsaturated, partially saturated, or saturated. Aryl groups often have 6 to 20 carbon atoms, 6 to 18 carbon atoms, 6 to 16 carbon atoms, 6 to 12 carbon atoms, or 6 to 10 carbon atoms.

The term "arylene" refers to a divalent group that is aromatic and carbocyclic. The arylene has at least one aromatic ring and can have one or more additional carbocyclic rings that are fused to the aromatic ring. Any additional rings can be unsaturated, partially saturated, or saturated. Arylene groups often have 6 to 20 carbon atoms, 6 to 18 carbon atoms, 6 to 16 carbon atoms, 6 to 12 carbon atoms, or 6 to 10 carbon atoms.

The term "hydrolyzable group" refers to a group that can react with water having a pH of 1 to 10 under conditions of atmospheric pressure. The hydrolyzable group is often converted to a hydroxyl group when it reacts. The hydroxyl group often undergoes further reactions. Typical hydrolyzable groups include, but are not limited to, alkoxy, aryloxy, aralkyloxy, acyloxy, or halo. As used herein, the term is often used in reference to one or more groups bonded to a silicon atom in a silyl group.

The term "aryloxy" refers to a monovalent group having an oxy group bonded directly to an aryl group.

The term "aralkyloxy" refers to a monovalent group having an oxy group bonded directly to an aralkyl group. Equivalently, it can be considered to be an alkoxy group substituted with an aryl group.

The term "acyloxy" refers to a monovalent group of formula —O(CO)$R^b$ where $R^b$ is alkyl, aryl, or aralkyl. Suitable alkyl $R^b$ groups often have 1 to 20 carbon atoms, 1 to 10 carbon atoms, 1 to 6 carbon atoms, or 1 to 4 carbon atoms. Suitable aryl $R^b$ groups often have 6 to 12 carbon atoms such as, for example, phenyl. Suitable aralkyl $R^b$ groups often have an alkyl group with 1 to 10 carbon atoms, 1 to 6 carbon atoms, or 1 to 4 carbon atoms that is substituted with an aryl having 6 to 12 carbon atoms such as, for example, phenyl.

The term "halo" refers to a halogen atom such as fluoro, bromo, iodo, or chloro. When part of a reactive silyl, the halo group is often chloro.

The term "silyl" refers to a monovalent group of formula —Si$(R_c)_3$ where $R^c$ is hydroxyl, a hydrolyzable group, or a non-hydrolyzable group. In many embodiments, the silyl group is a "reactive silyl" group, which means that the silyl group contains at least one $R^c$ group that is a hydroxyl group or hydrolyzable group. Some reactive silyl groups are of formula —Si$(R^2)_{3-x}(R^3)_x$ where each group $R^2$ is independently hydroxyl or a hydrolyzable group and each group $R^3$ is independently a non-hydrolyzable group. The variable x is an integer equal to 0, 1, or 2.

The term "non-hydrolyzable group" refers to a group that cannot react with water having a pH of 1 to 10 under conditions of atmospheric pressure. Typical non-hydrolyzable groups include, but are not limited to alkyl, aryl, and aralkyl. As used herein, the term is often used in reference to one or more groups bonded to a silicon atom in a silyl group.

The term "fluorinated" refers to a group or compound that contains at least one fluorine atom attached to a carbon atom. Perfluorinated groups, in which there are no carbon-hydrogen bonds, are a subset of fluorinated groups.

The term "perfluorinated group" refers to a group having all C—H bonds replaced with C—F bonds. Examples include monovalent or divalent radicals of a perfluoropolyether, perfluoroether, or perfluoroalkane.

The term "perfluoroether" refers to ether in which all of the C—H bonds are replaced with C—F bonds. It refers to a group or compound having two perfluorinated groups (e.g., a perfluoroalkylene and/or perfluoroalkyl) linked with an oxygen atom. That is, there is a single catenated oxygen atom. The perfluorinated groups can be saturated or unsaturated and can be linear, branched, cyclic, or a combination thereof.

The term "perfluoropolyether" refers to a polyether in which all of the C—H bonds are replaced with C—F bonds. It refers to a group or compound having three or more perfluorinated groups (e.g., a perfluoroalkylene and/or perfluoroalkyl) linked with oxygen atoms. That is, there are two or more catenated oxygen atoms. The perfluorinated groups can be saturated or unsaturated and can be linear, branched, cyclic, or a combination thereof.

The term "perfluoroalkyl" refers to an alkyl with all the hydrogen atoms replaced with fluorine atoms. Stated differently, all of the C—H bonds are replaced with C—F bonds.

The term "perfluoroalkane" refers to an alkane with all the C—H bonds replaced with C—F bonds.

The term "agglomerate" refers to a weak association between primary particles which may be held together by charge or polarity and can be broken down into smaller entities.

The term "primary particle size" refers to the mean diameter of a single (non-aggregate, non-agglomerate) particle.

The term "aggregate" with respect to particles refers to strongly bonded or fused particles where the resulting external surface area may be significantly smaller than the sum of calculated surface areas of the individual components. The forces holding an aggregate together are strong forces, for example covalent bonds, or those resulting from sintering or complex physical entanglement. Thus aggregates cannot be broken down into smaller entities such as discrete primary particles.

Objects and advantages of this invention are further illustrated by the following examples, but the particular materials and amounts thereof recited in these examples, as well as other conditions and details, should not be construed to unduly limit this invention.

The invention includes but is not limited to the following embodiments; Embodiment 1 is a component of a spray application system, the component comprising a liquid repellent surface such that the difference between the advancing contact angle and the receding contact angle with water is less than 10.

Embodiment 2 is the component of embodiment 1 wherein the liquid repellent surface comprises a surface layer of a fluorochemical material.

Embodiment 3 is the component of previous embodiments wherein the liquid repellent surface layer further comprises a non-fluorinated organic polymeric binder.

Embodiment 4 is the component of embodiment 3 wherein the fluorochemical material is a compound having the formula:

$R_f$ is a fluorinated group;
L is independently an organic divalent linking group;
P is a catenary, divalent heteroatom-containing carbonyl moiety, such as —C(O)O—;
A is a hydrocarbon moiety;
and n typically ranges from 1 to 3.

Embodiment 5 is the component of embodiment 4 wherein L is a hydrocarbon moiety comprising 4 to 40 carbon atoms.

Embodiment 6 is the component of previous embodiments wherein L is —SO$_2$N(CH$_3$)(CH$_2$)$_n$— and n ranges from 1-4.

Embodiment 7 is the component of previous embodiments wherein $R_f$ is CF$_3$[CF$_2$]$_3$— for at least 50 wt.-% of the fluorochemical material.

Embodiment 8 is the component of previous embodiments wherein the hydrocarbon moiety is a saturated alkylene moiety.

Embodiment 9 is the component of previous embodiments wherein the fluorochemical material has a fluorine content of at least 25 wt-%.

Embodiment 10 is the component of previous embodiments wherein n averages at least 2.

Embodiment 11 is the component of previous embodiments wherein the hydrocarbon moiety averages no greater than 25 carbon atoms.

Embodiment 12 is the component of previous embodiments wherein the non-fluorinated organic polymeric binder is selected from polystyrene, acrylic, polyester, polyurethane, polyolefin, and polyvinyl chloride.

Embodiment 13 is the component of previous embodiments wherein the fluorochemical material does not form a covalent bond with the non-fluorinated polymeric binder.

Embodiment 14 is the component of previous embodiments wherein the liquid repellent surface comprises a fluoropolymer.

Embodiment 15 is the component of embodiment 14 wherein the fluoropolymer is a copolymer of tetrafluoroethylene (TFE).

Embodiment 16 is the component of embodiment 15 wherein the copolymer has a density less than 2.18 g/cm$^3$.

Embodiment 17 is the component of previous embodiments wherein the fluoropolymer comprises polymerized units of heterocyclic fluorocarbon groups.

Embodiment 18 is the component of embodiment 17 wherein the heterocyclic fluorocarbon groups comprise oxygen atoms.

Embodiment 19 is the component of previous embodiments wherein the fluoropolymer is a copolymer of tetrafluoroethylene and perfluoroalkyl dioxole.

Embodiment 20 is the component of previous embodiments wherein the fluoropolymer is a copolymer of tetrafluoroethylene and hexafluroropropylene.

Embodiment 21 is the component of previous embodiments wherein the fluoropolymer further comprises less than 19 mole % of polymerized units of vinylidene fluoride.

Embodiment 22 is the component of embodiments 1-2 wherein the component comprises a thermally processable polymer and a fluorochemical material melt additive.

Embodiment 23 is the component of embodiments 22 wherein the fluorochemical material melt additive is according to any one or combination of embodiments 4-11.

Embodiment 24 is a component of a spray application system, the component comprising a liquid repellent surface layer, wherein the liquid repellent surface layer comprises a porous layer and a lubricant impregnated into pores of the porous layer.

Embodiment 25 is the component of previous embodiments wherein the component is a liquid reservoir, a liquid reservoir liner, a lid for a liquid reservoir or liner, or a combination thereof.

Embodiment 26 is the component of previous embodiments wherein the component comprises a thermoplastic polymeric material.

Embodiment 27 is the component of previous embodiments wherein the component is a removable liquid reservoir liner.

Embodiment 28 is the component of previous embodiments wherein the component is a collapsible liquid reservoir or liner.

Embodiment 29 is the component of previous embodiments wherein the spray application system further comprises a gravity-fed spray gun.

Embodiment 30 is the component of previous embodiments wherein the liquid repellent surface layer repels water-based paint having a volatile organic solvent of at least 5, 10, 15, 20, or 25 g/liter.

Embodiment 31 is the component of embodiment 30 wherein the volatile organic solvent is water-soluble.

Embodiment 32 is the component of previous embodiments wherein the organic solvent comprises one or more alcohol.

Embodiment 33 is the component of previous embodiments wherein the organic solvent comprises an alkylene glycol alkyl ether.

Embodiment 34 is the component of previous embodiments wherein the organic solvent comprises 2-butoxyethanol, butoxypropan-2-ol, 2-(2-butoxyethoxy)ethanol, and mixtures thereof.

Embodiment 35 is the component of previous embodiments wherein the liquid repellent surface layer repels water-based paint having a pigment content of at least 10, 15, 20 wt-%.

Embodiment 36 is the component of previous embodiments wherein no greater than 20%, 15%, 10%, 5%, or 1% of the repellent surface comprises water-based paint after use of the spray application system or according to the Test Method 3 or 5 for paint repellency evaluation.

Embodiment 37 is the component of previous embodiments wherein the repellent surface has a mass of retained water-based paint of no greater than 0.01 g/cm$^2$ after use of the spray application system or according to the Test Method 3 or 5 for paint repellency evaluation.

Embodiment 38 is the component of previous embodiments wherein the porous layer comprises a plurality of sintered inorganic oxide particles arranged to form a porous three-dimensional network.

Embodiment 39 is the component of embodiment 37 further comprising a hydrophobic layer disposed on a surface of the porous three-dimensional network.

Embodiment 40 is the component of previous embodiments further comprising a hydrophobic layer and the hydrophobic layer comprises a fluorinated group, a hydrocarbon group, a silane group, or a combination thereof.

Embodiment 41 is the component of previous embodiments wherein the inorganic oxide particles are fixed to the component in the absence of an organic polymeric binder.

Embodiment 42 is the component of previous embodiments wherein the porous three-dimensional network of sintered inorganic oxide particles has an inorganic content of at least 90 wt-%.

Embodiment 43 is the component of previous embodiments wherein the sintered inorganic oxide particles comprise silica, alumina, or a mixture thereof.

Embodiment 44 is the component of previous embodiments wherein the sintered inorganic oxide particles comprise nanoparticles having an average particle size of no greater than 100 nanometers, nanoparticles or particles having an average particle size of greater than 150 nanometers, or a mixture thereof.

Embodiment 45 is a component of a spray application system, the component comprising a liquid repellent surface such that the mass of retained water-based paint is no greater than 0.01 g/cm$^2$ after use of the spray application system or according to the Test Method 3 or 5 for paint repellency evaluation.

Embodiment 46 is a component of a spray application system, the component comprising a liquid repellent surface such that the receding contact angle with water ranges from 90 degrees to 135 degrees.

Embodiment 47 is a component of a spray application system, the component comprising a liquid repellent surface such that the receding contact angle with a solution containing 10% by weight of 2-n-butoxyethanol and 90% by weight deionized water is at least 45 degrees.

Embodiment 48 is a component of a spray application system, the component comprising a liquid repellent surface, such that a drop of paint slides off the surface when the liquid repellent surface orientated vertically.

Embodiment 49 is the component of embodiments 45-48 wherein the component is further characterized by any one or combination of embodiments 1-43.

Embodiment 50 is a spray application system comprising a spray gun, a liquid reservoir that attaches to the spray gun, optionally a liner for the liquid reservoir, and a lid for the liquid reservoir and/or liner; wherein at least the liquid reservoir and/or liner comprises a liquid repellent surface layer comprising a porous layer and a lubricant impregnated into pores of the porous layer or a liquid repellent surface according to embodiments 1-24.

Embodiment 51 is the spray application system of embodiment 49 further characterized by any one or combination of embodiments 25-49.

Embodiment 52 is a method of use of a spray application system comprising providing a spray application system of embodiments 50-51; and utilizing the spray application system to apply an aqueous liquid.

Embodiment 53 is the method of embodiment 52 wherein the aqueous liquid is paint.

Embodiment 54 is a method of making a liquid repellent component of a spray application system comprising providing at least one component of a spray application system; and providing a liquid repellent surface according to any of embodiments 1-49 on the component.

Embodiment 55 is the method of embodiment 54 wherein the liquid repellent surface is provided by coating the component with a composition comprising an organic solvent and a fluoropolymer or a non-fluorinated organic polymeric binder and a fluorochemical material; and removing the organic solvent.

Embodiment 56 is a method of making a repellent component of a spray application system comprising forming a component from a melt processable polymer further comprising a fluorochemical material additive.

Embodiment 57 is a method of making a repellent component of a spray application system comprising providing at least one component of a spray application system; and providing a liquid repellent surface layer on the component wherein the liquid repellent surface layer comprises a porous layer and a lubricant impregnated into pores of the porous layer.

Embodiment 58 is the method of embodiment 57 wherein the method comprises (a) providing a component; (b) forming a surface treated porous layer on a surface of the component, wherein the porous layer comprises sintered inorganic oxide particles and a surface of the porous layer comprises a hydrophobic layer; and (c) impregnating a lubricant into pores of the surface treated porous layer.

Embodiment 59 is the method of embodiment 58 wherein the method of forming the surface treated porous layer comprises (b1) coating a plurality of inorganic oxide particles dispersed in a liquid medium on a surface of the substrate; (b2) sintering the inorganic oxide particles forming a porous layer; and (b3) coating a surface of the porous layer with a hydrophobic material.

Embodiment 60 is the method of embodiment 59 wherein the liquid medium further comprises an acid or base and the inorganic oxide particles are nanoparticles sintered at a temperature no greater than 250° C.

Examples of Liquid Repellent Surfaces Comprising a Porous Layer and Impregnated Lubricant Materials:

| Material designation | Description | Obtained from |
|---|---|---|
| NALCO 1115 | Silica sol, particle size of 4 nm and 16.2 wt % solids | Nalco Company, Naperville, IL under trade designation "NALCO 1115" |
| NALCO 2329 | Silica sol, particle size of 75 nm and 40.5 wt % | Nalco Company, Naperville, IL under trade designation "NALCO 2329" |
| NALCO 1056 | Alumina-Coated-Silica sol, particle size of 20 nm, 4 wt % $Al_2O_3$ and 26 wt % $SiO_2$ | Nalco Company, Naperville, IL under trade designation "NALCO 1056" |
| NALCO 8676 | Alumina sol, particle size of 2 nm and 10 wt % solids | Nalco Company, Naperville, IL under trade designation "NALCO 8676" |
| SNOWTEX UP | Silica sol, elongated silica particles, particle size of 9-15 nm × 40-100 nm, 21.3 wt % | Nissan Chemical America Corp., Houston TX under trade designation "SNOWTEX UP" |
| CAB-O-SPERSE 2020K | An aqueous dispersion of CAB-O-SIL ® M-5 fumed silica | Cabot Corp., Billerica, MA under trade designation "CAB-O-SPERSE 2020K" |
| AEROSIL 200 | Fumed silica powder with a specific surface area of 200 $m^2/g$, aggregate particle size 0.2-0.3 microns (with 90 seconds of sonication) | Evonik Industries, Piscataway, NJ under trade designation "AEROSIL 200" |
| MEK | Methyl ethyl ketone | Avantor Performance Materials, Center Valley, PA under the trade designation "JT Baker" |
| IPA solvent | Isopropanol | BDH Chemicals/VWR, Radnor, PA |
| 2-amino-1,3-propane diol | $H_2NCH$—$(CH_2OH)_2$ | TCI America, Portland, OR |
| HFE 7100 solvent | methoxy-nonafluorobutane, $(C_4F_9OCH_3)$, is a clear, colorless and low-odor fluid | 3M Company, St. Paul, MN under trade designation "3M NOVEC 7100 ENGINEERED FLUID" |
| HFPO Silane Hydrophobic Surface Treatment Compound | a compound of formula $F(CF(CF_3)CF_2O)_aCF(CF_3)$—$CONH(CH_2)_3Si(OCH_3)_3$ where the variable a is in the range of 4 to 20 | Synthesized using technique described below |
| Alpha-Omega HFPO Silane Hydrophobic Surface Treatment Compound | a compound of formula $(CH_3O)_3Si(CH_2)_3NHC(O)OCH_2CH_2NHC(O)CF(CF_3)CF_2O(CF(CF_3)$ $CF_2O)_bCF(CF_3)$—$C(O)NHCH_2CH_2OC(O)NH(CH_2)_3Si(OCH_3)_3$ where the variable a is in the range of 5 to 19 | Synthesized using technique described below |
| Dipodal HFPO Silane Hydrophobic Surface Treatment Compound | a compound of formula $F(CF(CF_3)CF_2O)_aCF(CF_3)$—$CONHCH[CH_2OC(O)NH(CH_2)_3Si(OCH_3)_3]_2$ where the variable a is in the range of 4 to 20 | Synthesized using technique described below |
| Hydrocarbon silane | 1-(chlorodime thylsilylmethyl)-heptacosane | Gelest Inc. Morrisville, PA |
| Hydrocarbon silane | triacontyldimethylchlorosilane | Gelest Inc. Morrisville, PA |

| Material designation | Description | Obtained from |
| --- | --- | --- |
| Hydrocarbon trimethoxy silane | Trimethoxy(octadecyl)silane | Sigma-Aldrich Chemical Company, St. Louis, MO |
| THV 221 | a fluoroplastic composed of tetrafluoroethylene, hexafluoropropylene, and vinylidene fluoride | 3M Company, St. Paul, MN under trade designation "3M THV 221AZ" |
| S159-500 Lubricant | Silicone oil, poly(dimethylsiloxane), 500 mPa | Fisher Scientific, Pittsburgh, PA |
| FOMBLIN Y 14/6 Lubricant | Perfluoropolyether | Sigma-Aldrich Chemical Company, St. Louis, MO |
| FOMBLIN Y 6/6 Lubricant | Perfluoropolyether | Sigma-Aldrich Chemical Company, St. Louis, MO |
| Lubricant | 2-octyl-1-dodecanol | Sigma-Aldrich Chemical Company, St. Louis, MO |
| Lubricant | Mineral Oil | Vi-Jon Smyrna, TN |
| PRIPOL 2033 Lubricant | Dimer diol, C36 branched | Croda, Edison, NJ |
| GENIOSIL GF-40 | 3-isocyanatopropyl trimethoxysilane | Evonik Industries, Piscataway, NJ under trade designation "GENIOSIL GF 40" |
| DBU | 1,8-diazabicyclo[5.4.0]undec-7-ene | Shanghai Rongrong Chemical Co., Ltd., Shanghai, China |
| DBTDL | dibutyltin dilaurate | Sigma-Aldrich Chemical Company, St. Louis, MO |
| $HNO_3$ $NH_4OH$ $MgSO_4$ | Nitric acid Ammonium hydroxide Anhydrous magnesium sulfate | EMD Millipore, Billerica, MA |
| DS-10 SURFACTANT | sodium dodecylbenzenesulfonate | Sigma-Aldrich Chemical Company, St. Louis, MO |
| Solvent | Ethyl acetate, methyl-t-butyl ether | VWR, Radnor, PA |
| PET Film | 2 mil (51 micrometers) polyethylene terephthalate film | 3M Company, St. Paul, MN |
| Glass slides | 1.5 inches × 3 inches (3.8 cm × 7.62 cm) | Fisher Scientific, Pittsburgh, PA |
| PPG Envirobase | Automotive paint mixed to manufacturers specifications. | PPG Industries, Pittsburgh, PA |

Test Methods

IR data was obtained using a Nicolet 6700 Series FT-IR spectrometer (Thermo Scientific, Waltham, Mass.).

Method for Water Contact Angle Measurements

Water contact angles were measured using a Ramé-Hart goniometer (Ramé-Hart Instrument Co., Succasunna, N.J.). Advancing ($\theta_{adv}$) and receding ($\theta_{rec}$) angles were measured as water was supplied via a syringe into or out of sessile droplets (drop volume ~5 μL). Measurements were taken at 2 different spots on each surface, and the reported measurements are the averages of the four values for each sample (a left-side and right-side measurement for each drop).

Test Method 1 for Paint Repellency Evaluation

Test surfaces were submerged in the PPG Envirobase paint and allowed to sit overnight. The test substrates where then removed from the paint and held vertically for 5 min to allow the paint to potentially flow off of the coating. The fraction (expressed as a percentage) of the surface that was still longer covered by paint was estimated by visual inspection.

Synthesis of Hexafluoropropyleneoxide (HFPO) Silane

HFPO silane is a compound of formula $F(CF(CF_3)CF_2O)_aCF(CF_3)$—$CONH(CH_2)_3Si(OCH_3)_3$ where the variable a is in the range of 4 to 20. This material was prepared by charging HFPO—$COOCH_3$ (20 g, 0.01579 mole) and $NH_2CH_2CH_2CH_2Si(OCH_3)_3$ (2.82 g, 0.01579 mole) under a $N_2$ atmosphere into a 100 mL 3-necked, round bottom flask equipped with a magnetic stir bar, nitrogen ($N_2$) inlet, and reflux condenser. The reaction mixture was heated at 75° C. for 12 h. The reaction was monitored by infrared (IR) spectroscopy; after the disappearance of the ester peak, the resulting clear, viscous oil was kept under vacuum for another 8 h and used as such.

Synthesis of Alpha-Omega Hexafluoropropyleneoxide (HFPO) Silane

The alpha omega HFPO dimethyl ester $CH_3OC(O)$—HFPO—$C(O)OCH_3$ was prepared by a method similar to Preparation No. 26 of U.S. Pat. No. 7,718,264

The starting diol $HOCH_2CH_2NHC(O)$—HFPO—$C(O)NHCH_2CH_2OH$ was prepared using 100 g (0.0704 mol, 1420 MW) of divalent alpha omega HFPO dimethyl ester ($CH_3OC(O)$—HFPO—$C(O)OCH_3$) described above and 11.18 g (0.1831 mole) ethanolamine by a procedure similar to the Preparation No. 27 of U.S. Pat. No. 7,718,264.

A 30 mL jar equipped with stirbar was charged with 10 g (0.006766 mol, 1478 MW) $HOCH_2CH_2NHC(O)$—HFPO—$C(O)NHCH_2CH_2OH$ and 2.78 g (0.013532 eq) Geniosil GF-40, and 75 microliters of a 10% solution of DBTDL in MEK. The jar was sealed and placed in a 75° C. bath with magnetic stirring, and heated for 2 h. At the end of 2 h, FTIR analysis of the reaction showed no residual —NCO peak at about 2265 $cm^{-1}$ to provide the product $(CH_3O)_3Si(CH_2)_3NHC(O)OCH_2CH_2NHC(O)$—HFPO—$C(O)NHCH_2CH_2OC(O) NH(CH_2)_3Si(OCH_3)_3$.

Synthesis of Dipodal Hexafluoropropyleneoxide (HFPO) Silane

The starting diol HFPO—$CONHCH[CH_2OH]2$ was prepared by charging a 500 mL roundbottom equipped with stirbar with 100 g (0.0704 mol, 1420 MW) HFPO—$C(O)OCH_3$ and 8.34 g (0.0915 mol) 2-amino-1,3-propane diol and heating for 2 h at 75° C. To the reaction was added 200 g of methyl-t-butyl ether, and a yellow oil (likely unreacted 2-amino-1,3-propane diol) separated from the reaction. The reaction was then poured into a separatory funnel, not adding the yellow oil. The reaction was washed with 20 mL of 2N aqueous HCl and allowed to separate overnight. The organic layer was washed with 20 mL 1N ammonium hydroxide, allowed to separate for 30 min, washed with 20 mL water, and allowed to separate for 30 min, then dried over anhydrous magnesium sulfate, filtered and concentrated at up to 95° C. for ~1.5$h$ to provide the diol HFPO—CONHCH[CH$_2$OH]$_2$.

A 30 mL jar equipped with stirbar was charged with 12.79 g (0.0086 mol) HFPO—CONHCH[CH$_2$OH]$_2$ and 2.78 g (0.013532 eq) Geniosil GF-40, and 75 microliters of a 10% solution of DBTDL in MEK, was sealed and placed in a 75° C. bath with magnetic stirring, and heated for about 24 h. At the end of 2 h, FTIR analysis of the reaction showed no residual —NCO peak at about 2265 cm$^{-1}$ to provide the product HFPO—CONHCH[CH$_2$OC(O)NH(CH$_2$)$_3$Si(OCH$_3$)$_3$]$_2$ Synthesis of Dimer Diol Silane A 25 mL jar equipped with a stirbar was charged with 10 g (570 MW, 285 MW, 0.0351 eq) Pripol 2033, 7.20 g (205.29 MW, 0.0351 mol) Geniosil GF-40, and 100 microliters of a 10% solution of DBTDL in MEK. This jar was sealed and placed in a 75° C. bath with magnetic stirring, and heated for 2 h. At the end of 2 h, FTIR analysis of the reaction showed no residual —NCO peak at about 2265 cm$^{-1}$.

Preparative Examples 1-13 (PE1-PE13)

PE1 coating formulation was prepared by first diluting a dispersion of NALCO 1115 to a solids content of 5 wt. % by adding appropriate amount of distilled (DI) water. Then, 1M HNO$_3$ catalyst was added to the diluted dispersion to adjust the pH of the dispersion to 2.

PE2-PE16 coating formulations were prepared in the same manner as PE1 except that the silica, silica/alumina, or alumina dispersion was varied. PE6-PE8 coating formulations containing AEROSIL 200 were prepared by adding AEROSIL 200 to a diluted dispersion of NALCO 1115 at the desired ratio and adjusting the solids content (by adding DI water) to 5 wt. %.

PE17 and PE18 were prepared in the same manner as PE1 except that the silica dispersion was varied and DBU catalyst was added to the silica dispersion instead of HNO$_3$ catalyst to adjust the pH of the dispersion to 12. PE10 and PE11 coating formulations further contained 0.05 wt. % of a DS-10 surfactant.

PE19 and PE20 coating formulations were prepared in the same manner as PE18 and PE-19, respectively, except that no DBU or HNO$_3$ was added to the formulation.

PE21 coating formulation was prepared by adding AEROSIL 200 powder to distilled water until the solids content reached 5 wt.-%. This formulation further contained 0.05 wt. % of a DS-10 surfactant.

PE22 coating formulation was prepared by first diluting a dispersion of NALCO 8676 to a solids content of 5 wt. % by adding an appropriate amount of distilled (DI) water. Then, DS-10 surfactant was added until the formulation contained a 0.05 wt. % DS-10 surfactant.

Table 1, below, summarizes the coating formulations for PE1-PE23.

TABLE 1

| Example | Porous Coating Formulation | Catalyst | pH | Amount of DS-10 added (wt. %) |
|---|---|---|---|---|
| PE1 | NALCO 1115 | HNO$_3$ | 2 | — |
| PE2 | 70% NALCO 1115 + 30% NALCO 2329 | HNO$_3$ | 2 | — |
| PE3 | 30% NALCO 1115 + 70% NALCO 2329 | HNO$_3$ | 2 | — |
| PE4 | 70% NALCO 1115 + 30% SNOWTEX UP | HNO$_3$ | 2 | — |
| PE5 | 30% NALCO 1115 + 70% SNOWTEX UP | HNO$_3$ | 2 | — |
| PE6 | 70% NALCO 1115 + 30% AEROSIL 200 | HNO$_3$ | 2 | — |
| PE7 | 30% NALCO 1115 + 70% AEROSIL200 | HNO$_3$ | 2 | — |
| PE8 | 2% NALCO 1115 + 98% AEROSIL 200 | HNO$_3$ | 2 | — |
| PE9 | 70% NALCO 1115 + 30% CAB-O-SPERSE 2020K | HNO$_3$ | 2 | — |
| PE10 | 30% NALCO 1115 + 70% CAB-O-SPERSE 2020K | HNO$_3$ | 2 | — |
| PE11 | 10% NALCO 1056 + 90% NALCO 1115 | HNO$_3$ | 2 | — |
| PE12 | 50% NALCO 1056 + 50% NALCO 1115 | HNO$_3$ | 2 | — |
| PE13 | 90% NALCO 1056 + 10% NALCO 1115 | HNO$_3$ | 2 | — |
| PE14 | 10% NALCO 8676 + 90% NALCO 1115 | HNO$_3$ | 2 | — |
| PE15 | 50% NALCO 8676 + 50% NALCO 1115 | HNO$_3$ | 2 | — |
| PE16 | 90% NALCO 8676 + 10% NALCO 1115 | HNO$_3$ | 2 | — |
| PE17 | 30% NALCO 1115 + 70% NALCO 2329 | DBU | 12 | 0.05 |
| PE18 | 70% NALCO 1115 + 30% AEROSIL 200 | DBU | 12 | 0.05 |
| PE19 | 30% NALCO 1115 + 70% NALCO 2329 | — | 10 | 0.05 |
| PE20 | 70% NALCO 1115 + 30% AEROSIL 200 | — | 10 | 0.05 |
| PE21 | AEROSIL 200 | — | 5 | 0.05 |
| PE22 | NALCO 8676 | — | 5 | 0.05 |

The PE1-PE23 coating formulations were then coated on PET films (PE1-PE19) or glass slides (PE20-23) using a Mayer Rod #4 (PE1-PE16, PE18-PE23) or Mayer Rod #25 (PE17), corresponding to a wet thickness of approximately 9.1 micrometers or 57.1 micrometers, respectively.

All of the samples coated on PET films were allowed to air dry for 3-10 minutes and were then placed in a 150° C. oven for 10 minutes to sinter the particles. Since the coated substrates had a tendency to curl during thermal annealing, microscope slides were placed on top of the edges of the coated substrates to prevent them from curling.

The coated glass microscope slides were allowed to air dry for 3-10 minutes, placed in a 550° C. furnace for 1 h to thermally sinter the particles, and then cooled to room temperature.

The coated PE1-PE23 samples with a porous layer were then subjected to a surface modification treatment. In some embodiments, various reactive species were used to form a hydrophobic layer as follows: to treat with HFPO Silane, a 0.5 wt. % solution of HFPO Silane in HFE 7100 (98 wt %) and IPA (1.5 wt. %) was dropped on the coated PE1-PE23 sample and the sample was left overnight to evaporate the solvents.

To treat the coated PE3 sample with HMDS, the coated sample was placed on a sealed vacuum desiccator alongside a vial containing 5 mL of HMDS and allowed to sit overnight.

To treat the coated PE3 or PE7 sample with 13-(chlorodimethylsilylmethyl) heptacosane, triacontyldimethylchlorosilane, or Dimer Diol Silane, a solution comprising 1 wt.-% of the desired silane, 9 wt. % deionized water, and 90 wt. % isopropanol was allowed to stir overnight. The coated PE3 or PE7 sample was dipped into this solution and allowed to dry overnight.

To treat the coated PE3 with trimethoxy(octadecyl)silane, dipodal HFPO silane, or alpha-omega HFPO silane, a solution of 2 wt % of the desired silane in 98% IPA:H$_2$O (95:5 v/v) was allowed to stir overnight. The coated PE3 sample was dipped into this solution and allowed to dry overnight.

To treat with THV221, a 0.1 wt. % solution of THV221 in MEK was dropped on the coated PE7 sample and the sample was left overnight to evaporate the solvents.

Examples 24-66 (EX24-EX66) and Comparative Examples A-E (CE.A-CE.E)

EX24-EX66 samples were prepared by impregnating various lubricants into surface treated porous PE1-PE23 samples described above. This was accomplished by dropping the desired lubricant onto the PE1-PE23 samples and allowing the lubricant to spread until the entire surface treated porous layer was coated followed by holding the samples vertically overnight to drain off excess lubricant.

Table 2, below summarizes the coating formulations, hydrophobic surface treatments, and lubricants as well as the measured water contact angles.

TABLE 2

| Example | Porous Coating Formulation | Hydrophobic Surface Treatment | Lubricant | Water Contact Angle (degrees) $\theta_{adv}$ | $\theta_{rec}$ |
|---|---|---|---|---|---|
| CE.A | none | none | none | 77 | 52 |
| CE.B | PE5 | none | none | <10 | <10 |
| CE.C | none | none | Fomblin Y 14/6 | 75 | 61 |
| CE.D | PE5 | none | Fomblin Y 14/6 | 25 | <10 |
| CE.E | PE5 | HFPO Silane | none | 123 | 76 |
| EX24 | PE1 | HFPO Silane | Fomblin Y 14/6 | 107 | 103 |
| EX25 | PE2 | HFPO Silane | Fomblin Y 14/6 | 108 | 100 |
| EX26 | PE3 | HFPO Silane | Fomblin Y 14/6 | 110 | 105 |
| EX27 | PE4 | HFPO Silane | Fomblin Y 14/6 | 107 | 101 |
| EX28 | PE5 | HFPO Silane | Fomblin Y 14/6 | 108 | 104 |
| EX29 | PE6 | HFPO Silane | Fomblin Y 14/6 | 103 | 98 |
| EX30 | PE7 | HFPO Silane | Fomblin Y 14/6 | 108 | 103 |
| EX31 | PE8 | HFPO Silane | Fomblin Y 14/6 | 97 | 96 |
| EX32 | PE9 | HFPO Silane | Fomblin Y 14/6 | 105 | 99 |
| EX33 | PE10 | HFPO Silane | Fomblin Y 14/6 | 105 | 101 |
| EX34 | PE11 | HFPO Silane | Fomblin Y 14/6 | 95 | 93 |
| EX35 | PE12 | HFPO Silane | Fomblin Y 14/6 | 92 | 89 |
| EX36 | PE13 | HFPO Silane | Fomblin Y 14/6 | 96 | 94 |
| EX37 | PE14 | HFPO Silane | Fomblin Y 14/6 | 94 | 91 |
| EX38 | PE15 | HFPO Silane | Fomblin Y 14/6 | 100 | 98 |
| EX39 | PE16 | HFPO Silane | Fomblin Y 14/6 | 99 | 93 |
| EX40 | PE17 | HFPO Silane | Fomblin Y 14/6 | 115 | 114 |
| EX41 | PE18 | HFPO Silane | Fomblin Y 14/6 | 110 | 104 |
| EX42 | PE19 | HFPO Silane | Fomblin Y 14/6 | 100 | 97 |
| EX43 | PE20 | HFPO Silane | Fomblin Y 14/6 | 102 | 99 |
| EX44 | PE21 | HFPO Silane | Fomblin Y 14/6 | 103 | 99 |
| EX45 | PE22 | HFPO Silane | Fomblin Y 14/6 | 102 | 100 |
| EX46 | PE3 | 13-(chlorodimethylsilylmethyl) heptacosane | 2-octyl-1-dodecanol | 93 | 88 |
| EX47 | PE3 | triacontyldimethylchlorosilane | 2-octyl-1-dodecanol | 90 | 86 |
| EX48 | PE3 | Dimer Diol Silane | Dimer Diol | 59 | 54 |
| EX49 | PE7 | Dimer Diol Silane | Dimer Diol | 57 | 53 |
| EX50 | PE3 | HMDS | Silicone Oil | 101 | 99 |
| EX51 | PE7 | THV221 | Fomblin Y 14/6 | 119 | 112 |
| EX52 | PE3 | Trimethoxy(octadecyl) silane | Mineral oil | 93 | 88 |
| EX53 | PE3 | Dipodal HFPO Silane | Fomblin Y 6/6 | 107 | 103 |
| EX54 | PE3 | alpha-omega HFPO silane | Fomblin Y 6/6 | 106 | 98 |

The difference between the advancing and receding contact angle for all of the lubricant-impregnated samples (EX24-EX51) was lower than 10°, consistent with facile movement of contacting water droplets. The Comparative Examples, in contrast, were characterized by water contact angle hysteresis above 10°, indicative of more resistance to drop motion. Note that CE.B was characterized by no difference between the advancing and receding contact angle because contacting water droplets instantly spread on the porous layer. This sheet of water was not easily removed by tilting, however, meaning CE. B was not repellent to water. Table 3, below summarizes the paint repellency (according to Test Method 1) for various examples.

TABLE 3

| Example | Porous Coating Formulation | Hydrophobic Surface Treatment | Lubricant | % of Surface Covered by Paint |
|---|---|---|---|---|
| CE.A | none | none | none | 100% |
| CE.B | PE5 | none | none | 100% |
| CE.C | none | none | Fomblin Y 14/6 | 90% |
| CE.D | PE5 | none | Fomblin Y 14/6 | 70% |
| CE.E | PE5 | HFPO Silane | none | 80% |
| EX24 | PE1 | HFPO Silane | Fomblin Y 14/6 | 5% |
| EX25 | PE2 | HFPO Silane | Fomblin Y 14/6 | 10% |
| EX26 | PE3 | HFPO Silane | Fomblin Y 14/6 | 5% |
| EX27 | PE4 | HFPO Silane | Fomblin Y 14/6 | 20% |
| EX28 | PE5 | HFPO Silane | Fomblin Y 14/6 | 20% |
| EX29 | PE6 | HFPO Silane | Fomblin Y 14/6 | 10% |
| EX30 | PE7 | HFPO Silane | Fomblin Y 14/6 | 0% |
| EX32 | PE9 | HFPO Silane | Fomblin Y 14/6 | 15% |
| EX33 | PE10 | HFPO Silane | Fomblin Y 14/6 | 5% |
| EX40 | PE17 | HFPO Silane | Fomblin Y 14/6 | 15% |
| EX41 | PE18 | HFPO Silane | Fomblin Y 14/6 | 5% |
| EX42 | PE19 | HFPO Silane | Fomblin Y 14/6 | 0% |
| EX43 | PE20 | HFPO Silane | Fomblin Y 14/6 | 5% |

CE.A and EX34 were examined under a microscope. The paint was uniformly disposed over the surface for CE.A. For EX34, the surface did not have any paint except for a few beads of paint covering less than 10% of the surface area.

Test Method 2 for Paint Repellency Evaluation—

Pieces of PET film measuring approximately 4 cm×4 cm with and without the lubricant impregnated porous surface layer were prepared as previously described and the initial mass was measured. The PPG Envirobase paint was pipetted onto these film pieces until the entire surface was covered with paint. The painted film samples were then turned vertically for 5 minutes to allow paint to drain off of the surface. The masses of the drained film pieces were measured to determine the mass of paint residue remaining on the surface. The drained pieces were also visually inspected to estimate the fraction (expressed as a percentage) of the film surface that remains coated by the paint. This test results are as follows:

| Example | Mass Paint on Surface (g/cm$^2$) | Fraction of Surface Coated with Paint |
|---|---|---|
| CE.A | 0.021 | 100% |
| EX28 | 0.00045 | <1% |
| EX30 | 0.0011 | ~10% |

Example 31—Liquid Repellent Surface Layer on a Spray Application System Component A thermoformed low density polyethylene (LDPE) PPS™ liner (400 ml) was manufactured by 3M.

The liner was first treated with air plasma using a Diener instrument (Atto Version 1 Model) by pumping the chamber down to a pressure of 0.2 mbar, setting the power to full (reading of 100), setting the air at a flow rate of 35±25 Nl/h, to plasma treat the inside of the liner for 5 minutes.

The liner was removed from the plasma chamber and the 5 wt % of porous coating formulation of PE 5 (as previously described) was immediately applied to the insides of the liner using a pipette. The liner was manually rotated to obtain complete wetting by the coating formulation, and excess coating was drained by flipping the container upside down. The coated liner was then dried at 75° C. for 15 minutes.

A hydrophobic layer was applied to the porous layer in the same manner using the previously described HFPO Silane solution. The solvents were allowed to evaporate overnight.

The Fomblin Y 14/6 lubricant was then coated onto the surface treated porous layer in the same manner until approximately ⅓ of the interior surface was covered with lubricant. The liner was then placed onto rollers for 30 minutes to allow the lubricant to spread and impregnate the pores. The liner was removed from the rollers and held vertically for ~3 weeks to drain off excess lubricant such that the liner now had a repellent interior surface.

Test Method 3 for Paint Repellency Evaluation:

The liner having the repellent interior surface as just described and a comparative liner (CE.F) that was the same liner without the repellent interior surface were each weighed. 70 g of PPG Environbase automotive paint was poured into the liner having the repellent interior surface and a comparative liner (CE. F) that was the same liner without the repellent interior surface. The liners were manually shaken and rotated to ensure that the paint contacted all of the container side walls. The paint was then poured out of the liners, and the liners were placed upside down for 5 minutes (liner with repellent interior) or about 3 hours (CE.F) to allow more of the paint to drain. The liners were each reweighed and the mass of retained paint was calculated. The test results were as follows:

| Example | Drainage Time (mins) | Mass Empty Liner (g) | Mass of Paint Retention Following Drainage (g) | Mass Per Surface Area Calculation |
|---|---|---|---|---|
| CE.F | ~180 | 5.69 | 5.74 | 0.022 |
| Liner with Repellent Surface Layer | 5 | 5.77 | 1.40 | 0.005 (77% less paint retained*) |

*(0.022−0.005)/0.022 X 100%

Additional Examples of Liquid Repellent Surfaces

Materials

All the fluorochemical compounds, non-fluorinated binders, and fluoropolymers utilized in this the following example set are solid at 25° C. and temperature ranging from 40° F. (4.44° C.) to 130° F. (54.4° C.).

| Material designation | Description | Obtained from |
| --- | --- | --- |
| MEK | Methyl ethyl ketone | Avantor Performance Materials, Center Valley, PA |
| MIBK | Methyl isobutyl ketone | |
| Non-fluorinated Polymeric Binder | | |
| PS | Atactic polystyrene beads with formula weights of 800-5000 g/mol ($PS_5$) or 125-250 kg/mol ($PS_{250}$), | Alfa Aesar, Ward Hill, MA |
| Styron 685D | Polystyrene resin beads | American Styrenics, The Woodlands, TX |
| PMMA | Poly(methyl methacrylate) (PMMA) powder with a melting point >150° C. | Alfa Aesar, Ward Hill, MA |
| PVC | Poly(vinylchloride) with an inherent viscosity of 1.115 dL/g | Aldrich Chemical Co., Milwaukee, WI |
| Elvacite 1010 | Acrylic resin, under trade designation "ELVACITE 1010" | Lucite International, Mississauga, Ontario, Canada |
| Estane 5703 | Polyurethane resin, under trade designation "ESTANE 5703" | Lubrizol Advanced Materials, Inc., Cleveland, OH |
| Comparative Fluoropolymer | Terpolymer of tetrafluoroethylene, hexafluoropropylene and 19 mol % of vinylidine fluoride | |
| Teflon AF | Amorphous fluoroplastic, under trade designation "DUPONT TEFLON AF" | DuPont, Wilmington, DE |
| FC 40 | A non-conductive, thermally and chemically stable fluid, under trade designation "3M FLUORINERT ELECTRONIC FLUID FC-40" | 3M Company, St. Paul, MN |

Synthesis of Fluorochemical Compound 1 (FC-1)

MEFBSE ($C_4F_9SO_2N(CH_3)C_2H_4OH$), a fluorochemical alcohol having an equivalent weight of 357, was made in two stages by reacting perfluorobutanesulfonyl fluoride (PBSF) with methylamine to form MEFBSA ($C_4F_9SO_2N(CH_3)H$), followed by reaction with ethylenechlorohydrin, using a procedure essentially as described in Example 1 of U.S. Pat. No. 2,803,656 (Ahlbrecht, et al.), Fluorochemical 1 was then prepared using the protocol described in U.S. Pat. No. 7,396,866 (Jariwala et al.) by esterifying the MEFBSE with octadecanedioic acid at a molar ratio of 2:1 as follows: to a three-necked round bottom flask was added 25 g (0.0793 moles) of Emerox 118 (available from Cognis Corporation, Cincinnati, Ohio), 56.7 g (0.159 moles) of MEFBSE, 100 g toluene and 1 g (0.007 moles) of 70 wt % solution of methanesulfonic acid. The contents of the flask were refluxed using a Dean-Stark trap and a condenser at 112° C. for 12 h. The solution was then cooled to 80° C. To this solution was added 1.08 g (0.007 moles) of triethanol amine and the solution was stirred at 80° C. for 1 h. This toluene solution was then washed with 75 g hot water (80° C.) three times. After the last wash the organic bottom layer was distilled to remove the toluene. The residue remaining the flask was the diester product, which was poured into a jar and allowed to crystallize on cooling to room temperature.

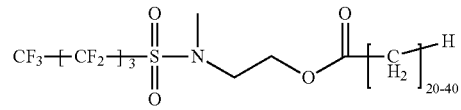

Test Method 4 for Paint Repellency Evaluation:

A single drop of the (e.g. PPG Envirobase) paint, approximately 0.2 mL, was applied at 21° C. to a central portion of the (e.g. repellent surface of the) sample (7.5 cm by 5.0 cm coated glass microscope slide). The sample (e.g. glass slide) was immediately orientated vertically. If the paint drop slid down the glass slide, it was denoted "Pass", if not "Fail".

Test Method 5 for Paint Repellency Evaluation:

The entire non-repellent surface of the sample (i.e. uncoated side of the 7.5 cm by 5.0 cm glass slide) was masked with tape, obtained from 3M Company under the trade designation "SCOTCH-BLUE PAINTERS TAPE". The sample (glass slide) was then immersed in the (e.g. PPG Envirobase) paint to a depth of 3.5 cm for 10 minutes at 21° C. (or in other words about half the coated surface was immersed). The sample (glass slide) was removed from the diluted paint, orientated vertically for 30 seconds, and the masking tape removed. The paint remaining on the immersed coated surface was then visually estimated and expressed as percentage of retained paint coverage.

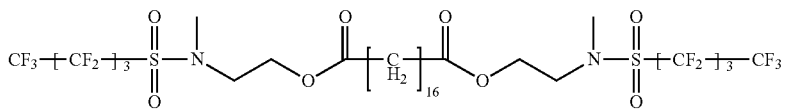

Synthesis of Fluorochemical Compound 2 (FC-2) Fluorochemical 2 was made by the esterification of a long chain hydrocarbon acid (Unicide 350, C25 average), and MEFBSE ($C_4F_9SO_2N(CH_3)C_2H_4OH$) in the same manner as the synthesis Fluorochemical 1.

Test Method 6 for Paint Repellency Evaluation:

A sample of sufficient size (2.8 by 3.2 cm) was weighed. The entire non-repellent surface of the sample (i.e. uncoated side) was masked with tape the "SCOTCH-BLUE PAINTERS TAPE". The repellent surface of the sample was entirely submerged (e.g. 30 g) in the (e.g. PPG Envirobase) paint for 10 minutes at 21° C. The sample was then removed from the paint, the masking tape removed, and the sample orientated vertically by means a binder clip for 1 minute. The bottom edge of the sample was contacted with a paper towel to wick away paint that may have pooled along the bottom edge of the material. The weight of each sample was again measured and the amount of paint remaining per area was calculated. The paint remaining on the coated surface was visually estimated and expressed as percentage of retained paint coverage.

Preparative Examples 32-56 (PE32-56PE)

PE32-PE56 coating solutions containing polymeric binder and fluorinated additives were prepared to be used in Examples (EX) and Comparative Examples (CE) described below.

To prepare PE32-PE56 coating solutions, 2 g of FC-2 or FC-1 powder and 48 g of MEK or MIBK solvent were added to a jar. This mixture was stirred and heated to 60° C. until the solid powder dissolved and was no longer visible. This hot coating solution was mixed at the appropriate ratio with a 60° C. solution of binder polymer in MEK or MIBK. The polymeric binder/fluorinated additive solutions were then cooled to room temperature. The compositions of the coating solutions are summarized are follows:

| Preparative Example | Polymeric Binder | Fluorinated Additive | Polymeric Binder/ Fluorinated Additive Weight Ratio | Solvent | Weight % Solids |
|---|---|---|---|---|---|
| PE32 | Styron 685D | — | 100/0 | MEK | 4 |
| PE33 | Styron 685D | FC-1 | 97.5/2.5 | MEK | 4 |
| PE34 | Styron 685D | FC-1 | 95/5 | MEK | 4 |
| PE35 | Styron 685D | FC-1 | 90/10 | MEK | 4 |
| PE36 | Styron 685D | FC-1 | 85/15 | MEK | 4 |
| PE37 | Styron 685D | FC-1 | 95/5 | MIBK | 4 |
| PE38 | $PS_5$ | FC-1 | 95/5 | MEK | 4 |
| PE39 | $PS_5$ | FC-1 | 90/10 | MEK | 4 |
| PE40 | $PS_5$ | FC-1 | 85/15 | MEK | 4 |
| PE41 | $PS_{250}$ | FC-1 | 95/5 | MEK | 4 |
| PE42 | $PS_{250}$ | FC-2 | 95/5 | MEK | 4 |
| PE43 | PMMA | FC-1 | 95/5 | MEK | 4 |
| PE44 | Elvacite 1010 | FC-1 | 95/5 | MEK | 4 |
| PE45 | PVC | FC-1 | 95/5 | MEK | 4 |
| PE46 | Estane 5703 | FC-1 | 95/5 | MEK | 5 |
| PE47 | Teflon ® AF | — | 100/0 | 3M FC40 | 1 |
| PE48 | Comparative Binder-$PS_{250}$ | — | 100/0 | MEK | 4 |
| PE49 | Comparative Fluoropolymer | — | 100/0 | MEK | 4 |
| PE50 | Comparative Binder-$PS_5$ | — | 100/0 | MEK | 4 |
| PE51 | Comparative Binder-PMMA | — | 100/0 | MEK | 4 |
| PE52 | Comparative Binder-Elvacite 1010 | — | 100/0 | MEK | 4 |
| PE53 | Comparative Binder-PVC | — | 100/0 | MEK | 4 |
| PE54 | Comparative Binder-Estane 5703 | — | 100/0 | MEK | 4 |
| PE55 | $PS_{250}$ | FC-2 | 90/10 | MEK | 4 |
| PE56 | $PS_{250}$ | FC-2 | 85/15 | MEK | 4 |

Examples CE57-CE81

Glass microscope slide (7.5×5.0 cm with a thickness of 0.1 cm thick obtained from Fisher) were cleaned with acetone and wiped dry with a WYPALL paper towel. The cleaned glass slides were place on a flat surface and approximately 0.5 mL of each coating composition was evenly coated onto the cleaned glass microscope slide by means of a #52 Mayer rod and dried for approximately 2 h at 21° C. This provides a coating that is about 133 microns initially and about 5 microns after evaporation of the solvent.

CE82 was a bare PTFE sheet obtained from ePlastics (San Diego, Calif.) used as the substrate without any coating.

Samples were assessed for paint repellency after 72 h using the test method described above.

Water contact angle and paint repellency were evaluated as follows:

| Example | Preparative Example of Previous Table | Water Contact Angles | | | Paint Repellency | |
|---|---|---|---|---|---|---|
| | | $\theta_{adv}$ | $\theta_{rec}$ | CAH ($\theta_{adv} - \theta_{rec}$) | Test Method 4 | Test Method 5 % |
| CE57 | PE32 | 93 | 74 | 19 | Fail | 100 |
| EX58 | PE33 | 110 | 103 | 7 | Pass | 15 |
| EX59 | PE34 | 112 | 105 | 7 | Pass | 15 |
| EX60 | PE35 | 114 | 106 | 7 | Pass | 10 |
| EX61 | PE36 | 114 | 112 | 2 | Pass | 20 |

-continued

| Example | Preparative Example of Previous Table | Water Contact Angles $\theta_{adv}$ | $\theta_{rec}$ | CAH ($\theta_{adv} - \theta_{rec}$) | Paint Repellency Test Method 4 | Test Method 5 % |
|---|---|---|---|---|---|---|
| EX62 | PE37 | 116 | 110 | 6 | Pass | 5 |
| EX63 | PE38 | 114 | 106 | 7 | Pass | 2 |
| EX64 | PE39 | 116 | 108 | 7 | Pass | 2 |
| EX65 | PE40 | 116 | 108 | 8 | Pass | 5 |
| EX66 | PE41 | 118 | 112 | 6 | Pass | 2 |
| EX67 | PE42 | 120 | 1112 | 8 | Pass | 90 |
| EX68 | PE43 | 119 | 112 | 7 | Pass | 5 |
| EX69 | PE44 | 118 | 110 | 8 | Pass | 40 |
| EX70 | PE45 | 115 | 108 | 7 | Pass | 20 |
| EX71 | PE46 | 117 | 113 | 4 | Pass | 1 |
| EX72 | PE47 | 116 | 107 | 9 | Pass | 1 |
| CE73 | PE48 | 103 | 82 | 21 | Fail | 100 |
| CE74 | PE49 | 105 | 80 | 25 | Fail | 95 |
| CE75 | PE50 | 91 | 72 | 19 | Fail | 100 |
| CE76 | PE51 | 74 | 57 | 17 | Fail | 100 |
| CE77 | PE52 | 71 | 55 | 16 | Fail | 100 |
| CE78 | PE53 | 87 | 64 | 23 | Fail | 100 |
| CE79 | PE54 | 86 | 45 | 41 | Fail | 100 |
| CE80 | PE55 | 121 | 102 | 19 | Pass | 95 |
| CE81 | PE56 | 121 | 109 | 12 | Pass | 95 |
| CE82 | PTFE Sheet | 111 | 87 | 24 | Fail | 85 |

Comparative Examples 83-84 (CE83-CE84) and Examples 85-86 (EX85-EX86)

CE 83 was an LDPE PPS 400 ml container used "as is" without applying any coating solutions to its interior walls. To prepare CE84, EX85 and EX86 coating solutions were applied to the inside walls of the spray gun paint container using a pipette as follows: the bottom of an LDPE PPS container was first wet with the coating solution, and the solvent was allowed to evaporate under ambient conditions. The container was then tilted 90° and a pipette was used to coat a strip of the interior side wall of the container. Next, the container was manually rotated to obtain complete wetting of the entire interior sidewall by the coating solution. Excess coating solution was drained by flipping the container upside down, and the solvent was allowed to evaporate under ambient conditions for at least 30 minutes. Paint repellency was determined according to Test Method 3 as follows:

| Example | Preparative Example of Previous Table | Weight of Empty Container (g) | Weight of Paint Residue Following Drainage (g) | Weight of Paint Residue per Unit Area Following Drainage (g/cm$^2$) |
|---|---|---|---|---|
| CE83 | none | 5.82 | 5.96 | 0.021 |
| CE84 | PE48 Binder-PS$_{250}$ | 5.94 | 7.57 | 0.027 |
| EX85 | PE41 PS$_{250}$/FC-1 95/5 | 5.83 | 0.20 | 0.00070 |
| EX86 | PE47 Teflon ® AF | 5.83 | 0.60 | 0.0021 |

The liner of EX85 was utilized with the spray application equipment to spray PPG Envirobase paint followed by a coat of clear coat obtained from PPG Industries, Inc. as the trade designation HIGH VELOCITY CLEARCLOAT DC3000. The paint could be uniformly applied at a sufficient film build. There was no evidence of "fisheyes" or other incompatibility-related coating defects while applying the paint and/or by uneven gloss and/or color.

Comparative Example 87 (CE87)

CE87 was a sample cut out of the bottom of a "Earlex L0190"1 quart (946 mL) PTFE Coated Metal Paint Container" (obtained from Home Depot USA Inc., Atlanta, Ga.). The cut out sample was rectangular with dimensions of 2.8 cm×3.2 cm. The paint repellency and water contact angles were evaluated as follows:

| Paint Repellency | |
|---|---|
| Test Method 4 | Test Method 5 |
| Fail | 95% |

| Water Contact Angles | | |
|---|---|---|
| $\theta_{adv}$ | $\theta_{rec}$ | CAH ($\theta_{adv}-\theta_{rec}$) |
| 111 | 80 | 31 |

Example 88

A Norton™ FEP Beaker Liner was obtained from Welch Fluorocarbon, Inc., Dover N.H. The paint repellency and water contact angles were evaluated as follows:

| Paint Repellency | |
|---|---|
| Test Method 4 | Test Method 5 |
| Pass | 5% |

| Water Contact Angles | | |
|---|---|---|
| $\theta_{adv}$ | $\theta_{rec}$ | CAH ($\theta_{adv}-\theta_{rec}$) |
| 119 | 114 | 5 |

Example 91 (EX91)

EX91 was prepared by coating the surfaces PPS liner by pipetting the PE41 solution into the liner and rotating the liner until the solution wet the entire interior of the container. The coated container was then turned upside down to drain any excess coating solution, and dried in this inverted position for 2 hours at room temperature. Pieces of the coated liner were then cut from the side and used in the paint repellency testing. The paint repellency was evaluated with 4 different paints according to Test Method 6.

The PPG Envirobase paint was the same as previously described. The other paints were as follows:

Spies Hecker: 70% by volume WT389 Platinum Silver Permahyd Hi-TEC Base Coat 480 and 30% by volume Hi-TEC WT 6050

Glasurit: 50% by volume Jet Black 90-1250 Base Coat and 50% by volume 90 Adjusting Base 93-E3

Sikkens: 70% by volume Jet Black Autowave 391096 and 30% by volume Autowave WB 391196

The test results were as follows:

| Example | Test Paint | Mass per Surface Area of Retained Paint (g/cm$^2$) | Retained Paint Coverage (%) |
|---|---|---|---|
| CE83 | PPG Envirobase | 0.020 | >95% |
| No Coating | Spies Hecker | 0.016 | >95% |
| | Glasurit | 0.0046 | >95% |
| | Sikkens | 0.0035 | >95% |
| CE87 | PPG Envirobase | 0.020 | >95% |
| Earlex L0190" | Spies Hecker | 0.015 | >95% |
| | Glasurit | 0.0081 | >95% |
| | Sikkens | 0.0023 | >95% |
| EX91 | PPG Envirobase | 0.001 | <5% |
| | Spies Hecker | <0.001 | <5% |
| | Glasurit | 0.001 | 10% |
| | Sikkens | <0.001 | <5% |

Note: The samples with "<0.001" are listed as such because the precision of the laboratory balance was not high enough to measure a change.

Comparative Example 92 (CE92) and Examples 93-95 (EX93-EX95)

CE92 was cut pieces from the sides of a PPS Liner without any treatments. The cut samples had a dimension of 5 cm×5 cm.

EX93-EX95 were prepared by melt compounding at a temperature ranging from 260° C.-280° C. FC1 and Marflex 1122 in desired ratios (0.1, 0.5, 5 wt. % FC1 for EX93-EX95, respectively) and then extruding the mixture into a 40 mils (about 1 mm) thick film using a co-rotating 18MM twin screw extruder obtained from Leistritz, Germany equipped with an 8" die obtained from Cloeren Incorporated, Eau Claire, Wis. Then the extruded films were annealed at 110° C. for 5 minutes and cut to pieces 5 cm×5 cm in dimension water contact angles and paint repellent testing as follows:

| | | | Paint Repellency | |
|---|---|---|---|---|
| | Water Contact Angle | | | Retained Paint Coverage |
| Example | $\theta_{adv}$ | $\theta_{rec}$ | Test Method 4 | Test Method 5 |
| CE92 | 105 | 95 | | |
| EX93 | 119 | 110 | Pass | 20% |
| EX94 | 119 | 117 | Pass | 5% |
| EX95 | 123 | 116 | Pass | 5% |

The 40 mils (about 1 mm) thick film in the absence of the film being annealed was thermoformed into a disposable liner. The liner was substantially the same as the commercially available PPS' liner except for the composition of liner material. Pieces were cut from the sides for contact angle testing with water with a solution containing 10% by weight of 2-n-butoxyethanol and 90% by weight deionized water instead of deionized water. The results were as follows:

| Concentration of FC-1 Melt Additive | Water Contact Angles | | | 10% (by wt.) aqueous 2-n-butoxyethanol Contact Angles | |
|---|---|---|---|---|---|
| | $\theta_{adv}$ | $\theta_{rec}$ | CAH ($\theta_{adv}-\theta_{rec}$) | $\theta_{adv}$ | $\theta_{rec}$ |
| 0.5 wt. % | 120 | 107 | 13 | 73 | 50 |
| 1 wt. % | 119 | 106 | 13 | 75 | 52 |
| 2 wt. % | 120 | 112 | 8 | 78 | 62 |
| 5 wt % | 122 | 107 | 15 | 78 | 54 |

Several Examples and Comparative Examples prepared as described above were tested for their contact angle in the same manner as previously described except using a solution containing 10% by weight of 2-n-butoxyethanol and 90% by weight deionized water instead of deionized water.

| Sample | 10% (by wt.) aqueous 2-n-butoxyethanol Contact Angles | |
|---|---|---|
| | $\theta_{adv}$ | $\theta_{rec}$ |
| CE83 | 51 | 21 |
| PPS Liner without any Treatments | | |
| CE87 | 47 | 27 |
| "Earlex L0190" | | |
| CE82 | 51 | 39 |
| Teflon PTFE Sheet | | |
| CE74 | 59 | 37 |
| Comparative Fluoropolymer | | |
| EX88 | 70 | 56 |
| Norton ™ FEP Beaker Liner | | |
| EX72 | 81 | 69 |
| Teflon ® AF | | |
| EX67 | 76 | 28 |
| EX91 | 78 | 72 |
| PPS Liner with PE41 PS250/FC-1 95/5 | | |
| EX94 | 74 | 63 |
| Melt compounded Marflex 1122 and 0.5 wt. % FC1 | | |
| EX30 | 71 | 69 |
| Lubricant impregnated porous layer | | |

What is claimed is:

1. A component of a spray application system, wherein the component is a liquid reservoir or a liquid reservoir liner comprising a liquid repellent surface such that the receding contact angle with

UNITED STATES PATENT AND TRADEMARK OFFICE
CERTIFICATE OF CORRECTION

PATENT NO. : 10,987,686 B2
APPLICATION NO. : 16/782105
DATED : April 27, 2021
INVENTOR(S) : Meuler et al.

Page 1 of 3

It is certified that error appears in the above-identified patent and that said Letters Patent is hereby corrected as shown below:

On the Title Page

Page 4, Column 1,
Item (56) Under "Other Publications", Line 1, delete "Fluorocabon" and insert -- Fluorocarbon --, therefor.
Item (56) Under "Other Publications", Line 2, delete "Flurorcarbon" and insert -- Fluorocarbon --, therefor.

Page 4, Column 2,
Item (56) Under "Other Publications", Line 13, delete "AlfaAesar" and insert -- Alfa Aesar --, therefor.

In the Specification

Column 6,
Line 63, delete "D1/D2" and insert -- $D_1/D_2$ --, therefor.
Line 64, delete "D2" and insert -- $D_2$ --, therefor.
Line 65, delete "D2=" and insert -- $D_2=$ --, therefor.

Column 7,
Line 27, delete "acircular" and insert -- circular --, therefor.

Column 12,
Line 23, delete "material" and insert -- material. --, therefor.
Line 64, delete "IV" and insert -- $R^1$ --, therefor.

Column 13,
Line 60, delete "perfluoralkoxy," and insert -- perfluoroalkoxy, --, therefor.

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,987,686 B2

Column 14,
Line 30, delete "($CF_3$) $CF_2$—," and insert -- ($CF_3$)$CF_2$—, --, therefor.
Lines 54-65, delete "Monovalent perfluoropolyether groups often have a terminal group (i.e., $R_f^1$—O— group) of formula $C_bF_{2b+1}O$—, $CF_2(Z)O$—, $CF_2(Z)C_bF_{2b}O$—, $C_bF_{2b+1}CF(Z)O$—, or $CF_3CF(Z)O$— where b and Z are the same as defined above. The terminal group is directly bonded to at least one perfluoroalkyleneoxy or poly(perfluoroalkyleneoxy) group (i.e., —($R_f^2$—O)$_a$— group). Each perfluoroalkyleneoxy group often has 1 to 10 carbon atoms, 1 to 8 carbon atoms, 1 to 6 carbon atoms, 1 to 4 carbon atoms, or 1 to 3 carbon atoms. The perfluoroalkyleneoxy or poly(perfluoroalkyleneoxy) group is directly bonded to a perfluoroalkylene group (i.e., —$R_f^3$—)." and insert the same on Column 14, Line 55 as a new paragraph.
Line 57, delete "$C_bF_{2b+1}CF(Z)O$—," and insert -- $C_bF_{2b+1}CF(Z)O$—, --, therefor.

Column 15,
Line 49, delete "O $C_tF_{2t}O$" and insert -- $OC_tF_{2t}O$ --, therefor.

Column 16,
Line 4, delete "$R_f$—$C(R^1)_2$—$Si(R^2)_{3-x}(R^3)_x$" and insert -- $R_f$—$[C(R^1)_2$—$Si(R^2)_{3-x}(R^3)_x]_2$ --, therefor.
Line 19, delete "$(R^3)$," and insert -- $(R^3)_x$. --, therefor.
Line 30, delete "sulfiryl," and insert -- sulfuryl, --, therefor.

Column 17,
Lines 60 & 61, delete "$(R^3)$—$(R^2)_{3-x}SiLR^1LSi(R^2)_{3-x}R^3)_x$" and insert -- $(R^3)_x(R^2)_{3-x}SiLR^1LSi(R^2)_{3-x}(R^3)_x$ --, therefor.

Column 18,
Line 15, delete "R'" and insert -- $R^1$ --, therefor.
Line 17, delete "—$Si(C_1)_3$," and insert -- —$Si(Cl)_3$, --, therefor.
Line 17, delete "—$Si(C_1)_3$," and insert -- —$Si(Cl)_3$, --, therefor.
Line 18, delete "—$Si(C_1)_3$," and insert -- —$Si(Cl)_3$, --, therefor.

Column 19,
Line 36, delete "-NH-replacing" and insert -- -NH- replacing --, therefor.

Column 21,
Line 25, delete "<50 mN/m," and insert -- $\leq$50 mN/m, --, therefor.
Line 48, delete "polyfluoroethers, and polyfluropolyethers." and insert -- perfluoroethers, and perfluoropolyethers. --, therefor.

Column 27,
Line 34, delete "$CON(R^1)(CH_2)_k$-" and insert -- -$CON(R^1)(CH_2)_k$- - --, therefor.
Line 34, delete "$(CH_2)_k$-" and insert -- -$(CH_2)_k$- --, therefor.
Line 35, delete "$(CH_2)_kO(CH_2)_k$-" and insert -- -$(CH_2)_kO(CH_2)_k$- --, therefor.
Line 36, delete "$(CH_2)_kS(CH_2)_k$-" and insert -- -$(CH_2)_kS(CH_2)_k$- --, therefor.
Line 37, delete "$(CH_2)_kSO_2(CH_2)_k$-" and insert -- -$(CH_2)_kSO_2(CH_2)_k$- --, therefor.

CERTIFICATE OF CORRECTION (continued)
U.S. Pat. No. 10,987,686 B2

Column 28,
Line 3, delete "rinoleic" and insert -- ricinoleic --, therefor.
Line 3, delete "eracic" and insert -- erucic --, therefor.

Column 29,
Line 60, delete "500%" and insert -- 500%. --, therefor.

Column 38,
Line 62, delete "—Si($R_c$)$_3$" and insert -- —Si($R^c$)$_3$ --, therefor.

Column 39,
Line 63, delete "embodiments;" and insert -- embodiments: --, therefor.

Column 40,
Line 64, delete "hexafluroropropylene." and insert -- hexafluoropropylene. --, therefor.

Column 46,
Line 62, delete "OH]2" and insert -- OH]$_2$ --, therefor.

Column 47,
Line 20, delete "(OCH$_3$)$_3$]$_2$" and insert -- (OCH$_3$)$_3$]$_2$. --, therefor.

Column 53,
Line 32, delete "perfluorohutanesulfonyl" and insert -- perfluorobutanesulfonyl --, therefor.

Column 60,
Line 23, delete "PPS'" and insert -- PPS™ --, therefor.